US010387896B1

United States Patent
Hershey et al.

(10) Patent No.: US 10,387,896 B1
(45) Date of Patent: Aug. 20, 2019

(54) AT-SHELF BRAND STRENGTH TRACKING AND DECISION ANALYTICS

(71) Applicants: Jeff Hershey, State College, PA (US); Rajeev Sharma, State College, PA (US); Richard Hirata, State College, PA (US); Krishna Botla, State College, PA (US)

(72) Inventors: Jeff Hershey, State College, PA (US); Rajeev Sharma, State College, PA (US); Richard Hirata, State College, PA (US); Krishna Botla, State College, PA (US)

(73) Assignee: VideoMining Corporation, State College, PA (US)

( * ) Notice: Subject to any disclaimer, the term of this patent is extended or adjusted under 35 U.S.C. 154(b) by 766 days.

(21) Appl. No.: 15/140,283

(22) Filed: Apr. 27, 2016

(51) Int. Cl.
*G06Q 10/00* (2012.01)
*G06Q 30/02* (2012.01)
*H04N 5/247* (2006.01)
*G06K 9/00* (2006.01)

(52) U.S. Cl.
CPC ..... *G06Q 30/0201* (2013.01); *G06K 9/00771* (2013.01); *H04N 5/247* (2013.01)

(58) Field of Classification Search
None
See application file for complete search history.

(56) References Cited

U.S. PATENT DOCUMENTS

| 4,331,973 A | 5/1982 | Eskin et al. |
| 4,973,952 A | 11/1990 | Malec et al. |
| 5,138,638 A | 8/1992 | Frey |
| 5,305,390 A | 4/1994 | Frey et al. |

(Continued)

FOREIGN PATENT DOCUMENTS

| CA | 2823895 | 5/2014 |
| EP | 1011060 | 6/2000 |

(Continued)

OTHER PUBLICATIONS

Krockel, Johannes. Intelligent Processing of Video Streams for Visual Customer Behavior Analysis, 2012, ICONS 2012: The Seventh International Conference on Systems, p. 1-6.*

(Continued)

*Primary Examiner* — Joseph M Waesco

(57) ABSTRACT

A method and system for analyzing product strength or brand strength by determining shopper decision behavior during a shopping trip. Specifically, shopper behavior can be analyzed to determine whether a shopper's decision to purchase an item occurred at-shelf or pre-shelf. Aggregating decision data across many shoppers over time can then be used to generate analytics regarding the strength of a product or brand. The analysis can then be used to make recommendations to manufacturers or retailers about how to strengthen the product or brand. A deployment of cameras and mobile signal sensors can be utilized to recognize shoppers and track their behavior. Demographics information can also be estimated about the tracked shoppers. The visual and mobile (Continued)

signal trajectories can be fused to form a single shopper trajectory, then associated with Point of Sale (PoS) data. This results in a dataset describing the shopping trip for each tracked shopper.

20 Claims, 39 Drawing Sheets

(56) References Cited

U.S. PATENT DOCUMENTS

| | | | |
|---|---|---|---|
| 5,390,107 A | 2/1995 | Nelson et al. |
| 5,401,946 A | 3/1995 | Weinblatt |
| 5,465,115 A | 11/1995 | Conrad et al. |
| 5,490,060 A | 2/1996 | Malec et al. |
| 5,557,513 A | 9/1996 | Frey et al. |
| 5,953,055 A | 9/1999 | Huang et al. |
| 5,973,732 A | 10/1999 | Guthrie |
| 6,061,088 A | 5/2000 | Khosravi et al. |
| 6,141,433 A | 10/2000 | Moed et al. |
| 6,142,876 A | 11/2000 | Cumbers |
| 6,185,314 B1 | 2/2001 | Crabtree et al. |
| 6,195,121 B1 | 2/2001 | Huang et al. |
| 6,263,088 B1 | 7/2001 | Crabtree et al. |
| 6,295,367 B1 | 9/2001 | Crabtree et al. |
| 6,560,578 B2 | 5/2003 | Eldering |
| 6,826,554 B2 | 11/2004 | Sone |
| 6,941,573 B1 | 9/2005 | Cowan et al. |
| 7,171,024 B2 | 1/2007 | Crabtree |
| 7,225,414 B1 | 5/2007 | Sharma et al. |
| 7,227,976 B1 | 6/2007 | Jung et al. |
| 7,240,027 B2 | 7/2007 | McConnell et al. |
| 7,274,803 B1 | 9/2007 | Sharma et al. |
| 7,283,650 B1 | 10/2007 | Sharma et al. |
| 7,317,812 B1 | 1/2008 | Krahnstoever et al. |
| 7,319,479 B1 | 1/2008 | Crabtree et al. |
| 7,319,779 B1 | 1/2008 | Mummareddy et al. |
| 7,357,717 B1 | 4/2008 | Cumbers |
| 7,360,251 B2 | 4/2008 | Spalink et al. |
| 7,400,745 B2 | 7/2008 | Crabtree |
| 7,415,510 B1 | 8/2008 | Kramerich et al. |
| 7,505,621 B1 | 3/2009 | Agrawal et al. |
| 7,530,489 B2 | 5/2009 | Stockton |
| 7,551,755 B1 | 6/2009 | Steinberg et al. |
| 7,587,068 B1 | 9/2009 | Steinberg et al. |
| 7,590,261 B1 | 9/2009 | Mariano et al. |
| 7,606,728 B2 | 10/2009 | Sorensen |
| 7,702,132 B2 | 4/2010 | Crabtree |
| 7,711,155 B1 | 5/2010 | Sharma et al. |
| 7,742,623 B1 | 6/2010 | Moon et al. |
| 7,742,952 B2 | 6/2010 | Bonner et al. |
| 7,783,527 B2 | 8/2010 | Bonner et al. |
| 7,792,710 B2 | 9/2010 | Bonner et al. |
| 7,805,333 B2 | 9/2010 | Kepecs |
| 7,848,548 B1 | 12/2010 | Moon et al. |
| 7,873,529 B2 | 1/2011 | Kruger et al. |
| 7,903,141 B1 | 3/2011 | Mariano et al. |
| 7,904,477 B2 | 3/2011 | Jung et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,925,549 B2 | 4/2011 | Looney et al. |
| 7,930,204 B1 | 4/2011 | Sharma et al. |
| 7,949,639 B2 | 5/2011 | Hunt et al. |
| 7,957,565 B1 | 6/2011 | Sharma et al. |
| 7,965,866 B2 | 6/2011 | Wang et al. |
| 7,974,869 B1 | 7/2011 | Sharma et al. |
| 7,974,889 B2 | 7/2011 | Raimbeault |
| 7,987,105 B2 | 7/2011 | Mcneill et al. |
| 7,987,111 B1 | 7/2011 | Sharma et al. |
| 8,009,863 B1 | 8/2011 | Sharma et al. |
| 8,010,402 B1 | 8/2011 | Sharma et al. |
| 8,027,521 B1 | 9/2011 | Moon et al. |
| 8,027,864 B2 | 9/2011 | Gilbert |
| 8,050,984 B2 | 11/2011 | Bonner et al. |
| 8,095,589 B2 | 1/2012 | Singh et al. |
| 8,098,888 B1 | 1/2012 | Mummareddy et al. |
| 8,160,984 B2 | 4/2012 | Hunt et al. |
| 8,175,908 B1 | 5/2012 | Anderson |
| 8,189,926 B2 | 5/2012 | Sharma et al. |
| 8,195,519 B2 | 6/2012 | Bonner et al. |
| 8,207,851 B2 | 6/2012 | Christopher |
| 8,214,246 B2 | 7/2012 | Springfield et al. |
| 8,219,438 B1 | 7/2012 | Moon et al. |
| 8,238,607 B2 | 8/2012 | Wang et al. |
| 8,254,633 B1 | 8/2012 | Moon et al. |
| 8,295,597 B1 | 10/2012 | Sharma et al. |
| 8,325,228 B2 | 12/2012 | Mariadoss |
| 8,325,982 B1 | 12/2012 | Moon et al. |
| 8,340,685 B2 | 12/2012 | Cochran et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,401,248 B1 | 3/2013 | Moon et al. |
| 8,412,656 B1 | 4/2013 | Baboo et al. |
| 8,433,612 B1 | 4/2013 | Sharma et al. |
| 8,441,351 B2 | 5/2013 | Christopher |
| 8,452,639 B2 | 5/2013 | Abe et al. |
| 8,457,466 B1 | 6/2013 | Sharma et al. |
| 8,462,996 B2 | 6/2013 | Moon et al. |
| 8,472,672 B2 | 6/2013 | Wang et al. |
| 8,489,532 B2 | 7/2013 | Hunt et al. |
| 8,504,598 B2 | 8/2013 | West |
| 8,520,906 B1 | 8/2013 | Moon et al. |
| 8,521,590 B1 | 8/2013 | Hanusch |
| 8,570,376 B1 | 10/2013 | Sharma et al. |
| 8,577,705 B1 | 11/2013 | Baboo et al. |
| 8,589,208 B2 | 11/2013 | Kruger et al. |
| 8,597,111 B2 | 12/2013 | LeMay et al. |
| 8,600,828 B2 | 12/2013 | Bonner et al. |
| 8,620,718 B2 | 12/2013 | Varghese et al. |
| 8,660,895 B1 | 2/2014 | Saurabh et al. |
| 8,665,333 B1 | 3/2014 | Sharma et al. |
| 8,694,792 B2 | 4/2014 | Whillock |
| 8,699,370 B2 | 4/2014 | Leung et al. |
| 8,706,544 B1 | 4/2014 | Sharma et al. |
| 8,714,457 B2 | 5/2014 | August et al. |
| 8,719,266 B2 | 5/2014 | West |
| 8,739,254 B2 | 5/2014 | Aaron |
| 8,781,502 B1 | 7/2014 | Middleton et al. |
| 8,781,877 B2 | 7/2014 | Kruger et al. |
| 8,812,344 B1 | 8/2014 | Saurabh et al. |
| 8,830,030 B2 | 9/2014 | Arthurs et al. |
| 8,873,813 B2 | 10/2014 | Tadayon et al. |
| 8,909,542 B2 | 12/2014 | Montero et al. |
| 8,913,791 B2 | 12/2014 | Datta et al. |
| 8,930,134 B2 | 1/2015 | Gu et al. |
| 8,941,735 B2 | 1/2015 | Mariadoss |
| 8,955,001 B2 | 2/2015 | Bhatia et al. |
| 8,978,086 B2 | 3/2015 | Bhatia et al. |
| 8,989,775 B2 | 3/2015 | Shaw |
| 9,003,488 B2 | 4/2015 | Spencer et al. |
| 9,036,028 B2 | 5/2015 | Buehler |
| 9,092,797 B2 | 7/2015 | Perez et al. |
| 9,094,322 B2 | 7/2015 | Brown |
| 9,111,157 B2 | 8/2015 | Christopher |
| 9,140,773 B2 | 9/2015 | Oliver |
| 9,165,375 B2 | 10/2015 | Datta et al. |
| 9,177,195 B2 | 11/2015 | Marcheselli et al. |
| 2001/0027564 A1 | 10/2001 | Cowan et al. |
| 2002/0016740 A1 | 2/2002 | Ogasawara |
| 2003/0033190 A1 | 2/2003 | Shan et al. |
| 2003/0212596 A1 | 11/2003 | DiPaolo et al. |
| 2004/0002897 A1 | 1/2004 | Vishik |
| 2004/0111454 A1 | 6/2004 | Sorensen |
| 2004/0176995 A1 | 9/2004 | Fusz |
| 2004/0249848 A1 | 12/2004 | Carlbom et al. |
| 2005/0021397 A1 | 1/2005 | Cui et al. |
| 2005/0096997 A1 | 5/2005 | Jain et al. |
| 2005/0117778 A1 | 6/2005 | Crabtree |
| 2005/0187972 A1 | 8/2005 | Kruger et al. |
| 2005/0246196 A1 | 11/2005 | Frantz et al. |
| 2005/0288954 A1 | 12/2005 | Mccarthy et al. |
| 2006/0010028 A1 | 1/2006 | Sorensen |

(56) References Cited

U.S. PATENT DOCUMENTS

| | | |
|---|---|---|
| 2006/0069585 A1 | 3/2006 | Springfield et al. |
| 2006/0074769 A1 | 4/2006 | Looney et al. |
| 2006/0080265 A1 | 4/2006 | Hinds et al. |
| 2006/0085255 A1 | 4/2006 | Hastings et al. |
| 2006/0089837 A1 | 4/2006 | Adar et al. |
| 2006/0229996 A1 | 10/2006 | Keithley et al. |
| 2007/0122002 A1 | 5/2007 | Crabtree |
| 2007/0138268 A1* | 6/2007 | Tuchman ............... G06Q 30/02 235/383 |
| 2007/0156515 A1 | 7/2007 | Hasselback et al. |
| 2007/0182818 A1 | 8/2007 | Buehler |
| 2007/0239871 A1 | 10/2007 | Kaskie |
| 2007/0282681 A1 | 12/2007 | Shubert et al. |
| 2008/0004892 A1 | 1/2008 | Zucker |
| 2008/0042836 A1 | 2/2008 | Christopher |
| 2008/0109397 A1 | 5/2008 | Sharma et al. |
| 2008/0159634 A1 | 7/2008 | Sharma et al. |
| 2008/0172282 A1 | 7/2008 | Mcneill et al. |
| 2008/0201198 A1 | 8/2008 | Louviere et al. |
| 2008/0263000 A1 | 10/2008 | West et al. |
| 2008/0263065 A1 | 10/2008 | West |
| 2008/0270363 A1 | 10/2008 | Hunt et al. |
| 2008/0288209 A1 | 11/2008 | Hunt et al. |
| 2008/0288522 A1 | 11/2008 | Hunt et al. |
| 2008/0288538 A1 | 11/2008 | Hunt et al. |
| 2008/0288889 A1* | 11/2008 | Hunt ....................... G06Q 30/02 715/810 |
| 2008/0294372 A1 | 11/2008 | Hunt et al. |
| 2008/0294583 A1 | 11/2008 | Hunt et al. |
| 2008/0294996 A1* | 11/2008 | Hunt ....................... G06Q 30/02 715/739 |
| 2008/0318591 A1 | 12/2008 | Oliver |
| 2008/0319829 A1 | 12/2008 | Hunt et al. |
| 2009/0006309 A1 | 1/2009 | Hunt et al. |
| 2009/0006490 A1 | 1/2009 | Hunt et al. |
| 2009/0006788 A1 | 1/2009 | Hunt et al. |
| 2009/0010490 A1 | 1/2009 | Wang et al. |
| 2009/0012971 A1 | 1/2009 | Hunt et al. |
| 2009/0018996 A1* | 1/2009 | Hunt ....................... G06Q 30/02 |
| 2009/0037412 A1 | 2/2009 | Bard et al. |
| 2009/0046201 A1 | 2/2009 | Kastilahn et al. |
| 2009/0097706 A1 | 4/2009 | Crabtree |
| 2009/0157472 A1* | 6/2009 | Burazin ................. G06Q 30/02 705/14.57 |
| 2009/0158309 A1 | 6/2009 | Moon et al. |
| 2009/0198507 A1 | 8/2009 | Rhodus |
| 2009/0240571 A1 | 9/2009 | Bonner et al. |
| 2009/0319331 A1* | 12/2009 | Duffy ..................... G06Q 10/08 705/7.29 |
| 2010/0020172 A1 | 1/2010 | Mariadoss |
| 2010/0049594 A1 | 2/2010 | Bonner et al. |
| 2010/0057541 A1 | 3/2010 | Bonner et al. |
| 2010/0262513 A1 | 10/2010 | Bonner et al. |
| 2011/0022312 A1 | 1/2011 | McDonough et al. |
| 2011/0093324 A1 | 4/2011 | Fordyce, III et al. |
| 2011/0106624 A1 | 5/2011 | Bonner et al. |
| 2011/0125551 A1 | 5/2011 | Peiser |
| 2011/0137924 A1 | 6/2011 | Hunt et al. |
| 2011/0169917 A1 | 7/2011 | Stephen et al. |
| 2011/0238471 A1 | 9/2011 | Trzcinski |
| 2011/0246284 A1 | 10/2011 | Chaikin et al. |
| 2011/0252015 A1 | 10/2011 | Bard et al. |
| 2011/0286633 A1 | 11/2011 | Wang et al. |
| 2012/0066065 A1* | 3/2012 | Switzer ................. G06Q 20/10 705/14.53 |
| 2012/0072997 A1* | 3/2012 | Carlson ............... G06Q 30/0254 726/28 |
| 2012/0078675 A1 | 3/2012 | Mcneill et al. |
| 2012/0078697 A1* | 3/2012 | Carlson ............... G06Q 20/40 705/14.23 |
| 2012/0150587 A1 | 6/2012 | Kruger et al. |
| 2012/0158460 A1 | 6/2012 | Kruger et al. |
| 2012/0163206 A1 | 6/2012 | Leung et al. |
| 2012/0173472 A1 | 7/2012 | Hunt et al. |
| 2012/0190386 A1* | 7/2012 | Anderson ............. G01C 15/04 455/456.3 |
| 2012/0239504 A1 | 9/2012 | Curlander |
| 2012/0245974 A1 | 9/2012 | Bonner et al. |
| 2012/0249325 A1 | 10/2012 | Christopher |
| 2012/0254718 A1 | 10/2012 | Nayar et al. |
| 2012/0314905 A1 | 12/2012 | Wang et al. |
| 2012/0316936 A1 | 12/2012 | Jacobs |
| 2012/0323682 A1 | 12/2012 | Shanbhag et al. |
| 2012/0331561 A1 | 12/2012 | Broadstone et al. |
| 2013/0014138 A1 | 1/2013 | Bhatia et al. |
| 2013/0014145 A1 | 1/2013 | Bhatia et al. |
| 2013/0014146 A1 | 1/2013 | Bhatia et al. |
| 2013/0014153 A1 | 1/2013 | Bhatia et al. |
| 2013/0014158 A1 | 1/2013 | Bhatia et al. |
| 2013/0019258 A1 | 1/2013 | Bhatia et al. |
| 2013/0019262 A1 | 1/2013 | Bhatia et al. |
| 2013/0035985 A1 | 2/2013 | Gilbert |
| 2013/0041837 A1 | 2/2013 | Dempski et al. |
| 2013/0063556 A1 | 3/2013 | Russell et al. |
| 2013/0091001 A1 | 4/2013 | Jia et al. |
| 2013/0097664 A1* | 4/2013 | Herz ....................... G06Q 10/10 726/1 |
| 2013/0110676 A1 | 5/2013 | Kobres |
| 2013/0014485 A1 | 6/2013 | Reynolds |
| 2013/0151311 A1 | 6/2013 | Smallwood et al. |
| 2013/0182114 A1 | 7/2013 | Zhang et al. |
| 2013/0182904 A1 | 7/2013 | Zhang et al. |
| 2013/0184887 A1* | 7/2013 | Ainsley ................. G05B 15/02 700/291 |
| 2013/0185645 A1 | 7/2013 | Fisk et al. |
| 2013/0197987 A1 | 8/2013 | Doka et al. |
| 2013/0218677 A1 | 8/2013 | Yopp et al. |
| 2013/0222599 A1 | 8/2013 | Shaw |
| 2013/0225199 A1 | 8/2013 | Shaw |
| 2013/0226539 A1 | 8/2013 | Shaw |
| 2013/0226655 A1 | 8/2013 | Shaw |
| 2013/0138498 A1 | 9/2013 | Raghavan |
| 2013/0231180 A1 | 9/2013 | Kelly et al. |
| 2013/0236058 A1 | 9/2013 | Wang et al. |
| 2013/0271598 A1 | 10/2013 | Mariadoss |
| 2013/0290106 A1* | 10/2013 | Bradley ................. G06Q 90/20 705/14.64 |
| 2013/0293355 A1 | 11/2013 | Christopher |
| 2013/0294646 A1 | 11/2013 | Shaw |
| 2013/0311332 A1 | 11/2013 | Favish |
| 2013/0314505 A1 | 11/2013 | Stephen et al. |
| 2013/0317950 A1 | 11/2013 | Abraham et al. |
| 2014/0019178 A1 | 1/2014 | Kortum et al. |
| 2014/0019300 A1 | 1/2014 | Sinclair |
| 2014/0032269 A1 | 1/2014 | West |
| 2014/0079282 A1* | 3/2014 | Marcheselli ........ G06K 9/00335 382/103 |
| 2014/0079297 A1 | 3/2014 | Tadayon et al. |
| 2014/0095260 A1* | 4/2014 | Weiss ................. G06Q 30/0211 705/7.32 |
| 2014/0164179 A1 | 6/2014 | Geisinger et al. |
| 2014/0172557 A1 | 6/2014 | Eden et al. |
| 2014/0172576 A1* | 6/2014 | Spears ............... G06Q 30/0266 705/14.63 |
| 2014/0173641 A1 | 6/2014 | Bhatia et al. |
| 2014/0173643 A1 | 6/2014 | Bhatia et al. |
| 2014/0195302 A1 | 7/2014 | Yopp et al. |
| 2014/0195380 A1 | 7/2014 | Jamtgaard et al. |
| 2014/0219118 A1 | 8/2014 | Middleton et al. |
| 2014/0222503 A1 | 8/2014 | Vijayaraghavan et al. |
| 2014/0222573 A1 | 8/2014 | Middleton et al. |
| 2014/0222685 A1 | 8/2014 | Middleton et al. |
| 2014/0229616 A1 | 8/2014 | Leung et al. |
| 2014/0233852 A1 | 8/2014 | Lee |
| 2014/0253732 A1 | 9/2014 | Brown et al. |
| 2014/0258939 A1 | 9/2014 | Schafer et al. |
| 2014/0278967 A1 | 9/2014 | Pal et al. |
| 2014/0279208 A1* | 9/2014 | Nickitas ............... G06Q 30/0631 705/26.7 |
| 2014/0283136 A1 | 9/2014 | Dougherty et al. |
| 2014/0031923 A1 | 10/2014 | Vemana |
| 2014/0294231 A1 | 10/2014 | Datta et al. |

(56) References Cited

U.S. PATENT DOCUMENTS

| | | | |
|---|---|---|---|
| 2014/0324537 A1* | 10/2014 | Gilbert | G06Q 10/06375 705/7.31 |
| 2014/0324627 A1* | 10/2014 | Haver | G06Q 30/0639 705/26.9 |
| 2014/0351835 A1 | 11/2014 | Orlowski | |
| 2014/0358640 A1 | 12/2014 | Besehanic et al. | |
| 2014/0358661 A1 | 12/2014 | Or et al. | |
| 2014/0358742 A1 | 12/2014 | Achan et al. | |
| 2014/0372176 A1 | 12/2014 | Fusz | |
| 2015/0006358 A1 | 1/2015 | Oshry et al. | |
| 2015/0012337 A1 | 1/2015 | Kruger et al. | |
| 2015/0025936 A1* | 1/2015 | Garel | G06Q 30/0201 705/7.29 |
| 2015/0055830 A1 | 2/2015 | Datta et al. | |
| 2015/0058049 A1 | 2/2015 | Shaw | |
| 2015/0062338 A1 | 3/2015 | Mariadoss | |
| 2015/0078658 A1 | 3/2015 | Lee | |
| 2015/0081704 A1 | 3/2015 | Hannan et al. | |
| 2015/0106190 A1 | 4/2015 | Wang et al. | |
| 2015/0134413 A1* | 5/2015 | Deshpande | G06Q 30/0202 705/7.31 |
| 2015/0154312 A1 | 6/2015 | Tilwani et al. | |
| 2015/0154534 A1 | 6/2015 | Tilwani et al. | |
| 2015/0181387 A1 | 6/2015 | Shaw | |
| 2015/0199627 A1 | 7/2015 | Gould et al. | |
| 2015/0221094 A1* | 8/2015 | Marcheselli | G06K 9/00335 382/103 |
| 2015/0235237 A1* | 8/2015 | Shaw | G06K 9/00771 705/7.29 |
| 2015/0244992 A1 | 8/2015 | Buehler | |
| 2015/0294482 A1 | 10/2015 | Stephen et al. | |
| 2015/0310447 A1 | 10/2015 | Shaw | |
| 2015/0334469 A1 | 11/2015 | Bhatia et al. | |
| 2016/0162912 A1* | 6/2016 | Garel | G06Q 30/0201 705/7.34 |
| 2017/0201779 A1* | 7/2017 | Publicover | H04W 4/21 |

FOREIGN PATENT DOCUMENTS

| | | |
|---|---|---|
| EP | 1943628 | 3/2011 |
| WO | 2004/027556 | 4/2004 |
| WO | 2006/029681 | 3/2006 |
| WO | 2007/030168 | 3/2007 |
| WO | 2011/005072 | 1/2011 |
| WO | 2012/061574 | 10/2012 |
| WO | 2015/010086 | 1/2015 |

OTHER PUBLICATIONS

Bilbride, Timothy, Jeffrey Inman, and Karen M. Stilley. "The Role of Within-Trip Dynamics and Shopper Purchase History on Unplanned Purchase Behavior." Available at SSRN 2439950 (2014).*

Huang, Yanliu and Hui, Sam K. and Inman, Jeffrey and Suher, Jacob, "Capturing the 'First Moment of Truth': Jnderstanding Unplanned Consideration and Purchase Conversion Using In-Store Video Tracking," (Feb. 22, 2012). Journal of Marketing Research, Forthcoming.*

IAB, "Targeting Local Markets: An IAB Interactive Advertising Guide," http://www.iab.net/local_committee, Sep. 2010, 18 pages.

S. Clifford and Q. Hardy, "Attention, Shoppers: Store Is Tracking Your Cell," The New York Times, http://www.nytimes.com/2013/07/15/business/attention-shopper-stores-are-tracking-your-cell.html, Jul. 14, 2013, 5 pages.

"Aerohive and Euclid Retail Analytics," Partner Solution Brief, Aerohive Networks and Euclid, 2013, 9 pages.

S.K. Hui et al., "The Effect of In-Store Travel Distance on Unplanned Spending: Applications to Mobile Promotion Strategies," Journal of Marketing, vol. 77, Mar. 2013, 16 pages.

Inman, J. Jeffrey, Russell S. Winer, and Rosellina Ferraro. "The interplay among category characteristics, customer characteristics, and customer activities on in-store decision making." Journal of Marketing 73.5 (2009): 19-29.

Gilbride, Timothy, Jeffrey Inman, and Karen M. Stilley. "The Role of Within-Trip Dynamics and Shopper Purchase History on Unplanned Purchase Behavior." Available at SSRN 2439950 (2014).

Huang, Yanliu and Hui, Sam K. and Inman, Jeffrey and Suher, Jacob, "Capturing the 'First Moment of Truth': Understanding Unplanned Consideration and Purchase Conversion Using In-Store Video Tracking," (Feb. 22, 2012). Journal of Marketing Research, Forthcoming.

* cited by examiner

Shopper Profile Data 300

Shopper ID Vector (SIV) 301
    Global ID Vector
    Local ID Vector (i.e., unique within a single visit)

Shopper Segment Data (SSD) 302
    Physical segment data
    Behavioral segment data

Shopper Behavior Dataset (SBD) 303
    Shopper metrics
    A list of *TripVector* for each visit
        Physical attributes
        Contextual attributes
        PoS data

FIG. 4

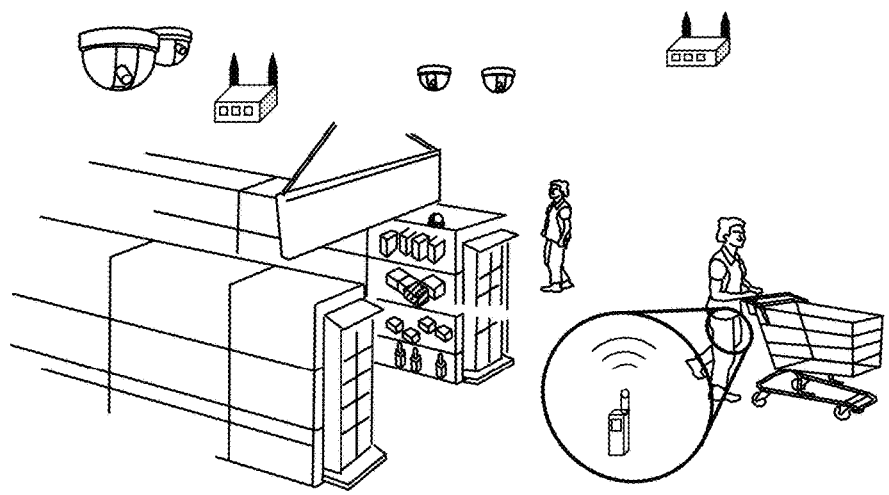
FIG. 11A
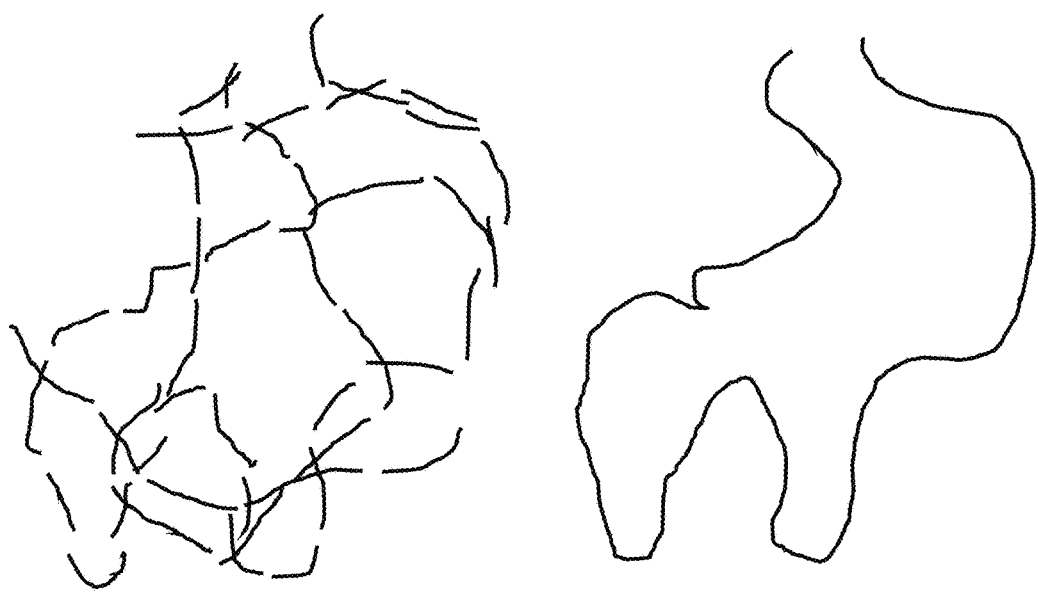
FIG. 11B
FIG. 11C

AT-SHELF BRAND STRENGTH TRACKING AND DECISION ANALYTICS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

The effort to understand and influence brand buying decisions is not new. In fact, it has been a primary focus of brand managers, researchers and marketers for decades and represents a substantial chunk of yearly budgets. Billions of dollars per year, and trillions in total, have been spent trying to predict demand and preferences, drive trial, inspire loyalty and encourage shoppers to switch from the competition. Big investments typically indicate high stakes, and this is no exception. Studies have found that 90% of the top 100 brands lost category share in 2014/15 as competition from private labels, product proliferation and more diverse consumer preferences continue to increase the pressure on big brands.

The current state of the art relies heavily on two key disciplines and related data sources—consumer behavior and after-the-fact performance tracking. In broad strokes, the field of consumer behavior provides an understanding of consumer preferences and attitudes toward brands and products and helps to define consumer needs and wants. The combination of brand affinity assessment and needs analysis drives decisions in a wide range of areas, including brand marketing, new product development, packaging and pricing.

The second key source of market feedback is grounded in sales data and consumer-reported consumption data and is used as a yardstick for measuring brand performance and the impact of the huge budgets spent to move the sales needle. These data sources provide a coarse feedback option for tracking changes in volume and predicting demand for a particular brand.

Traditional methods have been able to capture the two endpoints comprising what someone might want or need and a sample of what shoppers actually purchased. These methods, however, provide little to no insight as to what happens in between. This creates a need, therefore, to determine in-store shopping and buying behavior by various shopper segments. This need is particularly felt with regards to determining whether the purchase decisions were made before the shopper encountered the product at the shelf (pre-shelf) or while the shopper was present at the shelf (at-shelf).

Information regarding the decision process can be obtained in a number of ways, such as via surveys or shopper interviews. These methods require participation from the shopper, however, introducing the possibility of bias into the results. Also, practical limitations dictate that there is a limit on sample size. Therefore, there is also a need to automatically capture decision data for a large number of shoppers without voluntary participation by those shoppers.

BRIEF SUMMARY

A method and system for analyzing product strength or brand strength by determining shopper decision behavior during a shopping trip, utilizing at least a camera, at least a mobile signal sensor, and at least a processor for performing the steps of detecting the presence of a shopper at a location using an At-Door Shopper Detector module, tracking the movements of the shopper throughout the location using at least one camera, at least one mobile signal sensor, and a Multi-modal Shopper Tracker module, forming a shopper trajectory, comprising the shopper track throughout the store and Point of Sale (PoS) data, using a Multi-modal Shopper Data Associator Module, calculating at least one decision factor using the Shopper Decision Tracker module, determining whether the shopper decision was made at-shelf or pre-shelf, based on the at least one decision factor, using a Decision Determination module, and analyzing the shopper decision results, aggregated across a plurality of shoppers, to derive metrics representing the strength of a category or brand of products.

An embodiment can utilize a deployment of cameras and mobile signal sensors to continuously recognize and track shopper behavior at a location, forming trajectories. Also, demographics information can be estimated about the tracked shoppers. The visual and mobile signal trajectories can be fused to form a single shopper trajectory, then associated with Point of Sale (PoS) data. This results in a dataset describing the shopping trip for each tracked shopper.

The embodiment can then analyze the shopping trip information to determine whether the shopper's decision to purchase each item occurred at-shelf or pre-shelf. This information can be aggregated across many shoppers over time in a Brand Buyer database. The aggregated data can be used to generate analytics regarding the strength of the brand or product category. The analytics can then be used to make recommendations to manufacturers or retailers about how to strengthen the brand or category.

BRIEF DESCRIPTION OF DRAWINGS

FIG. 4 shows the data components that can comprise the Shopper Profile Data.

FIGS. 11A-C show an example of person tracking and the resulting vision and Wi-Fi trajectories.

DETAILED DESCRIPTION

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Understanding as much as possible about the buying decision can be fundamental to brands. It can contribute to the assessment of loyalty and overall strength and can help in identifying opportunities and competitive threats. Today, brands can develop a broad perspective on decision-making by considering consumer preferences and analyzing sales and loyalty data. Leveraging automated in-store behavior analytics, however, can enable a new approach that may hinge on the at-shelf behavior of shoppers to provide a more direct measurement of how category and brand buying decisions are being made. The broadest and most important distinction can be whether the decision was made pre-shelf or at-shelf.

Figure 1:
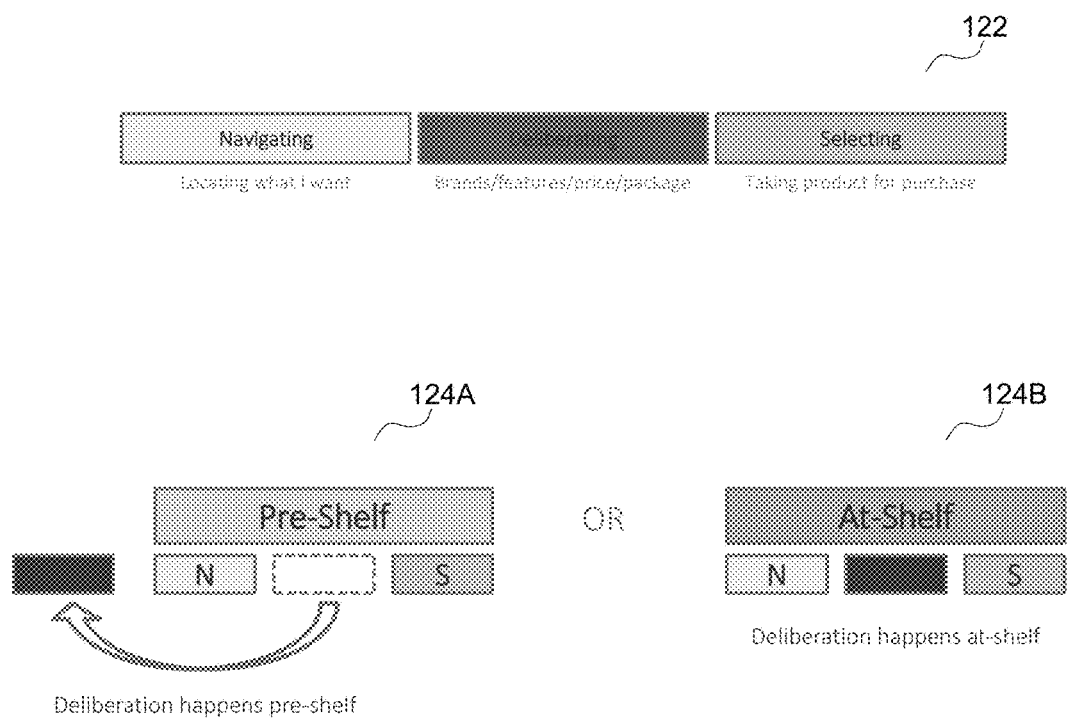
FIG. 1 illustrates the shopping decision process.

FIG. 1 illustrates the shopping decision process in 122. Understanding the decision process starts at the shelf and in considering how at-shelf time is spent. Time spent at the shelf or in front of a particular category can be divided into three distinct activities:

Navigating: Time spent on activities involved in locating a product or particular brand (traversing the category, visually scanning, etc.)

Deliberating: Time spent deciding what to purchase (information gathering, feature/packaging/price comparison)

Selecting: Time spent physically choosing a product for purchase.

Analysis of these at-shelf activities and the relationships between them drives the determination of the fundamental classification of a buying decision as Pre-Shelf 124A or At-Shelf 124B.

Overview

Figure 2:
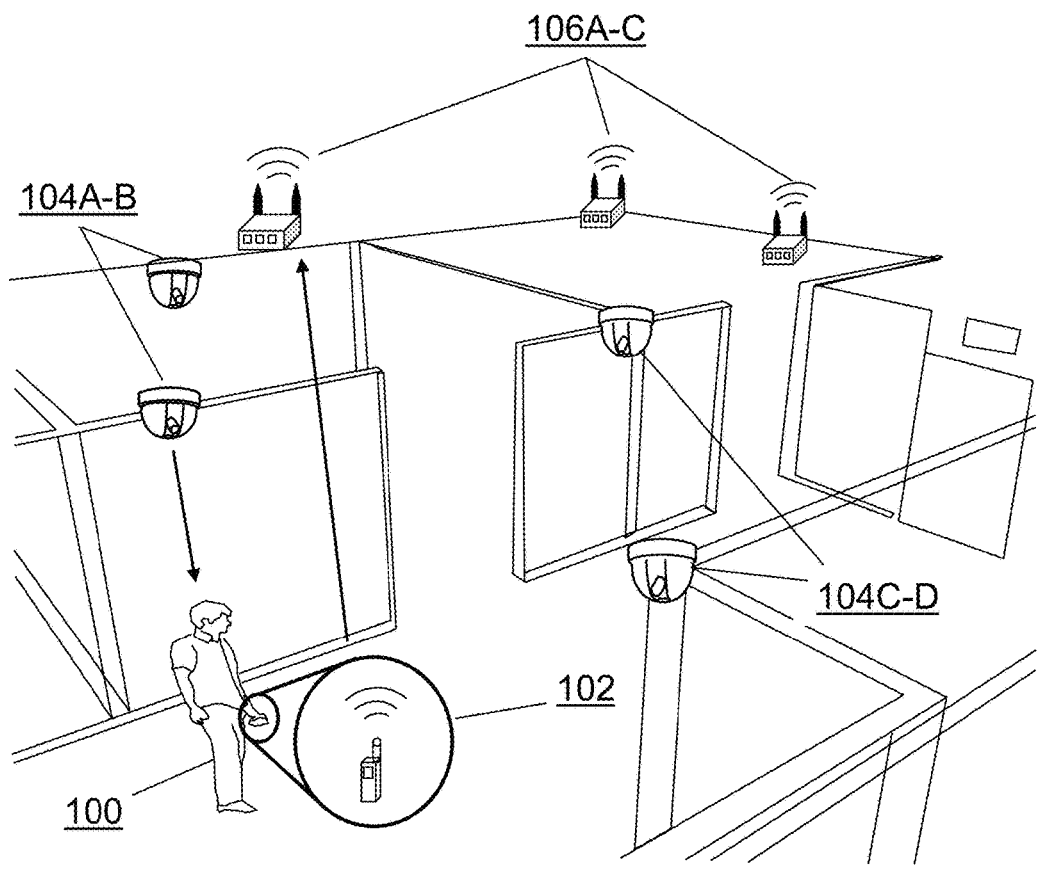
FIG. 2 shows an exemplary embodiment for tracking persons using multi-modal tracking.

FIG. 2 shows an overview of an application where an exemplary embodiment is deployed and used in an indoor environment. The indoor environment can be covered by a set of cameras 104 A-D and APs 106 A-C in such a way that most of the location in the area can be captured/measured by at least a single camera and by at least three APs, so that both visual feature-based tracking and mobile signal trilateration-based tracking can be carried out.

Figure 3:
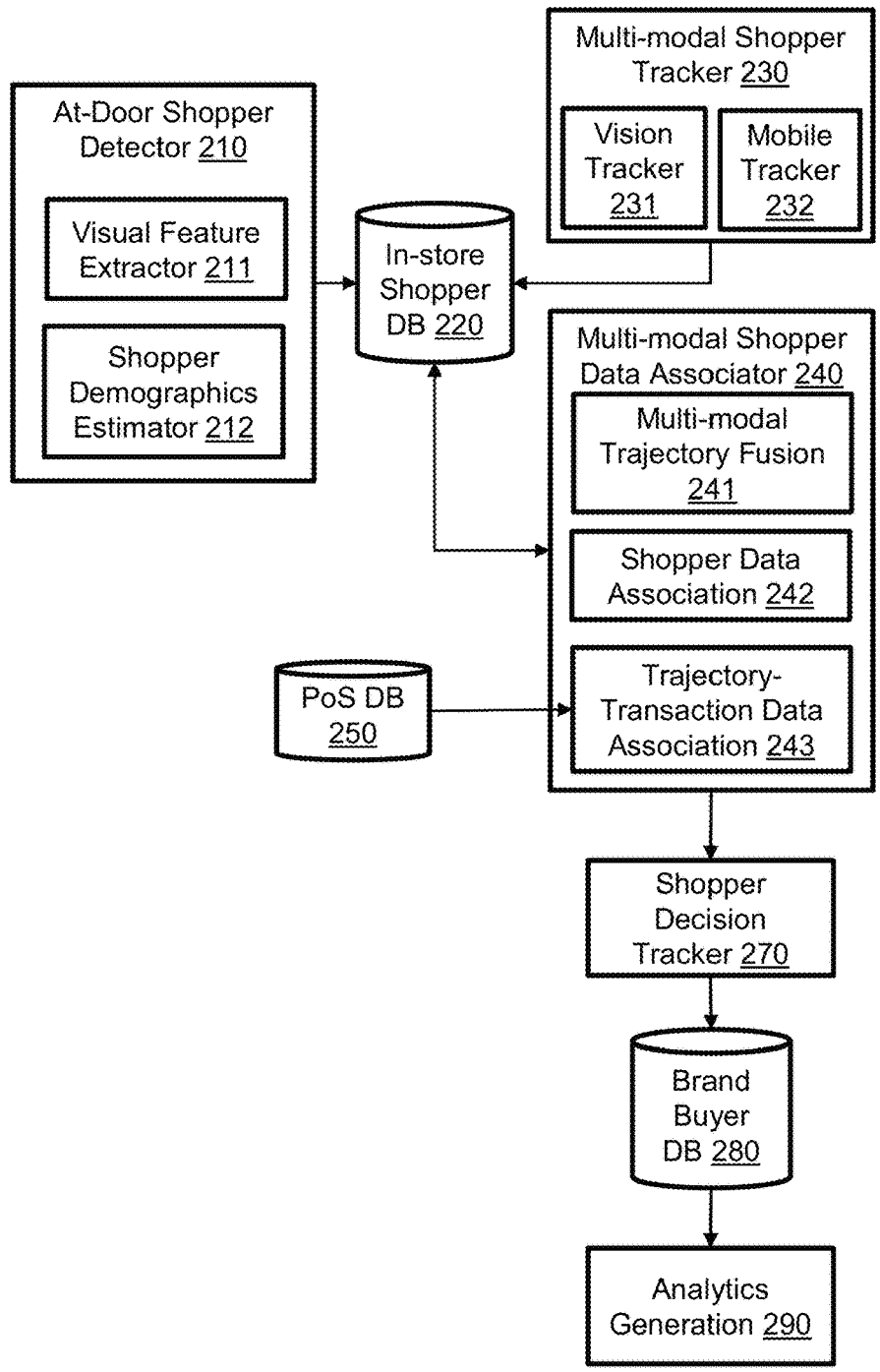
FIG. 3 shows an example block flow diagram illustrating an overview of the buyer decision tracking and analysis process.

FIG. 3 provides an overview of an exemplary embodiment of the brand decision tracking system.

The At-Door Shopper Detector 210 (utilizing the Visual Feature Extractor 211 and Shopper Demographics Estimator 212 modules) can capture an image of a shopper upon entrance to the location. The module can detect the face of a shopper as well as other body features. The detected face features can then be used to estimate demographics information about the shopper such as gender, age, and ethnicity. This data can then be added to the shopper profile data (a set of information collected and analyzed from shoppers and described in more detail in the following section) and stored in the In-Store Shopper DB 220.

The Multi-modal Shopper Tracker 230 (utilizing the Vision Tracker 231 and Mobile Tracker 232) can also detect and track shoppers from the time the store is entered and as the shopper travels the store. The Vision Tracker 231 and Mobile Tracker 232 can use vision and mobile data, respectively, to produce shopper trajectories that represent a shopper's entire trip through the store. The Vision Tracker 231 can provide an accurate track as a shopper moves through a location, however, a number of issues (such as background clutter and non-overlapping camera coverage) can cause discontinuities in the trajectory. The discontinuities can be rectified algorithmically (for example, by re-identifying a shopper with shopper profile data already existing in the database) and augmented using mobile data. The Mobile Tracker 232 can isolate individual mobile device tracks using the unique MAC address of each tracked device, and use methods such as translateration to localize the device. While localization accuracy can be limited using the wireless modality, the track is persistent. Data from each modality can be stored separately as shopper profile data in the In-store Shopper DB 220.

The Multi-modal Shopper Data Associator 240 can use data from the In-store Shopper DB 220 and the Point-of-Sale (PoS) DB 250 to fuse shopper trajectories collected via multiple sensing modalities (utilizing the Multi-modal Trajectory Fusion 241 module), can associate the appropriate shopper data (utilizing the Shopper Data Association 242 module), and can perform Trajectory-Transaction Data Association 243. The Multi-modal Trajectory Fusion 241 module can fuse associated trajectories from each tracking modality to generate a more accurate and continuous track for each person. Remaining discontinuities can then be interpolated, and the resulting track stored as shopper profile data in the In-Store Shopper DB 220.

The Shopper Data Association 242 module can then merge the fused trajectory with face and body feature data as well as demographics data obtained by the At-Door Shopper Detector 210 process. This associated data can form new shopper profile data that can be stored in the In-Store Shopper DB 220. The Trajectory-Transaction Data Association 243 module can then associate the new shopper profile data with transaction (also called Point of Sale or PoS) data from the PoS DB 250. So, while the trajectory can indicate where the shopper has traveled through a store, the association with transaction data can indicate what items were actually purchased during the trip.

The Shopper Decision Tracker 270 can then use data from the shopper's trip in order to determine whether the decision for each item purchased was made at-shelf or pre-shelf. Results of this determination are then used to update the Brand Buyer DB 280. Data that has been aggregated across many shoppers' trips in the Brand Buyer DB 280 can then be used by the Analytics Generation 290 module to provide advanced metrics and analysis about the categories and brands purchased.

It can be noted that while the process described for tracking shoppers is presented for tracking shoppers one at a time, the tracking to produce aggregated results across many shoppers can occur continuously, for all shoppers, over time. Data can be collected from a single location, or across many locations, and then aggregated into the Brand Buyer DB 280 for further analysis.

More details for each module will be provided in later sections.

Shopper Profile Data

In this section, we describe the Shopper Profile Data (SPD) that can consist of a set of different types of information we collect and analyze from shoppers. The SPD can further comprise three classes of data: Shopper ID Vector (SIV), Shopper Segment Data (SSD), and Shopper Behavior Dataset (SBD). FIG. 4 illustrates the Shopper Profile Data 300 components.

The Shopper ID Vector (SIV) 301 can refer to as a set of unique features that allow us to recognize a shopper among others. That includes a set of features that are unique over either long-term or short-term. The features of a shopper that are unique for a long-term basis (i.e., unique in multiple visits to stores over time) can include the face features and the MAC address of the radios of the mobile devices that the shopper carries. Such long-term unique features can be referred to as the Global ID Vector. The features that are unique only for a short-term basis (i.e., unique only during a single trip to a store) can include the body features such as body appearance. Such short-term unique features can be referred to as the Local ID Vector.

The Shopper Segment Data (SSD) 302 can be referred to as a set of features that can characterize a shopper so as to allow the shopper to be classified into a segment in the population. The SSD can be further bifurcated into the physical and behavioral segment data. The physical segment data can be extracted based on the physical characteristics of a shopper, including height, obesity, and demographics such as gender, age, and ethnicity. The behavioral segment data can describe a shopper's preference, tendency, and style in shopping, including brand loyalty, organic food preference, etc. The behavioral segment data is supposed to be derived from a set of measurements about the shopper, which is collected in the Shopper Behavior Dataset.

The Shopper Behavior Dataset (SBD) 303 can be a storage of all raw measurements and low-level metrics for a shopper. The low-level metrics, which can be called Shopper Metrics, can include per-week and per-month frequency of shopping visits to a store or to all stores, per-category and per-store time spent, per-category and per-store money spent, etc. The raw measurements for a shopper can be collected as a list of TripVector, where a TripVector of a shopper can be a collection of physical and contextual attributes of a shopper's single trip to a store and the Point-of-Sale (PoS) data. The physical attributes can describe the shopper's physical states, consisting of (1) a trajectory of a shopper, described by a tuple (t, x, y) and (2) the physical states of the shopper including gesture, head orientation, mobile device usage mode, etc. The contextual attributes can describe any interactions made between a shopper and the surrounding marketing elements of a store such as displays and items, for example, visual attention, physical contact, and more high-level various shopping actions including comparing products, reading labels, waiting in a line, etc.

At-Door Shopper Detector

The best place to capture a shopper's face in a retail store can be the entrance and exit area. Because all the shoppers should pass through a relatively narrow pathway and doors, their faces tend to be directed toward a single direction. Therefore, we can assume that at least a camera can be mounted around such entrance and/or exit area and capturing the shoppers' faces and body appearances.

Figure 5:
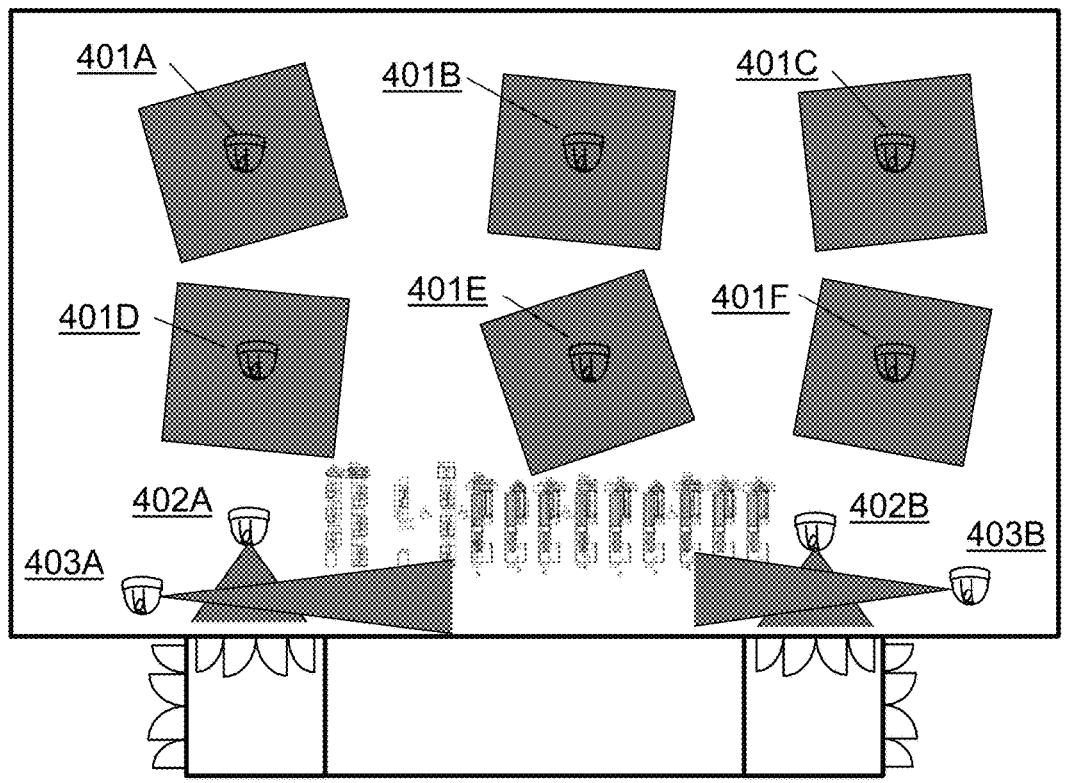
FIG. 5 shows an example of a sparse camera deployment.
Figure 6:
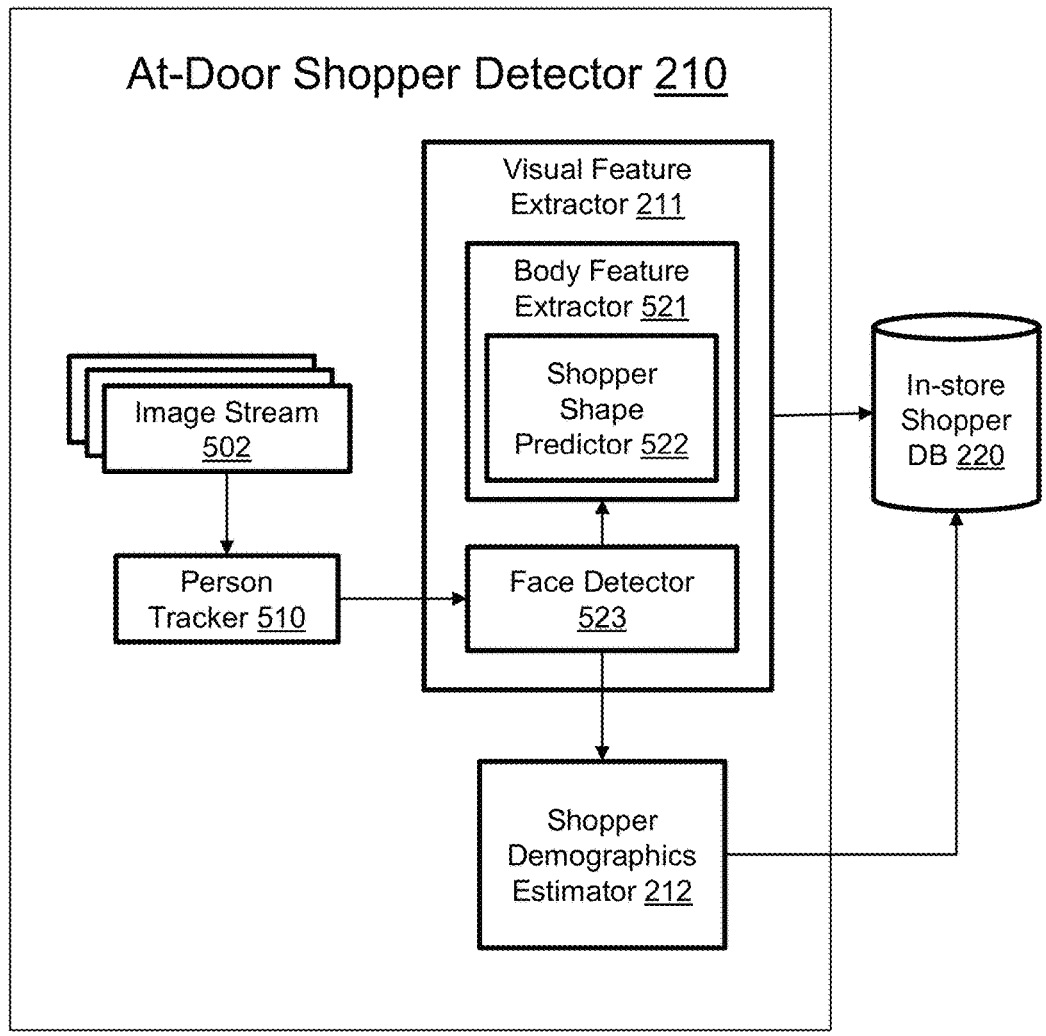
FIG. 6 shows an example block flow diagram of the At-Door Shopper Detector module.

FIG. 5 shows a sparse configuration camera deployment. In the sparse configuration, cameras 401A-F can capture non-overlapping portions of the retail store, and other cameras can be installed around the entrance and exit 402A-B and 403A-B. The cameras 401A-F, 402A-B, and 403A-B can be configured to capture a constant stream of images. FIG. 6 shows an example of the At-Door Shopper Detector 210. For each image frame from the Image Stream 502, the Person Tracker 510 module can search the image to find and track any person using a single or combined features like Histogram of Oriented Gradient (HOG), color histogram, moving blobs, etc. For each detected region where a person is likely to be present, the Face Detector 523 module can search to find a human face. The detection of a face can imply there is shopper present. For each detected face, if an instance of shopper profile data (SPD) has not been created for this tracked person yet, then the shopper's shopper profile data (SPD-1) can be created in the In-store Shopper DB 220. Note that the shopper profile data created can be labeled as SPD-1 since there are multiple modules that can create a shopper profile data. To distinguish such different shopper profile data, they can be labeled with different numbers. The detected face can then be added to the corresponding SPD-1 as a part of the Global ID Vector whether or not the SPD-1 is just created or already exists.

Upon detection of a face, the Body Feature Extractor 521 can also estimate the area of the shopper's upper and lower body using the Shopper Shape Predictor 522 based on the detected face location as a part of the Visual Feature Extractor 211. Then the Body Feature Extractor 521 can extract the body features of the shopper from the estimated shopper body area in the input image. The extracted body features can be added to the corresponding SPD-1 as a part of the Local ID Vector.

Once the tracking for a shopper in this module is completed, then all of the detected faces in the SPD-1 can be fed into the Shopper Demographics Estimator 212. The Shopper Demographics Estimator 212 can estimate the gender, age group, and ethnicity of the shopper based on the multiple faces and return back the estimation results with corresponding confidence level. The details of the Shopper Demographics Estimator 212 module will be further elaborated in the following section. The estimated demographics results can be updated into the physical segment data in the corresponding SPD-1, stored in the In-store Shopper DB 220.

Shopper Demographics Estimator

Figure 7:
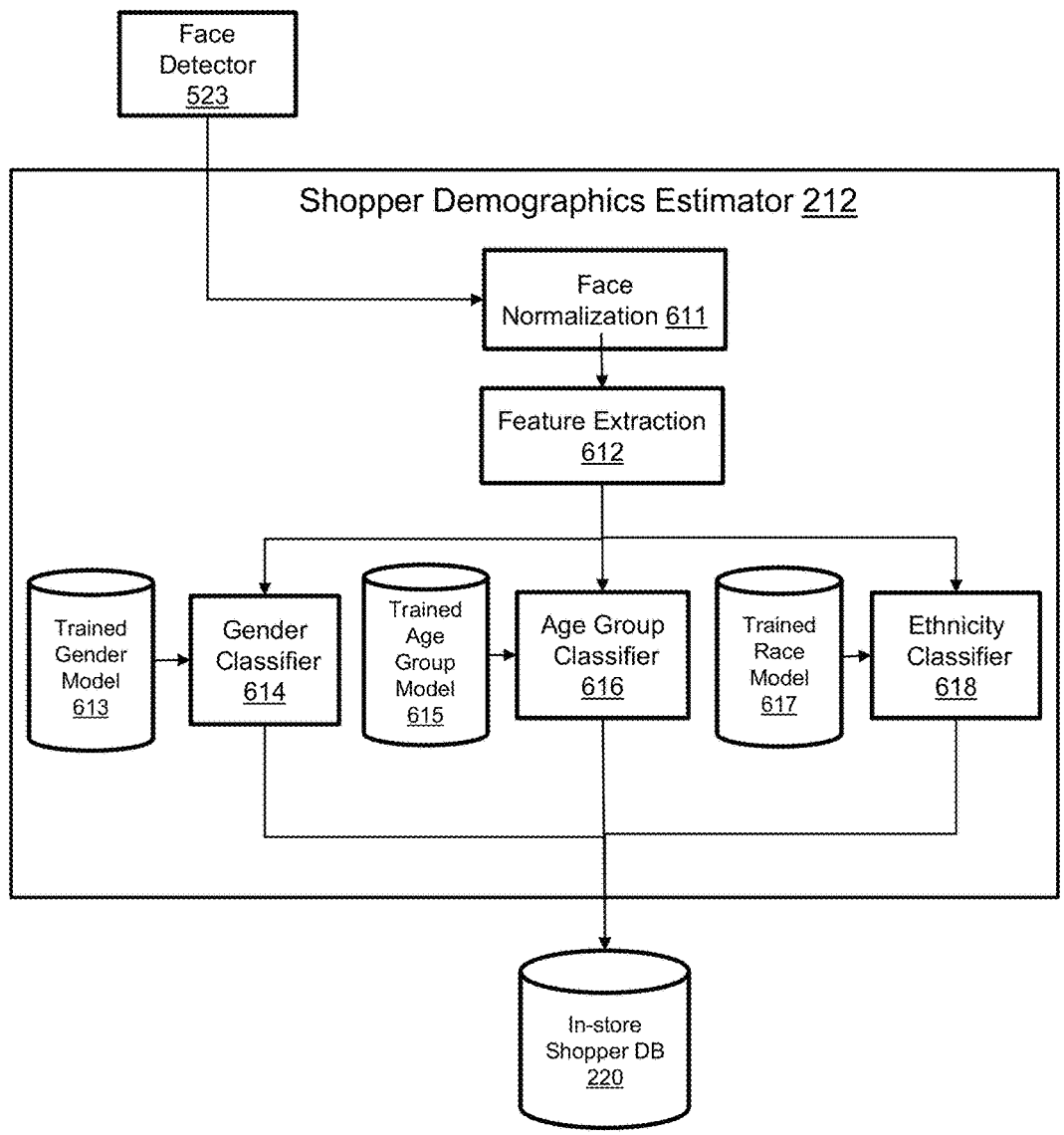
FIG. 7 shows an example block flow diagram of the Shopper Demographics Estimator module.

An example block flow diagram for the Shopper Demographics Estimator 212 is shown in FIG. 7. When a tracker is finished to track a shopper with a single or multiple face images (via the Face Detector 523), the Shopper Demographics Estimator 212 can result in three labels of demographics in terms of gender, age group, and ethnicity. For each label, it can have its own confidence value indicating how accurate the label output is.

For every face image, the Shopper Demographics Estimator 212 can have a major role to estimate the class label with a confidence value. This value can be used for aggregating the estimate of multiple face images with the same shopper ID by, for example, the weighted voting scheme.

The Shopper Demographics Estimator 212 can consist of three processes: Face Normalization 611, Feature Extraction 612, and classification in association with each demographics category such as gender (via the Gender Classifier 614), age group (via the Age Group Classifier 616), and ethnicity (via the Ethnicity Classifier 618). Exemplary details of each process is described as follows.

The Face Normalization 611 can be a process for normalizing the scale and rotation of a facial image to the fixed size and frontal angle. Like a preprocessor, this step can be necessary to associate an input image to the classifier model which is pre-trained with a fixed size and angle. For example, the scale and rotation parameters can be estimated by Neural Network which is trained from various poses and scales generated offline.

Next in the process, a proper feature, such as gray-scaled intensity vector, color histogram, or local binary pattern, can be extracted from the normalized face using the Feature Extraction 612 module. The extracted feature can be given for an input of each demographics classifiers.

Then, classification for each category can be done by help of the pre-trained model (utilizing the Trained Gender Model 613, Trained Age Group Model 615, and Trained Race Model 617) such as the Support Vector Machine which can provide the optimal decision boundary in the feature space. In this case, the final decision can be determined based on a confidence value that is computed on the closeness to the decision boundary in the feature space. Likewise, the confidence value can be decreased as the input is getting closer to the decision boundary.

Lastly, if multiple faces are available to a tracked shopper, the weighted voting can be straightforwardly applied to determine the final demographics labels. The output of the Shopper Demographics Estimator 212 can be saved in the In-Store Shopper DB 220 as updated shopper profile data (SPD-1). In another embodiment, a face fusion-based approach may be employed before determining the final demographics label, which fuses multiple faces into a single representative face by, for example, averaging the faces.

Multi-Modal Shopper Tracker

Multi-modal shopper tracker 230 can consist of two individual shopper trackers with different modalities: vision-based shopper tracker (which will be referred to as the Vision Tracker 231) and mobile signal-based shopper tracker (which will be referred to as Mobile Tracker 232). Each shopper tracker can track shoppers and produce shopper trajectories independently and later their shopper trajectories can be integrated in the Multi-modal Shopper Data Associator 240 module for the same shoppers.

Although the algorithms and methods are described with respect to Wi-Fi signal-based tracking, it should be understood that the mobile signal-based tracking can be applied and extended to other mobile signals such as Bluetooth.

1. Vision Tracking

For vision-based tracking 231, a set of cameras can be deployed in an area of interest where the sensing ranges of the cameras 104 A-D as a whole can cover the area with a level of density as shown in FIG. 2.

The cameras can be deployed in such a way that the sensing range of a camera does not have to be partially overlapped with that of other cameras. Any target that comes out of a camera view and enters in another camera view can be associated by the in-store shopper re-identifier. Each single camera can run the vision-based tracking algorithm.

Vision-Based Tracking Algorithms

Figure 8:
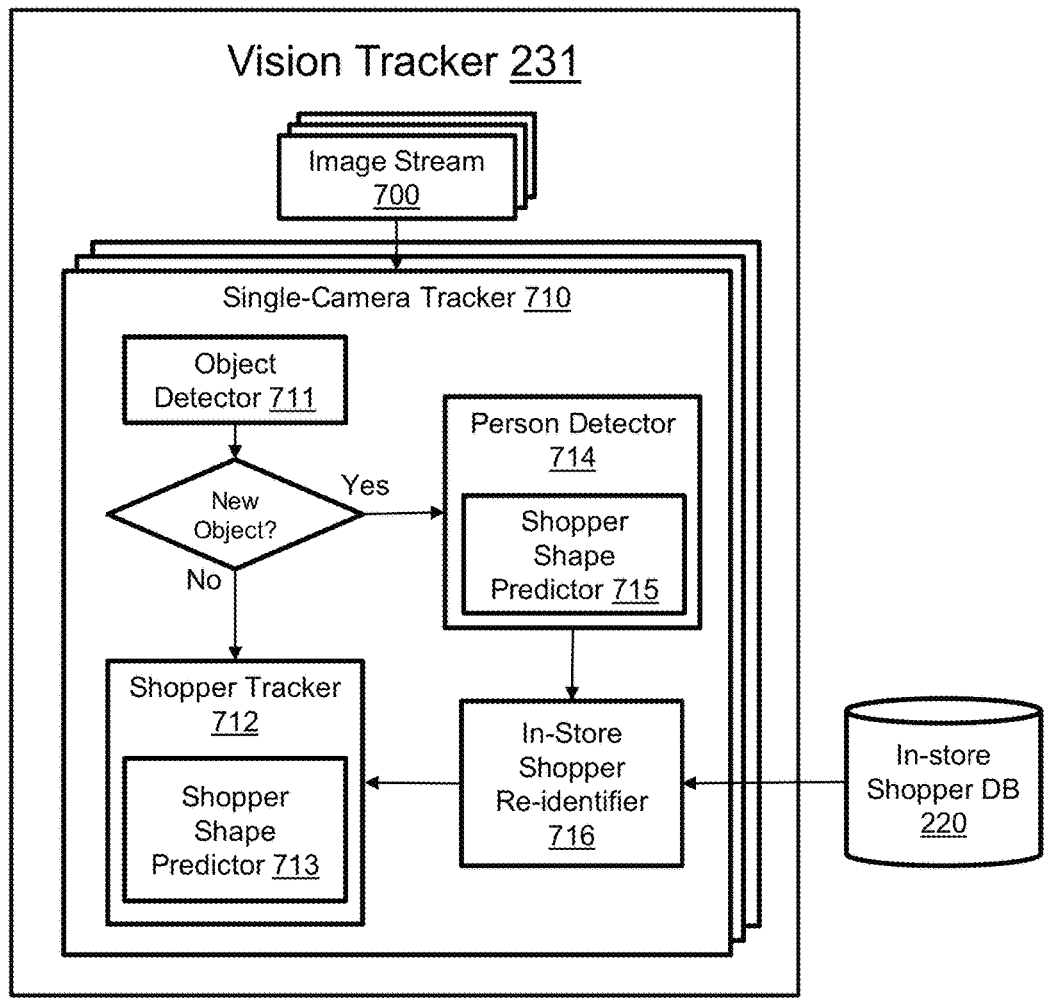
FIG. 8 shows an example block flow diagram of the Vision Tracker module.

FIG. 8 shows an exemplary embodiment for the vision-based tracking 231 method. The image stream 700 from deployed cameras 104 A-D can be given to the Single-Camera Tracker 710, first arriving at the Object Detector 711 module. The Object Detector 711 can then detect any blobs that constitute foreground activity and can create a list of foreground blobs. An embodiment of the object detector could be using a background subtraction algorithm. After that, the Shopper Tracker 712 can update the list of the existing shopper tracks (which includes time and estimated locations of the shoppers) for the new image frame. In the Shopper Tracker 712, each tracker for an existing shopper can make a prediction on the shopper location for the new image frame. For each predicted shopper location, the Shopper Shape Predictor 713 can first predict the shape of the shopper based on the predicted shopper location and the pre-learned camera calibration (calibration process is described in the Sensor Calibration section below) parameters. The camera calibration parameters can be used to back-project the shopper shape onto the camera image plane. Then, a search window around the predicted shopper shape can be defined, and the location of the target in the search window can be determined by finding the best matching regions to the existing target feature. For example, a mean-shift tracker with HSV-based color histogram can be used to find the precise location of the updated target. The new target location can be used to update the target states of the tracker and thus to update the corresponding shopper profile data (SPD-2) in the In-store Shopper DB 220. Any blob detected in the Object Detector 711 that overlaps with the updated target tracks can be considered existing target activity and excluded from considering newly detected targets. For any remaining blob, it can run the Person Detector 714 to confirm the newly detected blob is a shopper blob. In the Person Detector 714, the Shopper Shape Predictor 715 can be used to generate a predicted shopper shape on the camera image plane at the blob location on the image using the pre-learned camera calibration parameters. A potential shopper around the detected blob can be found using the predicted shopper shape mask. The body features of the found shopper region can then be extracted based on the predicted shopper shape on the camera image plane and can be determined using a classifier if the blob is a human blob. If so, then a new shopper profile data can be created.

In a case where a same shopper is tracked by multiple cameras at the same time due to their overlapping field of view, the cameras may collaborate together to fuse the measurements about the same shopper from different cameras by exchanging the measurements, including the location and the extracted visual features. Such collaborative multi-camera tracking could generate a single and merged trajectory for a shopper over the multiple cameras with the same shopper profile data (SPD-2). This can be made possible by using the pre-learned camera calibration information that enables the back-projection of the same physical points onto different cameras. Given an assertion that different cameras are tracking the same shopper and potentially with a camera clustering algorithm, the shopper tracking information estimated from a camera (e.g., a cluster member camera) can be handed over to the tracker that runs on another camera's images (e.g., a cluster head camera). Besides such measurement fusion-based multi-camera tracking, in another embodiment, a trajectory fusion-based multi-camera tracking approach may be employed, which combines multiple trajectories about the same shopper that is created individually from different cameras.

The In-store Shopper Re-identifier 716 then can compare the newly created shopper profile data (SPD-2) with the existing shopper profile data (SPD-2) stored in the In-store Shopper DB 220 to see if there is any existing shopper profile data (SPD-2) that has the matching body features. If the newly created shopper profile data (SPD-2) matches existing shopper profile data (SPD-2), then it can retrieve the existing shopper profile data from the In-store Shopper DB 220. If the newly created shopper profile data (SPD-2) does not match to any existing shopper profile data (SPD-2), it can create a new shopper profile data (SPD-2) in the In-store Shopper DB 220 and also can instantiate a new target tracking instance in the Shopper Tracker 712.

In-Store Shopper Re-Identifier

Figure 9:
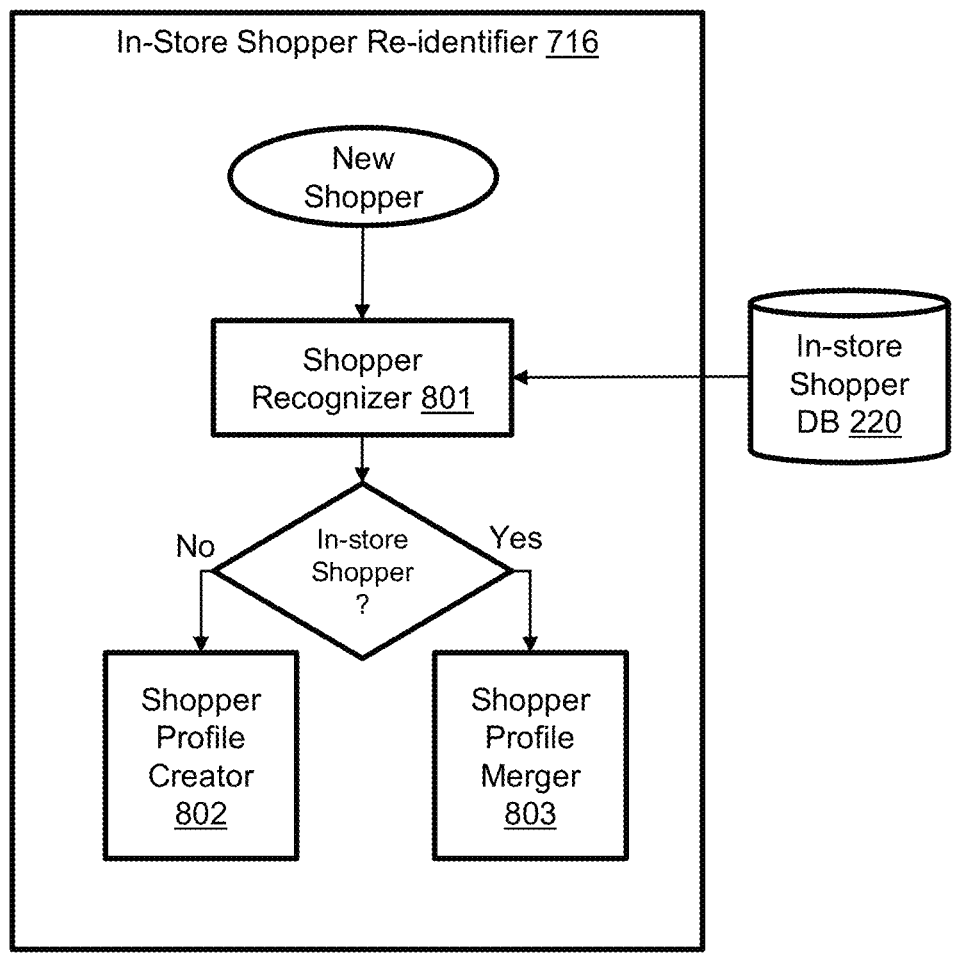
FIG. 9 shows an example block flow diagram of the In-Store Shopper Re-identifier module.

In each camera, when a new human blob is detected, the In-store Shopper Re-identifier 716, as illustrated in FIG. 9, can search for a matching shopper profile data from the In-store Shopper DB 220. Identifying the corresponding shopper profile data from the In-store Shopper DB 220 can be carried out by the Shopper Recognizer 801 using a classification algorithm. An embodiment of the Shopper Recognizer 801 can include the visual feature representation of the human blob and classification algorithm. The visual features should be invariant to the variations in the appearance and motion of the targets in different view in order to handle the case of random target movement and pose change. Such visual features can include color histogram, edges, textures, interest point descriptors, and image patches. Classification algorithms can include support vector machine (SVM), cascade classifier, deep-learning based neural networks, etc. If an existing shopper profile data is found, then it can be retrieved from the In-store Shopper DB 220, and merged with the new shopper profile data using the Shopper Profile Merger 803. If there is no matching shopper profile data, then a new temporary shopper profile data (SPD-2) can be created by the Shopper Profile Creator 802, and stored in the In-store Shopper DB 220.

2. Wi-Fi Tracking

FIG. 2 shows an exemplary embodiment for Wi-Fi sensor deployment. For Wi-Fi based tracking, we can also assume that a set of Wi-Fi signal sensors 106 A-C, which will also be referred to as access points or simply APs, can be deployed in an area of interest where the sensing range of the set of APs 106 A-C can cover the area with a certain sensing density p, where the sensing density p is defined as the level of overlap of the sensing range of the APs 106 A-C of the area. If an area is covered by APs 106 A-C with a density p, then it can mean that any point in the area is covered by at least p number of APs at any time. The value of p can be determined differently depending on the employed algorithms and environments. For example, for trilateration based Wi-Fi device localization schemes, p could be at least three while for triangulation based ones, p could be at least two. In a preferred embodiment where trilateration can be used as a localization method, the APs 106 A-C are usually deployed with the value of p being four, which is empirically determined to be a balanced tradeoff between cost and robustness.

Figure 10:
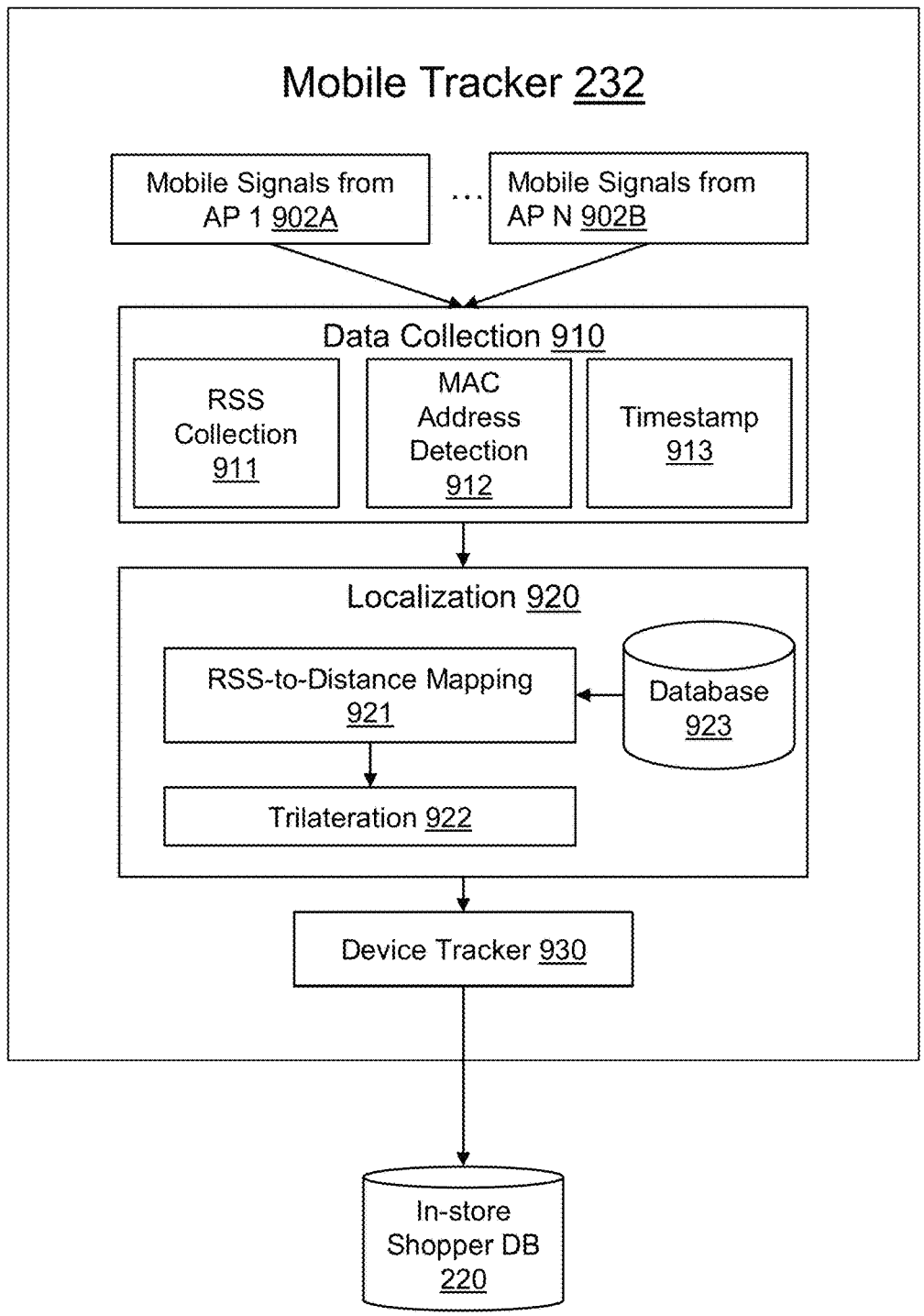
FIG. 10 shows an example block flow diagram of the Mobile Tracker module.

The deployed APs 106 A-C can be calibrated (calibration process is described in the Sensor Calibration section below) in terms of Received Signal Strength-to-distance, RSS-to-distance, or radio fingerprint-to-location mapping. Both RSS-to-distance and radio fingerprint-to-location mapping are methods well-known in the art. FIG. 10 shows an exemplary block flow diagram of the Mobile Tracker 232 module. In one embodiment, localization 920 can be calculated using an RSS-to-distance mapping 921. Due to the wireless signal propagation characteristics, the power of the signal decreases as the source of the signal gets farther. The relationship between the RSS and the distance from the source can be estimated by constructing a mapping function based on a set of ground truth measurements. Using the RSS-to-Distance Mapping 921 function, a trilateration-based localization 922 can be performed if there are at least three RSS measurements available for a person at a given time instant. The RSS-to-Distance Mapping 921 may be learned without any prior data if a self-calibration method is employed, which takes advantage of already-known locations of APs and their signals that are stored in a Database 923. In another embodiment, a radio fingerprint for an area of interest can be generated using a set of measurements from multiple APs for a Wi-Fi source at known positions. The radio fingerprint-to-location mapping can be used to localize a source of Wi-Fi signals.

Wi-Fi Based Tracking Algorithms

A computing machine and APs 106 A-C can track the mobile signals 902 A-B of persons of interest in the Mobile Tracker 232 module. Given N number of APs 106 A-C deployed in an area of interest with a certain density p, each AP can be constantly searching for wireless signals 902 A-B of interest in a certain channel or multiple channels simultaneously if equipped with multiple radios. The AP with a single radio may hop over different channels to detect such wireless signals 902 A-B that could be transmitted from mobile devices present in the area. APs 106 A-C can search for wireless signals 902 A-B because mobile devices are likely to look for an AP for potential connection that may be initiated in the near future if the user of the mobile device attempts to use a wireless connection.

To get and maintain a list of nearby APs 106 A-C, most mobile devices 102 usually perform a type of AP discovery process if the wireless transmitter is turned on. The mobile devices tend to transmit a short packet periodically (i.e., Probe Request in the 802.11 standard) with a certain time interval between transmissions to discover accessible APs nearby. The time interval depends on (1) the type of the operating system (OS) of the mobile device (e.g., iOS, Android, etc.), (2) the applications that are currently running actively or in background, and (3) the current state of the mobile device, for example, whether the display of the mobile device is on or off. In general, if the display of a mobile device is on, then the OS puts the device in an active state, resulting in the interval getting shorter and transmission rate being increasing. If the display is off, then the OS would gradually putting the device into a sleep state through multiple stages.

Once a packet is transmitted from a mobile device 102 via wireless communications or mobile signals 902A-B, then a subset of APs 106 A-C can detect the packet around the mobile device if the APs happen to be listening at the same or an adjacent channel. The APs 106 A-C at an adjacent channel may be able to detect the packet since a Wi-Fi channel spectrum spans wider than the frequency width allocated for a channel. When a packet is detected at an AP 106 A-C, a data collection 910 process can occur where the PHY layer and MAC layer information of the packet can be retrieved which can include the Received Signal Strength (RSS) 911, MAC address 912, and a timestamp 913 of the packet transmission of the sender. The value of the RSS may be available in terms of the RSS Indicator (RSSI), and this value may vary significantly even during a short time period due to various signal distortions and interferences. To reduce such noise and variation the RSS values can undergo a noise reduction process during a set of consecutive receptions. In case of multiple mobile devices present, the unique MAC address 912 or ID of mobile devices 102 can be used to filter and aggregate the measurements separately for each individual mobile device.

In the localization 920 method where RSS-to-Distance Mapping 921 can be used, the values of the RSS readings can be converted to a real-world distance from each AP 106 A-C by utilizing the pre-learned RSS-to-Distance Mapping 921 function for each AP 106 A-C, which could be stored in a database 923. If there are distance measurements from at least three different APs 106 A-C available, then a single location can be estimated by employing a trilateration-based approach 922. The estimated current location can then be fed into a tracker (e.g., Kalman filter and Particle filter) with the unique ID, the MAC address 912, so that the optimal current location and thus trajectory can be estimated in a stochastic framework in the mobile Device Tracker 930 module. The trajectory can then be stored in the In-store Shopper DB 220 as shopper profile data (SPD-3) with the specific MAC address.

Multi-Modal Shopper Data Associator

In this section, all of the independently made shopper profile data from different tracking modules can be associated and integrated through the Multi-modal Shopper Data Associator 240 module.

1. Multi-Modal Trajectory Fusion

FIGS. 11A-C show an example of the tracking results from vision-based tracking and mobile signal based tracking. FIG. 11A shows an example of person being tracked with her mobile device by vision and Wi-Fi sensors as described in FIG. 2. FIG. 11B reveals an example of tracking said person through vision sensors. The vision tracking can yield many trajectory fragments. Due to the dynamic nature of visual features of the same person in different environmental conditions, it is highly likely that the trajectories of the single person that are generated using vision-based tracking (which will be referred to as the vision-based trajectories or simply VTs) are possibly fragmented into multiple segments of partial trajectories due to potential tracking failures. In case of multiple persons in the same area, it is usually challenging to determine which VTs correspond to which persons. In spite that it can be difficult to associate the same ID for a longer period of time across different cameras especially when there are cluttered backgrounds or visually-similar irrelevant objects nearby, the vision-based tracking can provide high-resolution and accurate tracking. FIG. 11C shows an example of tracking said person using Wi-Fi sensors. The resulting trajectory is consistent and unbroken. However, Wi-Fi based trajectories (which will be referred to as the Wi-Fi based trajectories or simply WTs) resulting from the mobile trajectory generation can suffer from low sampling frequency and low spatial resolution although it is featured by a unique and consistent ID.

Figure 12:
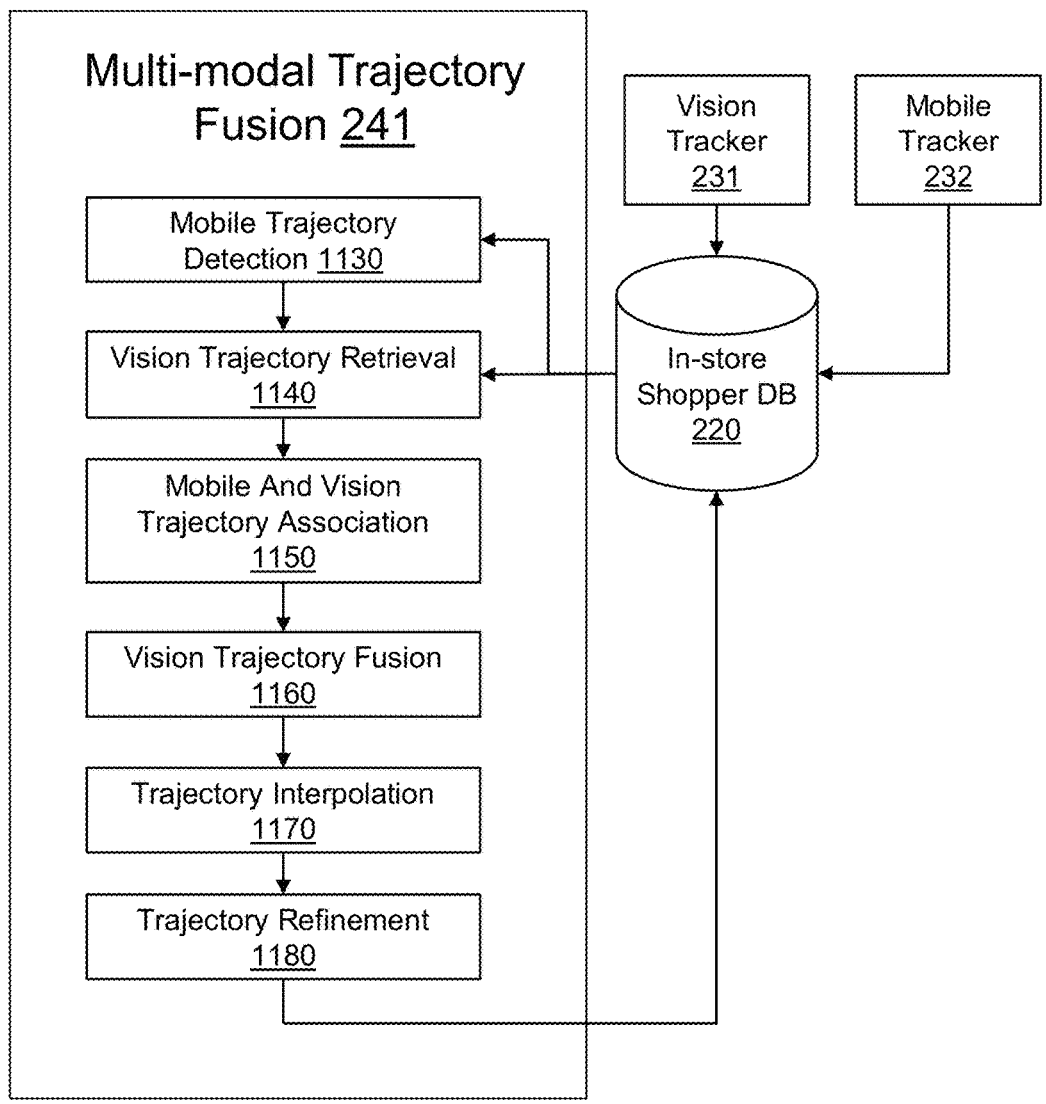
FIG. 12 shows an example block flow diagram of the Multi-Modal Trajectory Fusion module.

FIG. 12 shows an exemplary embodiment of the Multi-modal Trajectory Fusion 241 process. By combining these two approaches using the Multi-modal Trajectory Fusion 241 approach in a preferred embodiment of the present invention, multiple persons can be tracked more accurately in terms of localization error and tracking frequency and more persistently than would be possible by a single Wi-Fi or vision based tracking.

Given that a set of cameras 104 A-D and APs 106 A-C are deployed capturing measurements in an area of interest, the Mobile Tracker 232 module may detect when a person 100 carrying a mobile device 102 with its wireless transmitter turned on (which will be referred to as a mobile-carrying person) enters the area by detecting radio traffic from a new source and/or by confirming that the source of radio traffic enters a region of interest. Upon the detection of the entrance of a new mobile-carrying person, the system can track the mobile-carrying person within the region of interest (e.g., the retail space of a mall). The Mobile Tracker 232 module can also detect the exit of the mobile-carrying person by detecting an event in which the period that the radio traffic is absent is longer than a threshold of time and/or the source of the radio traffic exits the region of interest. The trajectory in between the entrance and exit of the mobile-carrying person can be inherently complete and unique due to the uniqueness of the MAC address of the mobile device.

Independent of the mobile signal-based tracking, any person who enters the area where a set of cameras are deployed may be tracked by each individual camera 104 A-D or by the multiple cameras 104 A-D collaboratively possibly while forming a cluster among them in the Vision Tracker 231 module. A person can be persistently tracked with a certain level of uncertainty if there are no significant visually similar objects in the same field of view of the cameras resulting in a longer trajectory or more persistent tracking. Whenever a tracking failure occurs due to cluttered background or visually similar irrelevant objects, the trajectory may be discontinued, and the tracking may be reinitiated. Since the re-identification of the person may or may not be successful during the entire trip of the person within the area, multiple disjointed trajectories may be created for the same person across the trajectories. The tracking results can then be stored in the In-Store Shopper DB 220. In an embodiment, the tracking results may be in the form of a tuple of (x, y, t) with associated uncertainty or in the form of a blob data with its timestamp and visual feature vector.

Figure 13A:
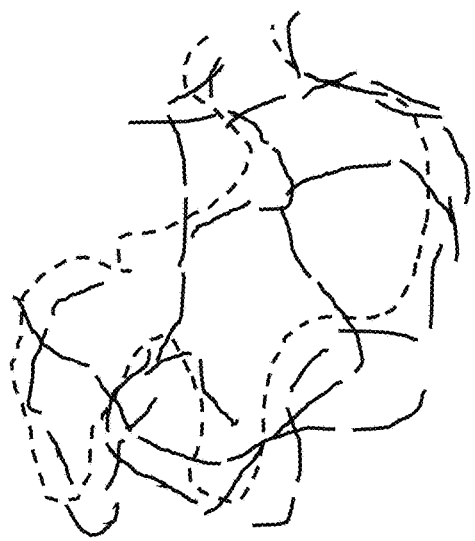
FIGS. 13A-D show an example of the multi-modal trajectory fusion process for vision and Wi-Fi trajectories.
Figure 13B:
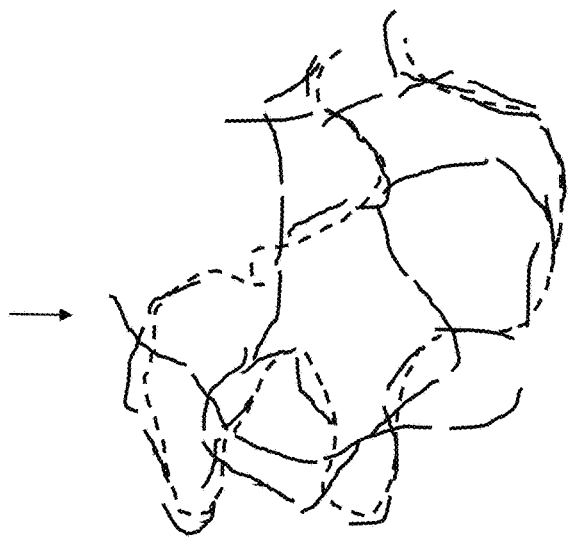
Figure 13D:
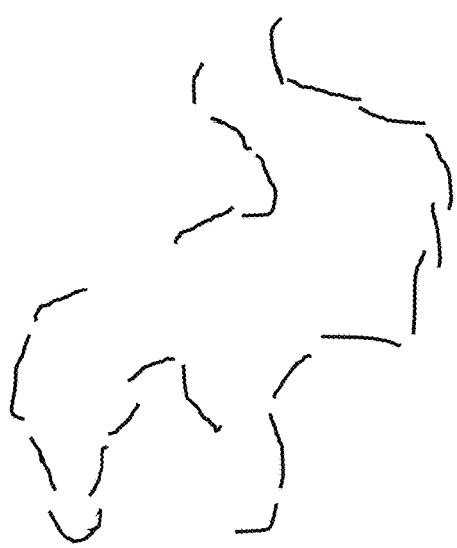
Figure 13C:
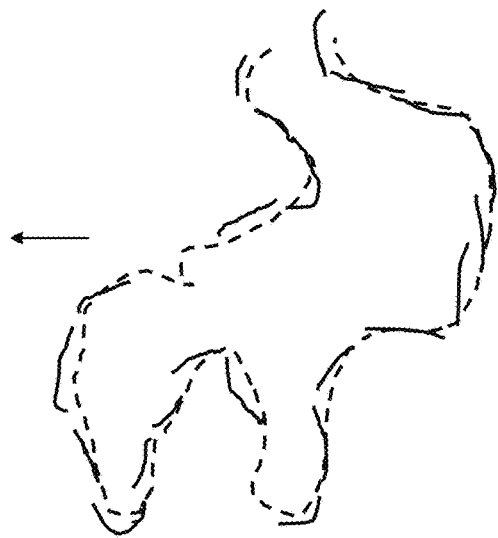

Once the complete Wi-Fi based trajectory of a mobile-carrying person (i.e., a WT as defined earlier, stored as SPD-3) is generated by the Mobile Tracker 232 module and retrieved from the In-Store Shopper DB 220 by the Mobile Trajectory Detection 1130 module, the system can identify and retrieve from a database the vision-based trajectories of persons (i.e., VTs as defined earlier, stored as SPD-2), using the Vision Trajectory Retrieval 1140 module, that are generated during when the WT is generated. These VTs can form the pool of the candidates that potentially correspond to the WT. Then, a set of VTs can be identified among the pool of the candidates by comparing the distance statistics of the VTs to the WT of the mobile-carrying person and also comparing the motion dynamics including direction and speed. This process assumes that the WT is an approximate of the actual trajectory of the mobile-carrying person and makes use of the WT as an anchor. Once the VTs (SPD-2) corresponding to the WT (SPD-3) is identified, then the unique ID of the WT can be assigned to the set of VTs, creating a new shopper profile data (SPD-4) that combines the matching VTs (SPD-2) and the WT (SPD-3). This process of identifying a set of VTs that corresponds to a WT can be called Mobile and Vision Trajectory Association 1150. FIGS. 13A-D show a detailed example of the Mobile and Vision Trajectory Association 1150. In FIG. 13A, a set of potential VT candidates can be overlaid on the WT, which is represented by the dashed line. FIG. 13B shows an example of an initial matching process between the VT candidates and the WT. FIG. 13C shows an example of the matched VTs and the WT, which are then assigned to each other with a unique identification, resulting in the exemplary trajectories shown in FIG. 13D.

The VTs in SPD-4 with the assigned unique ID can then be used as the primary source to reconstruct the trajectory of the mobile-carrying person since they can be more accurate than the WT. The identified VTs (which are actually a set of fragmented VTs for a single person) can then be combined together to generate a single trajectory in case there are multiple vision measurements for the same target at the same time instance. In an embodiment, a Kalman or Particle filter may be used to combine multiple measurements. This process of integrating multiple VTs to reconstruct a single trajectory can be called Vision Trajectory Fusion 1160.

Vision measurements may not be available for longer than a threshold due to various reasons because, for example, (1) some of the correct vision measurements may be discarded in the ID association process, (2) some of the cameras may not be operated correctly, (3) the background may be changed abruptly, (4) some regions are not covered by any camera, etc. In such cases, the combined trajectory that is constructed only from the vision measurements may have missing segments in the middle. The missing segments can be reconstructed by retrieving the missing segment from the WT stored in the database since the WT has the complete trajectory information although its accuracy may be relatively low. This process can be called Trajectory Interpolation 1170. Since the point-to-point correspondence between WT and VTs can be found in the Mobile and Vision Trajectory Association 1150 process, the exact segments in the WT corresponding to the missing segments can be identified. The found segments in the WT can be excerpted and used to interpolate the missing parts of the combined trajectory resulting in a single and complete final trajectory (which will be referred to as the fused trajectory or simply FT). It can be made possible since in nature the WT is a complete trajectory of the person albeit with a low resolution.

The above Trajectory Interpolation 1170 process assumed that a Wi-Fi trajectory (i.e., WT) can be generated with a low sampling frequency, yet it may be the case that there are multiple long periods of time where no Wi-Fi measurements are received. In practical cases, the pattern of Wi-Fi signal emission from a mobile device is a burst of multiple packets often followed by a long period of sleep due to the energy conservation schemes in the operating system of the mobile device. Thus, it is often the case that there are multiple periods where no Wi-Fi signals are detected for longer than, say, 30 seconds, resulting in missing holes in Wi-Fi trajectories.

In an embodiment, such missing holes may be estimated and interpolated by taking into account both the store layout and the other shoppers' trajectories in a database by inferring the most probable path taken using a learning machine and based on the other shoppers who followed the similar path of the shopper that are actually measured before and after the missing parts of the trajectory.

Once the Trajectory Fusion and Interpolation process is completed, we may further refine the final trajectory taking into account the store floor plan and layout that describes the occupancy map of the fixtures and other facilities/equipments where shopper trajectories must not exist. In an embodiment, a shopper trajectory may be modified in such a way that it detours such obstacles with a shortest trip distance. If there are multiple such detours are available which has similar trip distances, the past history of other shoppers may be utilized to estimate more preferred and likely path that the shopper may take. This process can be called Trajectory Refinement 1180. The results of this process can be new shopper profile data (SPD-4), which can then be used to update the In-store Shopper DB 220.

2. Shopper Data Association

Figure 14:
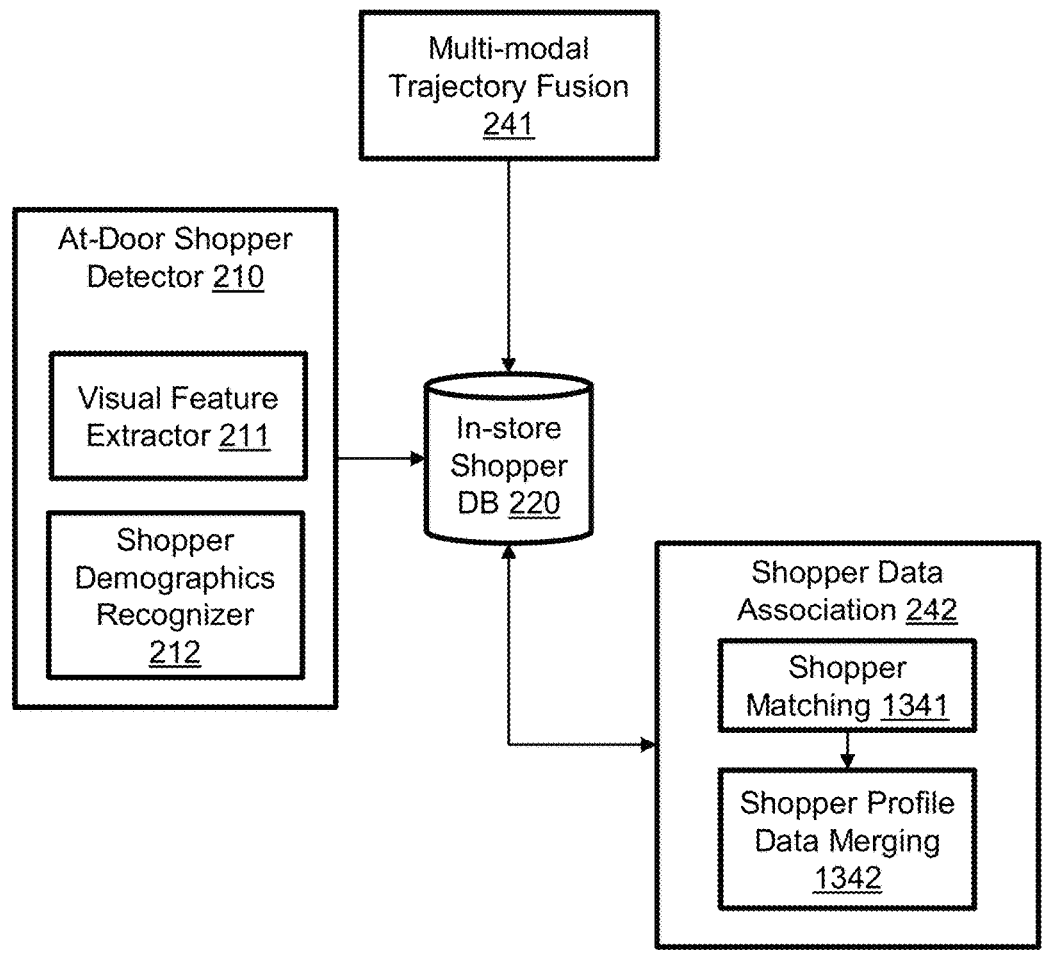
FIG. 14 shows an example block flow diagram of the Shopper Data Association module.

FIG. 14 shows an example of the Shopper Data Association 242 module. This process can merge the shopper profile data (SPD-1) from the At-Door Shopper Detector 210 with the shopper profile data (SPD-4) from the Multi-modal Trajectory Fusion 241 process creating a new shopper profile data (SPD-5) that can be stored in the In-Store Shopper DB 220.

Upon the creation of the shopper profile data (SPD-4) from the Multi-modal Trajectory Fusion 241, the Shopper Matching 1341 step can retrieve a set of shopper profile data (SPD-1) from the In-Store Shopper DB 220 that were created at about the same time when the shopper corresponding to the SPD-4 entered or exited the retail space.

Given the set of candidate matching SPD-1 to the SPD-4, the similarity of the visual features (for example, but not limited to, face and body features) and other available shopper data (for example, but not limited to, existing estimated demographics data) between them can then be computed during the Shopper Matching 1341 step. The similarity computation can be performed using any number of algorithms that would be well-known by one skilled in the art, including color histogram-based matching, texture-based matching, etc. For each instance of the shopper profile data (SPD-4) from the Multi-modal Trajectory Fusion 241 module, the best matching (i.e., most similar) At-Door Shopper Detector 210 data instance can be identified. The Shopper Profile Data Merging 1342 step can then combine the identified shopper profile data (i.e., the matching pair of SPD-1 and SPD-4) to create a new shopper profile data (SPD-5) that can be stored in the In-Store Shopper DB 220.

3. Trajectory-Transaction Data Association

Figure 15:
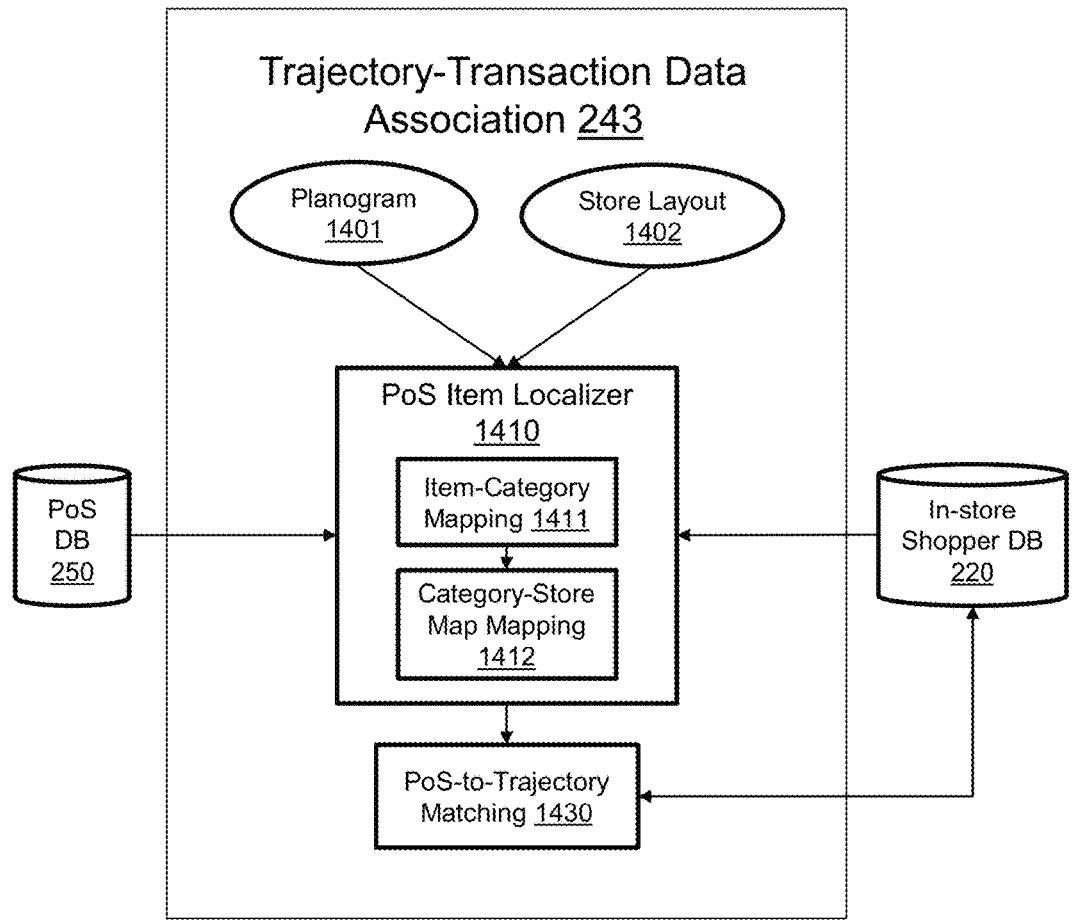
FIG. 15 shows an example block flow diagram of the Trajectory-Transaction Data Association module.

Given a complete trajectory of a shopper in a retail store that can be obtained by the Shopper Data Association 242 (which will be referred to as SDA, stored as SPD-5) process described in the previous section, the present invention can associate the given trajectory with a Point of Sale (PoS) data (which is also called transaction data or simply T-log data) that can contain a list of items purchased by a shopper. Such association process (which can be referred to as Trajectory-Transaction Data Association 243 or simply TT Association) can enable further analysis on the shopping pattern and buying behavior analysis. FIG. 15 shows an example block flow diagram of the Trajectory-Transaction Data Association 243 module.

While the trajectory data of a shopper can indicate how the shopper navigates through a store and what marketing elements the shopper has been exposed to during the shopping trip, the T-log data of the shopper can tell us what items the shopper actually purchased after a series of exposures to various marketing elements. The T-log data can be crucial to understand what products wins and fails among the competition in the shelf and the final decisions that the shopper made through a course of decision process.

FIG. 15 shows the PoS Item Localizer 1410, which can accept as inputs the Store Layout 1402 and Planogram 1401 data, in addition to the transaction data from the PoS DB 250. Given a shopper profile data (SPD-5), the PoS Item Localizer 1410 retrieves a set of transaction data that are generated about at the same time that a tracked shopper exited the store. The categories of the items in the retrieved transaction data can be identified using a pre-learned Item-Category Mapping 1411 table. The location of the identified categories of the items in the store can then be mapped using the store layout and planogram information (i.e., Category-Store Map Mapping 1412), revealing the location of the items that were picked by the shopper.

Despite the importance of T-log data in shopper behavior analysis as well as the trajectory data, it can be a challenging problem to correctly associate a T-log data with the trajectory of a shopper who made the transaction due to the lack of a consistent ID between T-log data and the trajectory. Given the list of items purchased and the timestamp that the transaction is made, however, it may be possible to find the best corresponding pair between a given shopper trajectory and a set of candidate T-log data. In this section, we present the PoS-to-Trajectory Matching 1430 module that describes how to find such best pair under the assumption that the entire store is covered by both vision and Wi-Fi sensors with a certain density for the system to be able to track shoppers in both modalities. In the later section, we will describe how this algorithm may be adapted to the cases where either modality's sensing coverage does not span the entire store. The output of this module can be shopper profile data (SPD-5) that has been updated with the corresponding T-log data.

Figure 16:
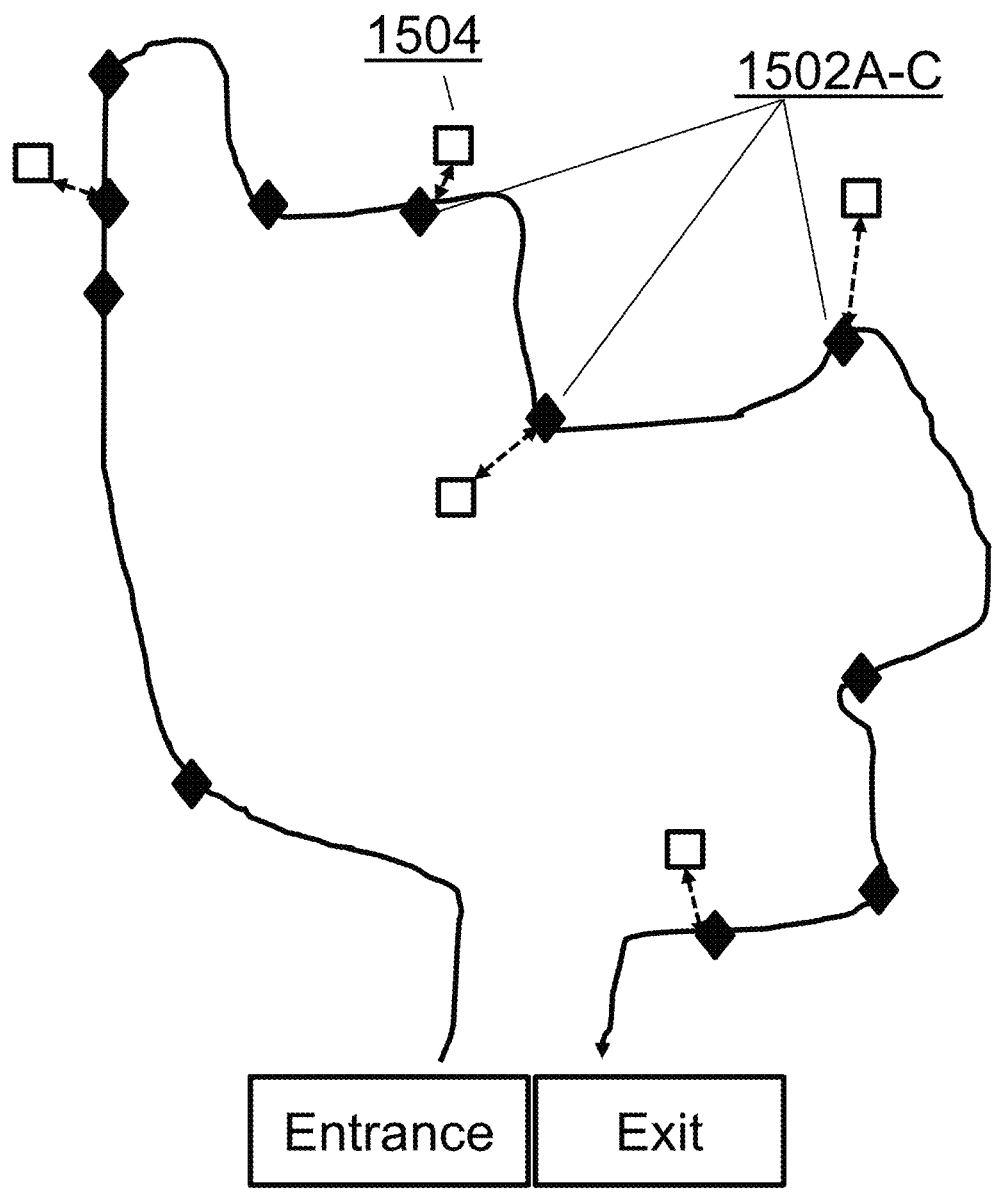
FIG. 16 shows an embodiment of a method to associate transaction log data with a fused trajectory.

FIG. 16 illustrates an example of the Trajectory-Transaction Data Association (or TT Association).

General Framework

The problem of TT Association is defined as the following:

Given that a given complete trajectory and a set of T-log data in a similar time frame, to the present invention seeks find the best corresponding pairs between them if exist.

To find a T-log data that most likely matches with the trajectory, a metric that represent the matching likelihood between the given trajectory and the T-log data needs to be defined.

Therefore, given a single complete trajectory and a single T-log data to the present invention can compute the likelihood $P_j$ that all of the items in $T_j$ are picked up along this trajectory.

To compute the likelihood for all of the items to be picked up along the trajectory, the present invention can define a metric that measures the probability that a given item $I_i$ in a given T-log data $T_j$ is picked up along the trajectory, which is called $P(I_i|T_j)$. Then, we can find $T_j$ such that j= argmax
 j   $P_j$, where $$P_j = \prod_{i=1}^{N} P(I_i | T_j).$$

When computing $P(I_i|T_j)$, the present method can introduce a new term called shopping fixation. The shopping fixation can refer to an event where there is a change of shopper's behavior, and the shopper's behavior appears to be triggered by a retail element. Shopping fixation can be determined based on the motion dynamics of a shopper. If the shopper's motion gets slower and made a U-turn or stopped, then we can assume some item caught the shopper's attention, resulting in a shopping fixation 1502A-C at the point while converting a passer-by into a shopper. $P(I_i|T_j)$ can be computed only from the closest shopping fixation 1502A-C (not a just closest point) in the trajectory to the item of interest $I_i$ 1504.

In an embodiment, $P(I_i|T_j)$ may be defined as the following: if at least a shopping fixation (which will be referred to as S) exists within a visible and reachable range r from the item, then $P(I_i|T_j)$ will be equal to 1 and otherwise 0 to ensure that every item is picked up along the trajectory.

$$P(I_i | T_j) = \begin{cases} 1, & \exists S \leq r \\ 0, & \text{Otherwise} \end{cases}$$

In another embodiment, $P(I_i|T_j)$ may be defined to make $P_j$ robust to potential errors in shopping fixation detection and shopper tracking. To accommodate such errors, $P(I_i|T_j)$ may be defined as:

$$P(I_i|T_j) = \begin{cases} 1, & \exists S \le r_1 \\ 0.5, & r_1 < \exists S \le r_2 \\ \cdots \\ 0.1, & \text{Otherwise} \end{cases}$$

where $r_1 < r_2 < \ldots < r_K$.

Instead of using a probabilistic measure, we can also solve this problem using a geometric distance statistics. In this case, the probabilistic measure $P(I_i|T_j)$ can be replaced by a distance metric di that represents the distance from the item $I_i$ 1504 to the closest shopping fixation 1502A in the trajectory $T_j$. We can then define the overall distance metric $D_j$ like the following:

$$D_j = \sum_{i=1}^{N} (d_i^j)^2$$

Using these metrics between a trajectory and a T-log data, the present invention can iterate this process over all trajectory candidates and find the one with minimum distance or maximum probability for the given T-log data.

Given the complete trajectory and its associated T-log data of a shopper with a unique ID assigned by solving the TT Association problem, the present invention has outlined a full understanding of (1) how the shopper navigates through the store, (2) what part of the aisle or category caught the attention of the shopper, and (3) what items the shopper actually purchased.

Practical Deployment: Adaptation to Four Different Configurations

Depending on the business requirements and applications, the sensor deployment may have restrictions and/or different assumptions, which requires an adaptation of the algorithms accordingly to the specific sensor deployment configuration. The present invention can adapt the framework to four different sensor deployment configurations that may be frequently encountered in various real situations. However, there could be more diverse configurations in different applications where similar adaptation may be applied. The four sensor deployment configurations are listed and classified as shown in the following table:

|  | Vision Coverage | |
|---|---|---|
| Wi-Fi Coverage | Full/Full | Full/Partial |
|  | Partial/Full | Partial/Partial |

Full coverage can mean that the union of the sensing ranges of the sensors covers the entire store while partial coverage can mean that the sensor network system covers only a part of the store such as entrance, exit, and an area of interest (e.g., an aisle or a category). FIGS. 17-20 show four different types of such configuration with two different sensing modalities.

Figure 17:
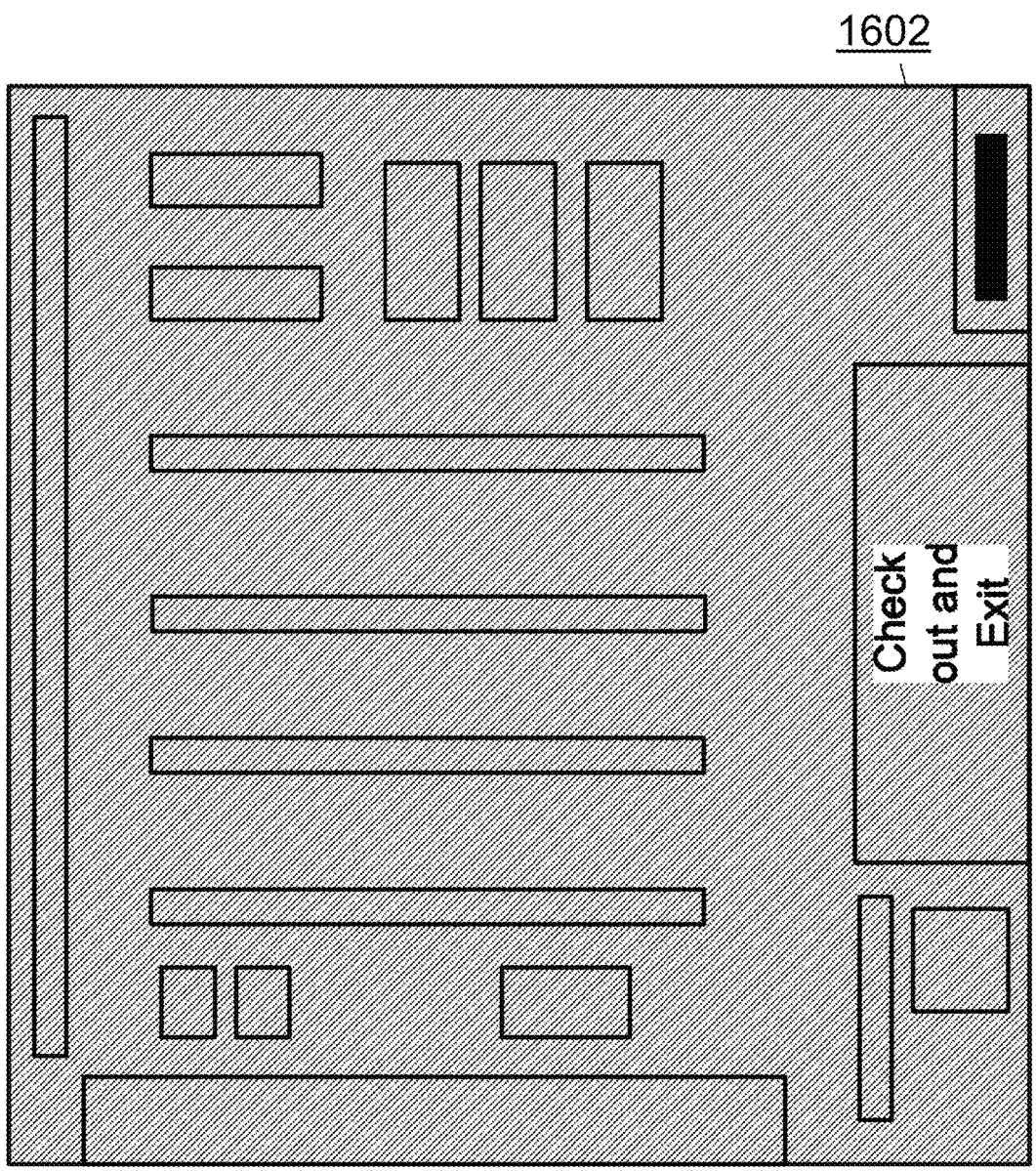
FIG. 17 shows an example of a sensor configuration where Wi-Fi and vision sensors are deployed so as to cover the entire retail space.
Figure 18:
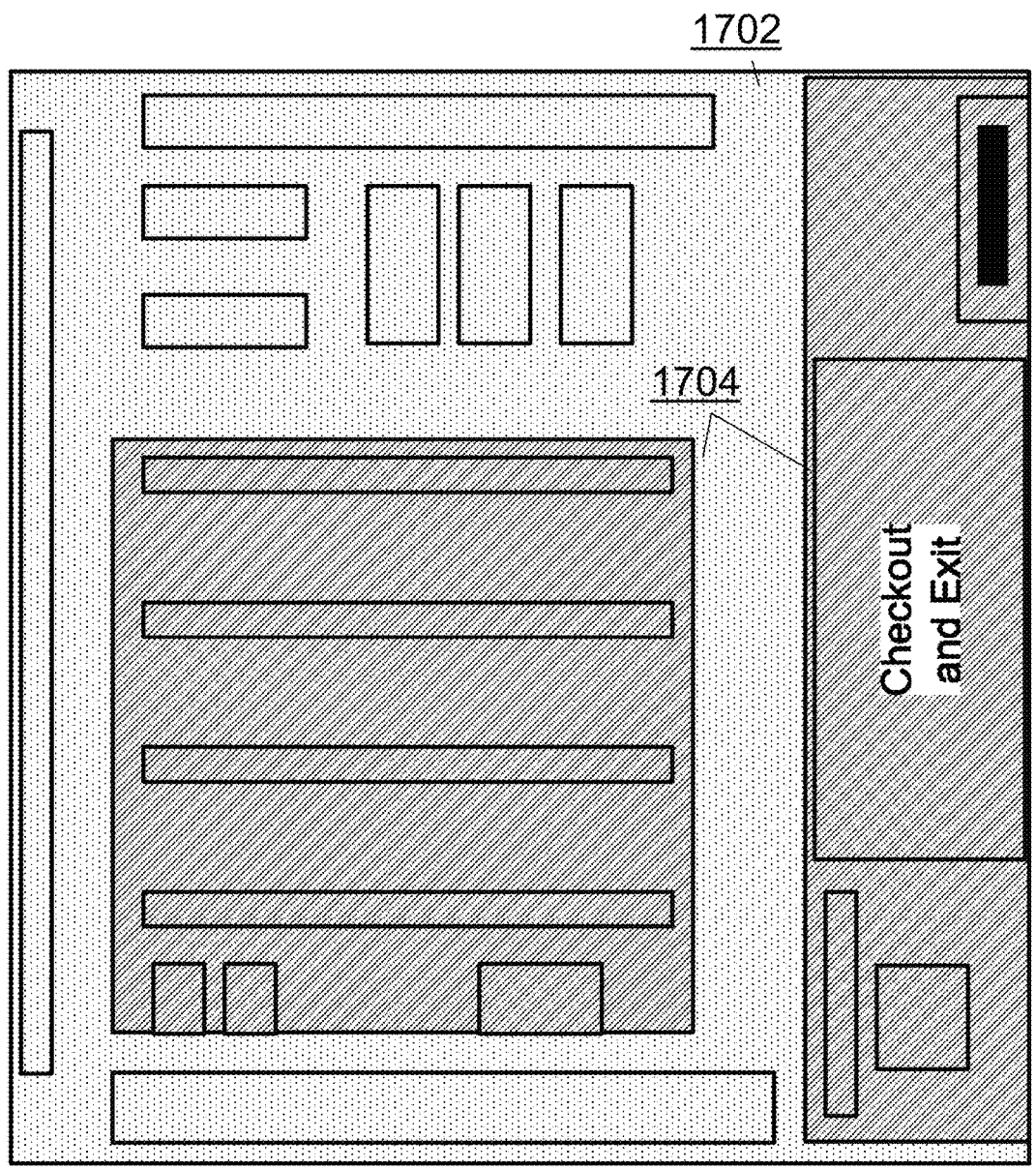
FIG. 18 shows an example of a sensor configuration where Wi-Fi sensors cover the entire retail space and vision sensors cover areas of interest.

FIG. 17 shows an example of a store layout covered entirely by Wi-Fi and vision sensors. The hatched lines 1602 indicates overlapping coverage by Wi-Fi and vision sensors. FIG. 18 shows an example of a partial video and full mobile coverage configuration. In this configuration, the entire store 1702 can be covered by Wi-Fi sensors and areas of interest 1704 including entrance, checkout and exit can be covered by an overlapping coverage of Wi-Fi and vision sensors.

Figure 19:
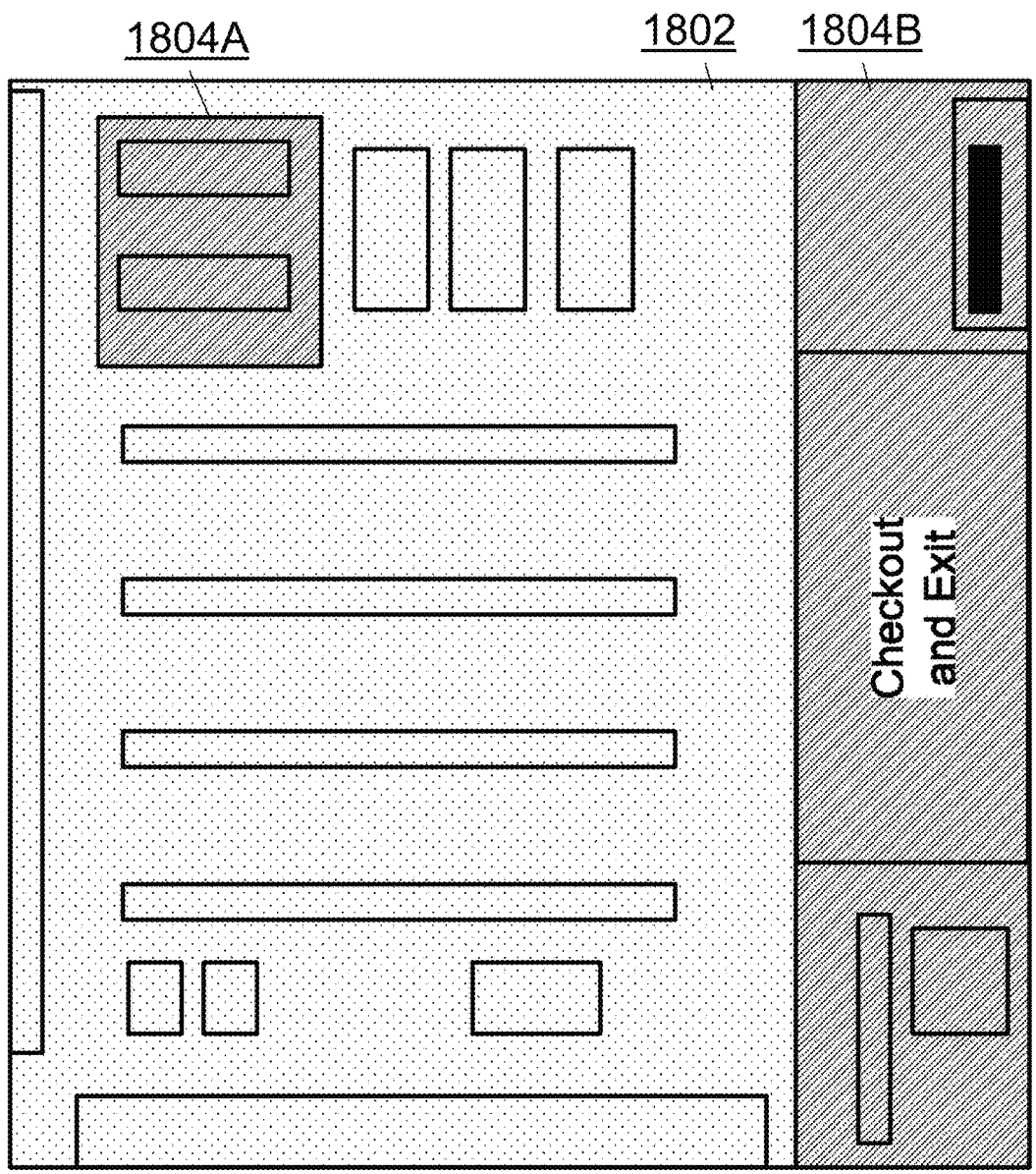
FIG. 19 shows an example of a sensor configuration where vision sensors cover the entire retail space and Wi-Fi sensors cover areas of interest.
Figure 20:
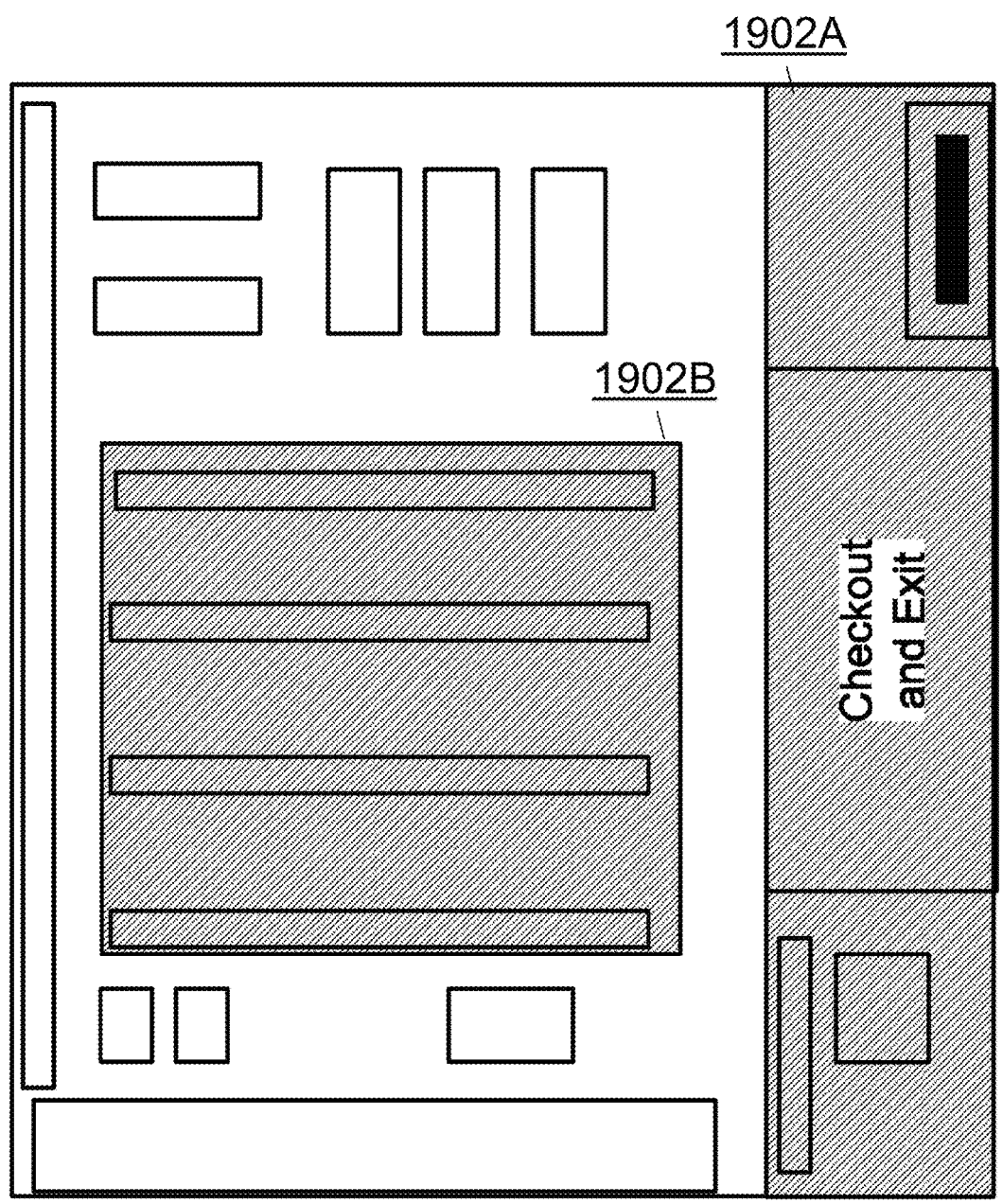
FIG. 20 shows an example of a sensor configuration where vision and Wi-Fi sensors overlap and cover areas of interest in a retail store.

FIG. 19 shows an example of a full video and partial mobile coverage configuration. In this configuration, the entire store 1802 can be covered by vision sensors and areas of interest 1804A-B including entrance, checkout and exit can be covered by Wi-Fi sensors. FIG. 20 shows an example of partial video and partial mobile coverage configuration. In this configuration, areas of interest 1902A-B including entrance, checkout, and exit can be covered by overlapping Wi-Fi and vision sensors.

4. Full Vision Coverage/Full Wi-Fi Coverage

MT Fusion: Given full vision and full Wi-Fi coverage the Multi-modal Trajectory Fusion 241 (MT Fusion) can be carried out by the exactly same approach as described in FIG. 12.

TT Association: Given a complete trajectory by the Multi-modal Trajectory Fusion process, the Trajectory-Transaction Data Association 243 (TT Association) can also be carried out by the exact same approach described in FIG. 15 since the description of the TT Association 243 algorithm assumes the availability of full vision and full Wi-Fi coverages.

Once MT Fusion 241 and TT Association 243 is performed, then the data that we can collect for a shopper can include the T-log data and the complete trajectory of the shopper with its unique ID.

5. Partial Vision Coverage/Full Wi-Fi Coverage

MT Fusion: MT Fusion 241 can be inherently designed to work with partial vision coverage since it can take a set of partial trajectory segments generated from vision tracking 231. The Trajectory Fusion 1160 and Trajectory Interpolation 1170 processes in MT Fusion 241 can address the limitations of partial vision coverage and generate a complete trajectory. The rest of the process can follow the same process described in FIG. 11 in the case of full vision and full Wi-Fi coverage.

TT Association: Once the MT Fusion 241 of trajectories from both modalities is carried out, at least some part of the trajectory can be reconstructed solely from the WT due to the partial vision coverage. The portion of the trajectory reconstructed solely from the WT can be inherently generated with low sampling frequency and low accuracy due to the nature of Wi-Fi based tracking, which can therefore be more smoothed and/or under-sampled compared to the part generated with both modalities. FIG. 20 shows a preferred embodiment for TT association 243 in this configuration.

Figure 21:
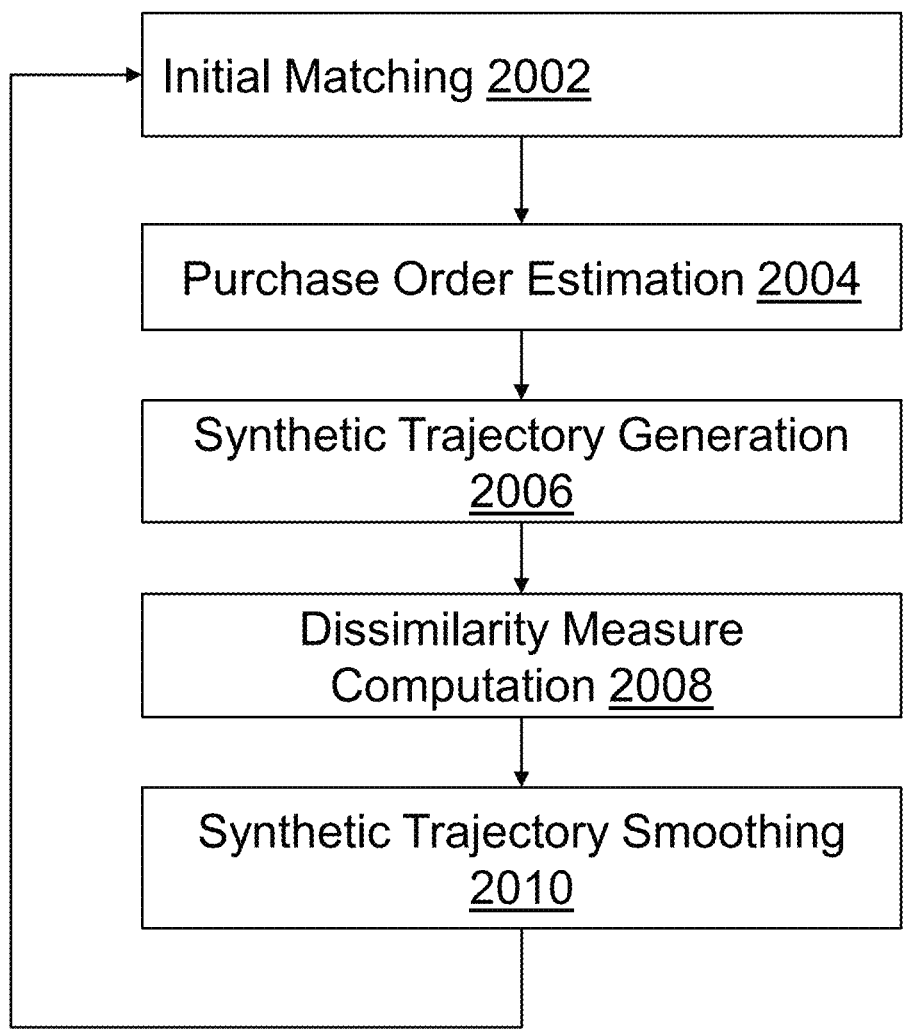
FIG. 21 shows an example block flow diagram for determining trajectory-transaction data association in a scale space.

These characteristics of the trajectory can require a more careful matching process in associating the T-log data to the trajectory. In an embodiment, The TT Association 243 can be carried out by an iterative approach that computes a distance measure between a T-log data and a trajectory in a scale space as shown in FIG. 21. The process can start from estimating the order of the items being purchased by (1) first laying down the fused trajectory (i.e., FT) on the store floor plan with the location of the purchased items marked in the Initial Matching module 2002, (2) associating each purchased item with the timestamp of the closest shopping fixation point in the FT in the Purchase Order Estimation module 2004, and (3) creating a synthetic trajectory (which we will refer to as ST) by connecting the location of the purchased items in time order in the Synthetic Trajectory Generation module 2006. Once the ST is created, then we can (4) compute a similarity measure between the FT and the ST in the scale space of the ST. The scale space of the ST can be created by applying a Gaussian with multiple kernel widths to the ST. We can then (5) find the minimum distance between the FT and the ST, which can be the dissimilarity measure between each pair in the scale space of the ST in the Dissimilarity Measure Computation module 2008. By (6)

iterating this process for all the candidate STs with different smoothing factors after performing the smoothing in the Synthetic Trajectory Smoothing module 2010, the T-log data corresponding to the ST that has the minimum dissimilarity with the FT can be found.

Figure 22:
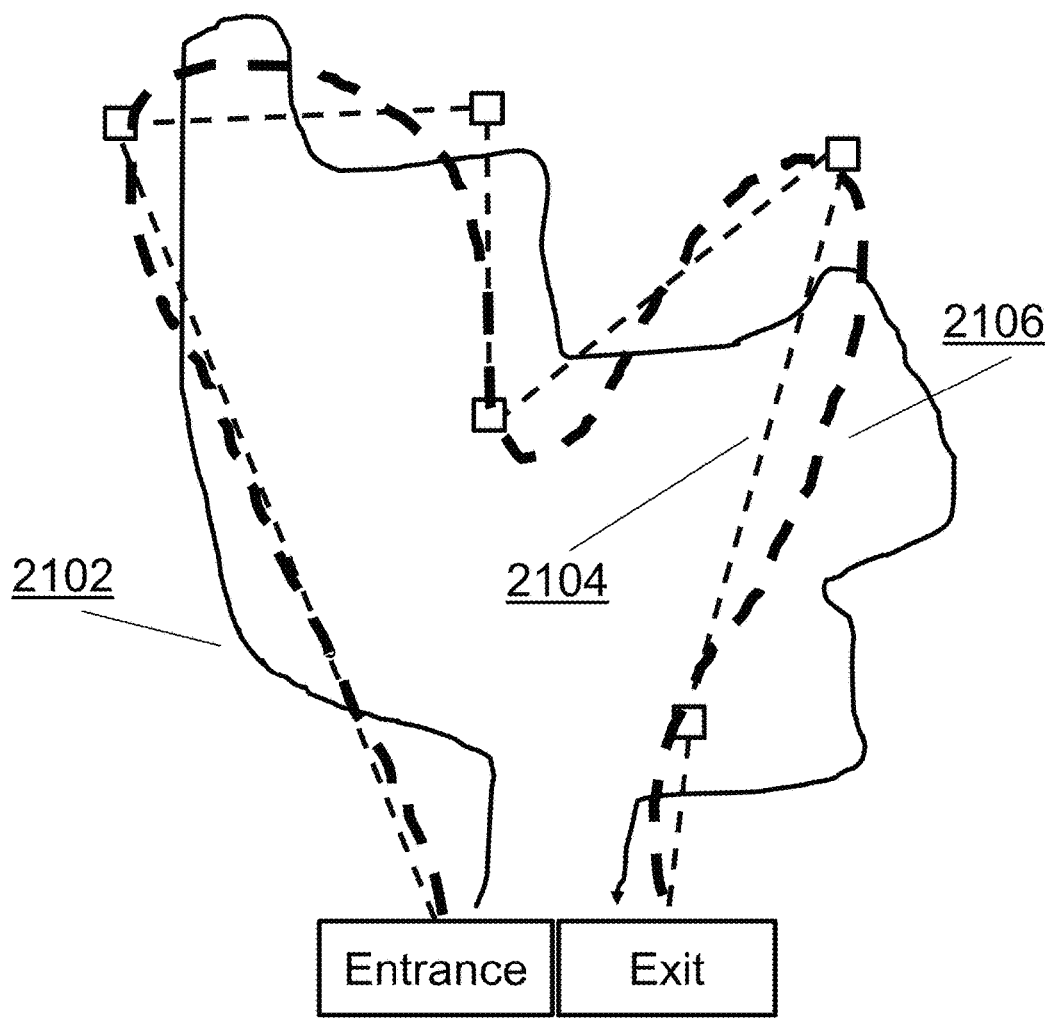
FIG. 22 shows an example and an exemplary method for determining the synthetic trajectory using transaction data.

In FIG. 22, an exemplary synthetic trajectory is shown in two scale levels: the thin dotted line 2104 stands for a synthetic trajectory with no smoothing while the thick dotted line 2106 does with a smoothing. An actual trajectory 2102 can be laid down too for visualization purpose.

Once we perform MT Fusion and TT Association, then the data that we can collect for a shopper can be the same as the case of full vision and full Wi-Fi coverage case, such as the T-log data and the complete trajectory of the shopper with its unique ID.

6. Full Vision Coverage/Partial Wi-Fi Coverage

MT Fusion: Unlike the two previous cases, this configuration does not allow us to perform the store-wide MT Fusion 241 process since the present configuration cannot generate a complete trajectory that serve as an anchor to aggregate fragmented trajectories from vision-based tracking. We may still track shoppers with vision sensors to some extent although it will essentially have discontinuities due to the lack of unique and consistent IDs, which is inherent in visual features.

Figure 23:
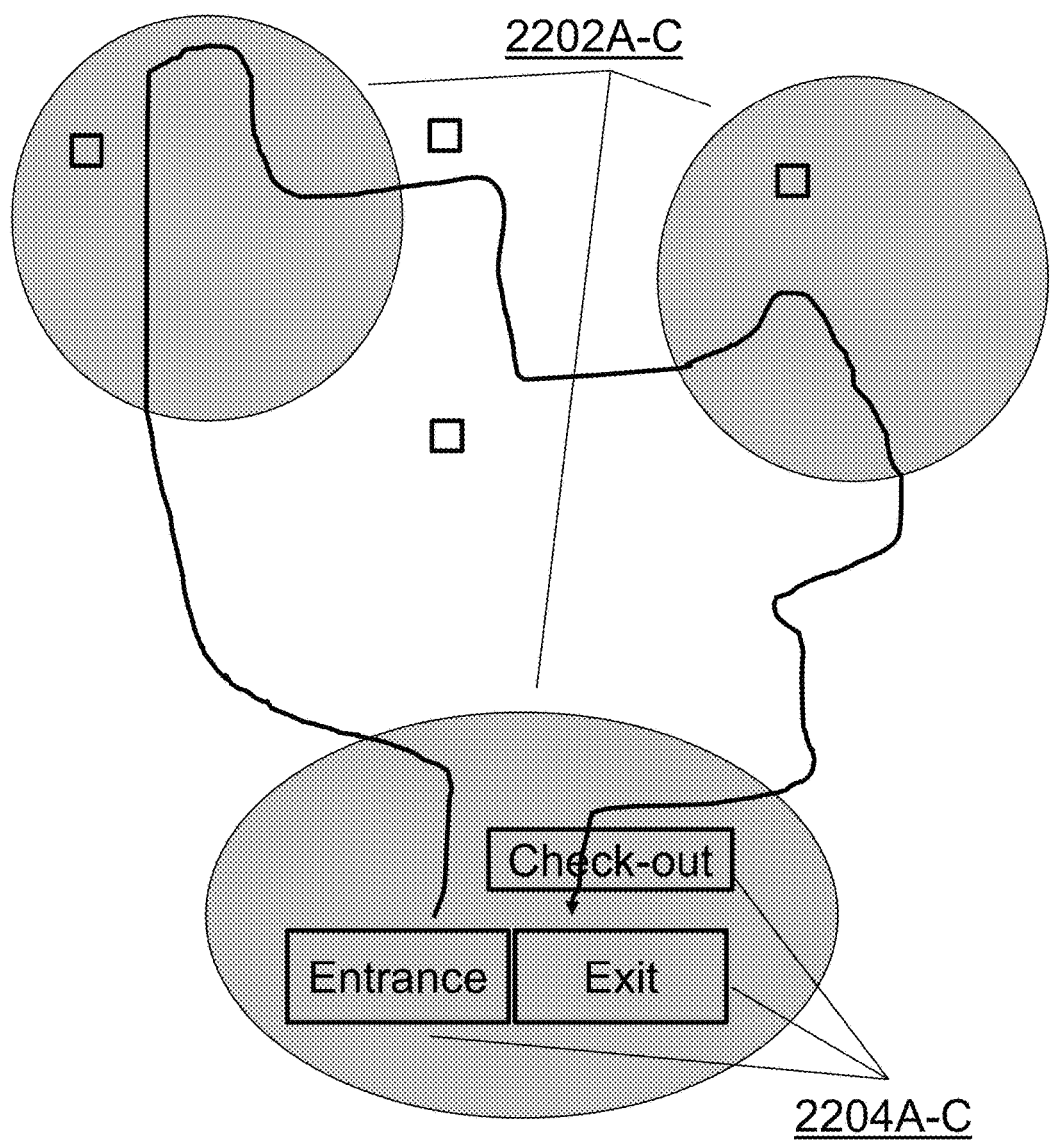
FIG. 23 shows an example of an adaptation of the trajectory-transaction data association for a configuration where tracking is not possible throughout the entire retail space.

FIG. 23 describes an example of an adapted Trajectory-Transaction Data Association. Although the invention cannot perform store-wide tracking with Wi-Fi signals in this configuration, the present invention can detect Wi-Fi signals in the areas of interest 2202A-C and identify the visitor with the unique ID. Therefore, the present method can perform a comparison of the shopper count at entrance/exit 2204A-C with the shopper count at an area of interest 2202A-C where Wi-Fi sensors are deployed. In addition, the repeated visitors over time can be determined, enabling a long-term behavior analysis. Any data that can be obtained from vision-sensing systems can also be available for further analysis.

TT Association: Due to the lack of association of the unique ID from Wi-Fi signals with vision trajectories, there may not be a complete trajectory of a shopper that we want to associate with the given T-log data. However, we can associate the T-log data with a unique ID (instead of a trajectory) of a shopper by detecting the shopper in multiple areas such as the entrance 2204A, exit 2204B, and the other areas of interest 2202. Due to the nature of Wi-Fi based localization, we are only able to have a relatively loose timestamp when the Wi-Fi signal of a shopper is detected around the entrance 2204A, exit 2204B, and the other areas of interest 2202. However, even with such loose time synchronization, we may associate a visual feature model that appeared in all of the areas of interest (i.e., entrance, checkout, and an aisle, for example) and a MAC address (i.e., a unique ID) of a mobile device that are also detected in all of such areas by estimating the correlation between them in a spatio-temporal domain.

In an embodiment, the system may (1a) construct and store the visual feature model of a shopper for each vision trajectory segment with timestamps. Whenever a Wi-Fi signal is detected in any of the areas of interest, the system may also (1b) store the MAC address of the device with the timestamp. Once a shopper makes a transaction at the checkout 2202B, (2) the visual feature model of the shopper can again be created and a list of the MAC addresses of mobile devices present around the checkout 2202B can be collected. (3) The visual feature model of the shopper can be searched through the visual feature models that are already created in all of the areas of interest 2202. Once (4) the matched visual feature models are found in both the checkout and the areas of interest 2202, then the system can (5) list out the MAC addresses of mobile devices detected in similar time frames in the same areas. (6a) If there is a single MAC address that appears in all or most of such areas, then it can indicate that a shopper with the MAC address passes through all of the areas of interest and thus it can be highly likely that this shopper is actually the shopper who just made the transaction at the checkout. In case there are multiple MAC addresses that appear all the areas of interest, if they are (6-2) stored in a database, it may be used for further analysis especially when such data is accumulated in a high volume.

After the TT Association 243 module, the data collected for a shopper can be limited compared to the two previous configurations. The present invention can only be able to store the T-log data and the unique ID of the shopper, the MAC address.

7. Partial Vision Coverage/Partial Wi-Fi Coverage

MT Fusion: In this case, the present invention can assume that the partial coverages of vision and Wi-Fi sensing overlaps each other in the areas of interest, for example, the entrance, exit/checkout, an aisle of interest, etc. If the overlapped sensing coverage is relatively small compared to the entire store, the MT Fusion 241 again cannot be carried out. Therefore, what the system can measure when it comes to Wi-Fi based detection can be same as the case of full vision and partial Wi-Fi coverage. In the partial mobile and full vision configuration, store-wide shopper detection and tracking can be done because of the full vision coverage despite the lack of consistent and unique ID from mobile signal based tracking. In this configuration, the present invention cannot measure any store-wide statistics except, for example, shopper count at entrance and exit.

TT Association: Although the store-wide statistics cannot be measured, the TT Association 243 can be carried out similarly as in the full vision and partial Wi-Fi case since the system can build the visual feature models of shoppers in all the areas of interest and detect the Wi-Fi signal. After we perform the TT Association 243, therefore, the data that we can collect for a shopper can include the T-log data and the unique ID of the shopper.

Shopper Decision Tracker

Figure 24:
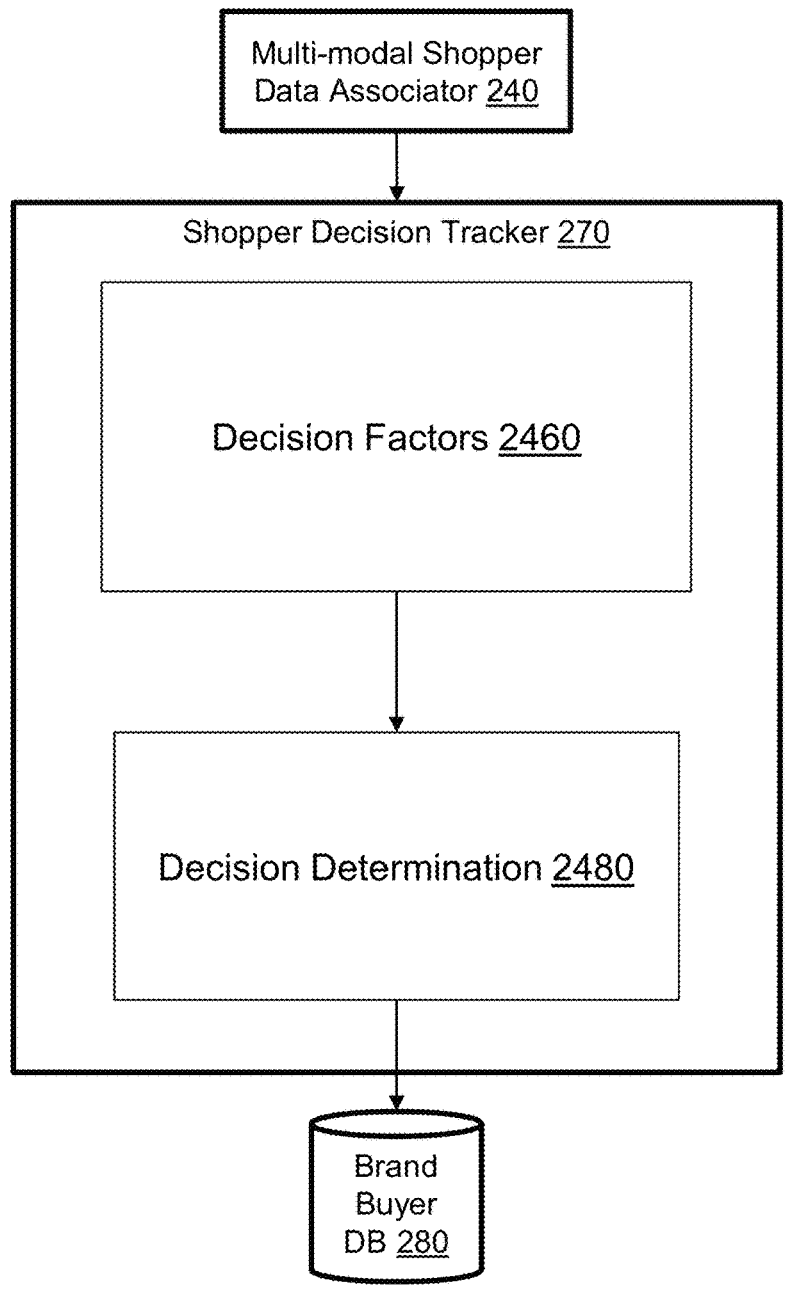
FIG. 24 shows an example block flow diagram of the Shopper Decision Tracker module.

FIG. 24 illustrates an exemplary embodiment of the Decision Determination using the Shopper Decision Tracker 270 module. The Multi-modal Shopper Data Associator 240 module can provide data from the shopping trip that can be used to determine whether the decision to purchase each item occurred pre-shelf or at-shelf. Data from the Multi-modal Shopper Data Associator 240 module can include shopper trajectory data, the associated PoS data, and planogram and store layout information. The planogram and store layout information can include the presence and/or location of displays and signage, location and orientation of aisles and shelves, category information for products and associated locations on each shelf, brand information for products and associated locations on each shelf, and SKU's for products and associated locations on each shelf.

Figure 25:
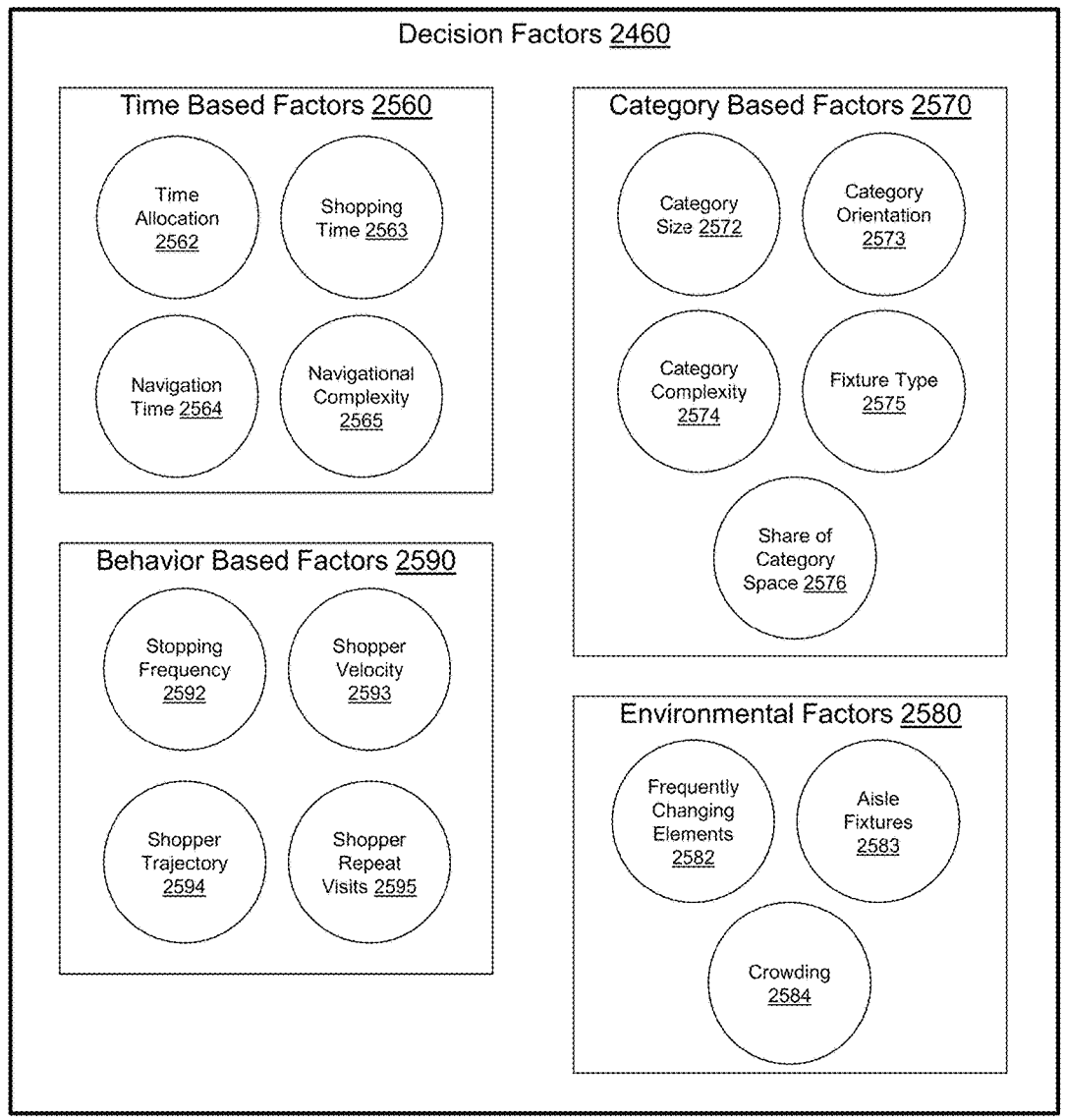
FIG. 25 shows an example of some decision factors used by the Shopper Decision Tracker module.

In order to make the determination of whether a purchase decision was made pre-shelf or at-shelf (using the Decision Determination 2480 module), the module can consider a number of Decision Factors 2460 in several areas, as illustrated in FIG. 25, such as (but not limited to) Time Based Factors 2560 (Time Allocation 2562, Shopping Time 2563, Navigation Time 2564, and Navigational Complexity 2565), Category Based Factors 2570 (Category Size 2572, Category Orientation 2573, Category Complexity 2574, Fixture Type 2575, and Share of Category Space 2576), Environmental Factors 2580 (Frequently Changing Elements 2582, Aisle Fixtures 2583, and Crowding 2584), and Behavior Based Factors 2590 (Stopping Frequency 2592, Shopper Velocity 2593, Shopper Trajectory 2594, and Shopper Repeat Visits 2595). One skilled in the art would understand that while the factors listed can be used to make a purchase decision determination, other factors may also be used. Further, one, many, or all of the factors could be used for the determination.

Purchase decision factors can be of a continuous or categorical type. Continuous type factors can be represented by a numerical value. The numerical value can take on any value, can represent units appropriate for the associated factor, can be a value within a specified range or of unlimited range, or can be normalized during the decision determination calculation. Categorical type factors can have any of a fixed number of possible values. The possible values can be modified by a user or by the calculation during a model generation or refinement process.

In an embodiment, Time Allocation 2562 can be a factor used for determination of whether the decision to purchase each item occurred pre-shelf or at-shelf. Time Allocation 2562 is a dissection of the total category shopping time wherein the time is divided into time spent navigating vs. time spent shopping or engaging. Shopper trajectory data can be used to create a statistical distribution of shopping time. A threshold can be chosen under which decisions are considered pre-shelf, and above which are considered at-shelf. The threshold can be made based on historical data and corrected using ground-truth data obtained via video annotation for a significant sample of shoppers. Time Allocation 2562 can be a continuous type factor.

In another embodiment, Time Allocation 2562 can be comprised of individual factors of Shopping Time 2563 and Navigation Time 2564. Shopping Time 2563 can represent the time spent shopping a particular category in seconds. Navigation Time 2564 can represent the time spent navigating the category in seconds. Shopping Time 2563 and Navigation Time 2564 can be continuous type factors.

Figure 26:
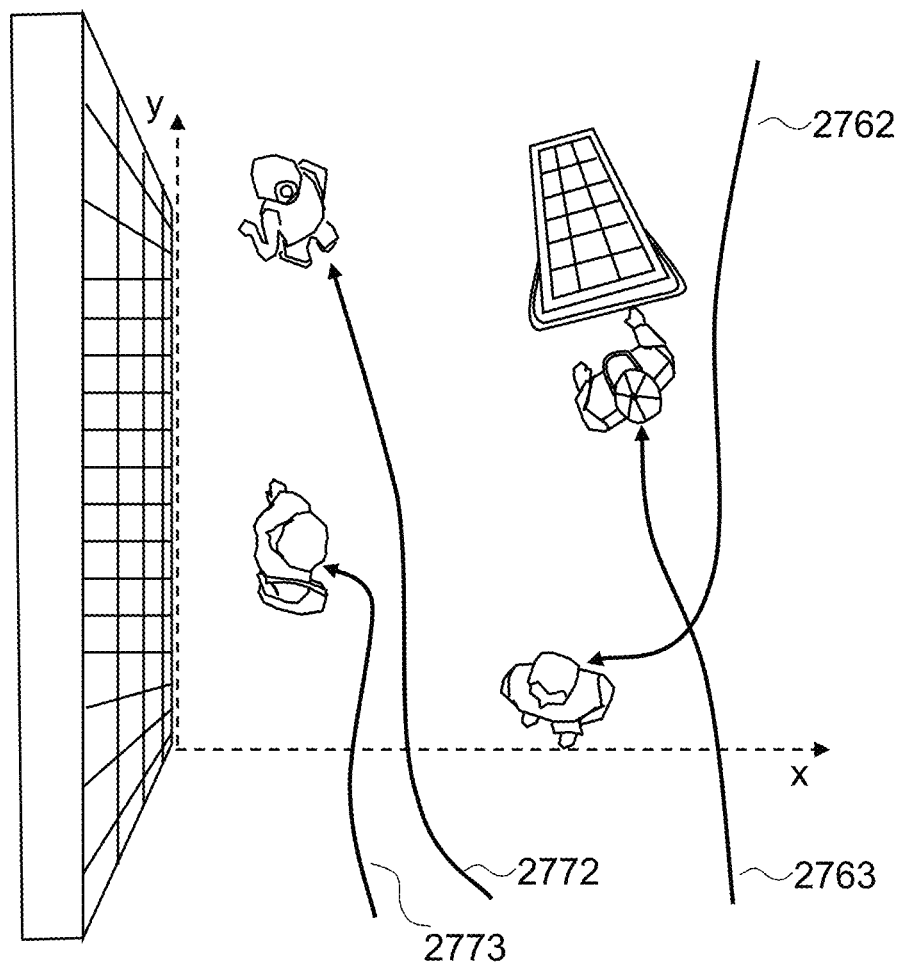
FIG. 26 illustrates an example of shopper behavior used for the calculation of Time Allocation, Shopping Time, and Navigation Time.

FIG. 26 illustrates an example of shopper behavior used for the calculation of Time Allocation 2562, Shopping Time 2563, and Navigation Time 2564. The shoppers shown in 2762 and 2763 can be seen navigating a shopping aisle. The shoppers shown in 2772 and 2773 can be seen spending time shopping or engaging.

In another embodiment, Navigational Complexity 2565 can also be a factor used for determination of whether the decision to purchase each item occurred pre-shelf or at-shelf. Navigational Complexity 2565 compares a shoppers navigation time to actual shopping time. This can include, but is not limited to, time finding the correct aisle in the store, navigating around displays, or navigating around other shoppers. Navigational Complexity 2565 can be a continuous type factor.

In another embodiment, Category Size 2572 can also be a factor used for determination of whether the decision to purchase each item occurred pre-shelf or at-shelf. Category Size 2572 considers the physical size (for instance, linear feet) of the category as it impacts navigation time. Category Size 2572 can be a continuous type factor.

Figure 27:
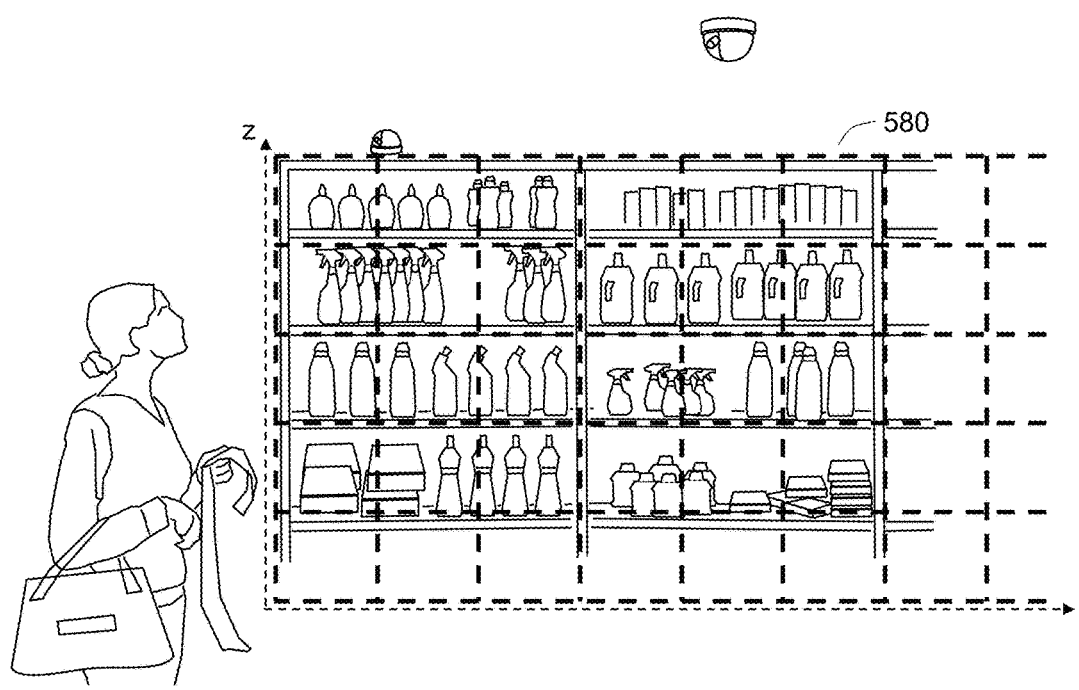
FIG. 27 shows an example where a grid can be used to illustrate the physical size of a product category on a retail shelf.

FIG. 27 shows an example where a grid 580 can be used to illustrate the physical size of a product category on a retail shelf.

In another embodiment, Category Orientation 2573 can also be a factor used for determination of whether the decision to purchase each item occurred pre-shelf or at-shelf. Category Orientation 2573 considers physical layout of the category with regards to, for example, sides of the aisle or spans of more than one aisle. Category Orientation 2573 can be a categorical type factor, with values such as (but not limited to) "Single Aisle," "Multi-Aisle," "Single side of Aisle," and "Both sides of Aisle."

In another embodiment, Category Complexity 2574 can also be a factor used for determination of whether the decision to purchase each item occurred pre-shelf or at-shelf. Category Complexity 2574 can be represented by SKU density (i.e., products per square foot of category). Category Complexity 2574 can be a continuous type factor.

In another embodiment, Fixture Type 2575 can also be a factor used for determination of whether the decision to purchase each item occurred pre-shelf or at-shelf. Fixture Type 2575 can consider how products are shelved, contained, or displayed to the shopper. Fixture Type 2575 can be a categorical type factor, with values such as (but not limited to) "metal shelves," "freezer doors," "pallets," and "dispensers."

In another embodiment, Share of Category Space 2576 can also be a factor used for determination of whether the decision to purchase each item occurred pre-shelf or at-shelf. This factor can represent the number of SKU's for a particular brand or category on a particular shelf or product display space. Share of Category Space 2576 can be a continuous type factor.

In another embodiment, Frequently Changing Elements 2582 can also be a factor used for determination of whether the decision to purchase each item occurred pre-shelf or at-shelf. Frequently Changing Elements 2582 can include secondary product displays or other objects that may be present as the shopper navigates the store. Frequently Changing Elements 2582 can be a categorical type factor.

In another embodiment, Aisle Fixtures 2583 can also be a factor used for determination of whether the decision to purchase each item occurred pre-shelf or at-shelf. Aisle Fixtures 2583 such as signage can represent the presence of additional or extraordinary navigational or organizational signage in the store. The shopper could have to either navigate around the signage when navigating the store, or spend time reading the signage while determining a path to travel. Aisle Fixtures 2583 can be a categorical type factor, with values such as (but not limited to) "secondary displays," and "signage."

In another embodiment, Crowding 2584 can also be a factor used for determination of whether the decision to purchase each item occurred pre-shelf or at-shelf. This factor can be representative of a count of the number of shoppers in a particular aisle or nearby a particular category of products. Crowding 2584 can be a continuous type factor.

In another embodiment, Stopping Frequency 2592 can also be a factor used for determination of whether the decision to purchase each item occurred pre-shelf or at-shelf. Stopping Frequency 2592 can be calculated by the number of times a shopper made a distinct stop during the category visit. Stopping Frequency 2592 can be a continuous type factor.

In another embodiment, Shopper Velocity 2593 can also be a factor used for determination of whether the decision to purchase each item occurred pre-shelf or at-shelf. Shopper Velocity 2593 can consider the speed (in terms of, for example, linear feet per second) with which the shopper moves in front of the category. Shopper Velocity can be a continuous type factor.

In another embodiment, Shopper Trajectory 2594 can also be a factor used for determination of whether the decision to purchase each item occurred pre-shelf or at-shelf. Shopper Trajectory 2594 can indicate whether the shopper moves in one direction in a generally straight line or if the shopper uses bi-directional movement (i.e., back and forth). Shopper Trajectory 2594 can be a categorical type factor, with values such as (but not limited to) "one way," "bi-directional," and "back and forth."

Figure 28:
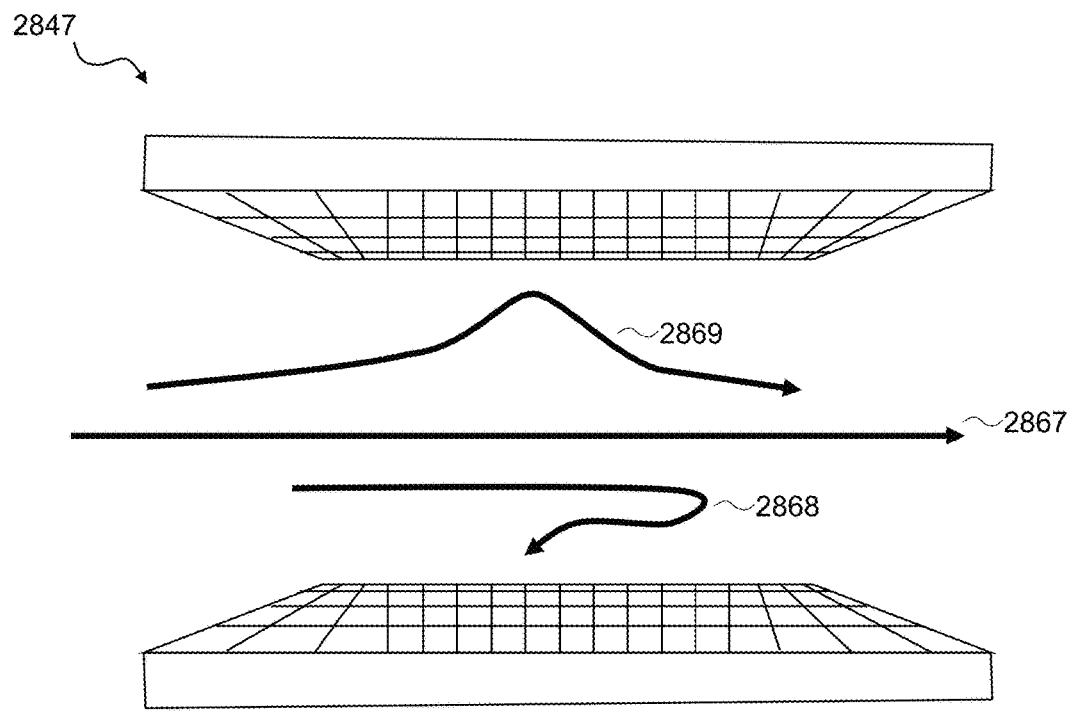
FIG. 28 illustrates some example trajectories for a shopper in a retail aisle.

FIG. 28 illustrates some example trajectories for a shopper in a retail aisle 2847. An example of a "one way" trajectory is shown in 2867, a "bi-directional" trajectory in 2868, and a "back and forth" trajectory in 2869.

In another embodiment, Shopper Repeat Visits 2595 can also be a factor used for determination of whether the decision to purchase each item occurred pre-shelf or at-shelf. Shopper Repeat Visits 2595 can be a count of the number of times a shopper visits a category during a shopping trip. This factor can be a continuous type factor.

It should be noted that while several factors are described in the exemplary embodiments presented, other factors could be used for the Decision Determination of whether the decision to purchase each item occurred pre-shelf or at-shelf.

In an embodiment, after calculation of the factors, the Decision Determination module can be used to model the shopper's behavior, considering the factors, resulting in the determination of whether the decision for each purchase occurred at-shelf or pre-shelf. All data associated with the shopper's trip, including the decision determination results, can then be sent to the Brand Buyer DB 280 for storage.

Figure 29:
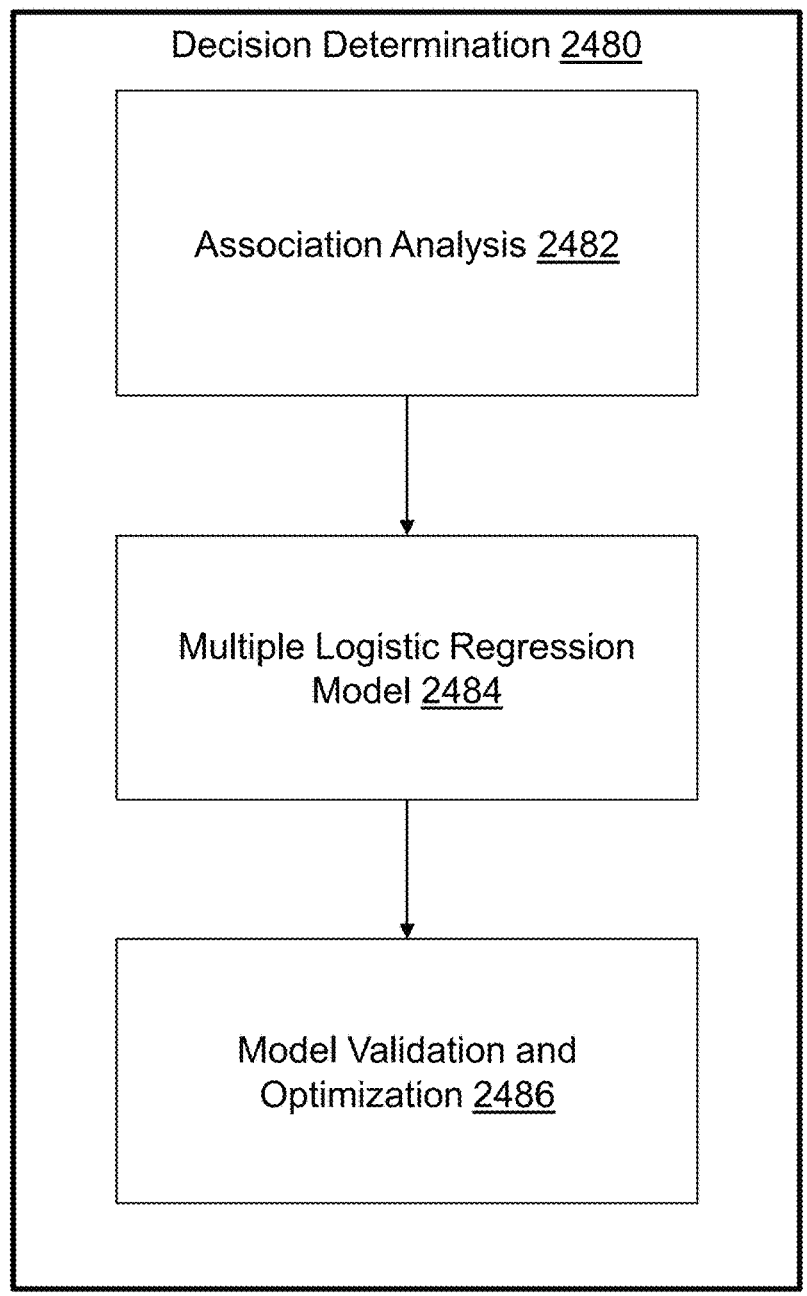
FIG. 29 shows an example block flow diagram of the Decision Determination module.

As shown in FIG. 29, the Decision Determination 2480 module can use a plurality of factors to build a decision model that calculates the probability of one of two possible results, either a decision that occurred at-shelf or a decision that occurred pre-shelf. The model can be built by collecting shopper data for a statistically significant number of trips, and using techniques such as manual annotation to determine ground-truth information for the data.

An Association Analysis 2482 module can identify factors that have a bivariate association with one another. The assessment can be based on either Pearson product-moment ("regular") correlation coefficients, Spearmen rank-order correlation coefficients, or Hoeffding's D statistics (a nonparametric test that can find non-monotonic relationships such as inverted U-shapes). In addition, the statistical significance of each association measure can be determined.

The Association Analysis 2482 module can provide the full set of relationships, and also can provide an in-depth analysis of a target factor of interest and its relationship to other factors.

After the association analysis, a Multiple Logistic Regression 2484 module can be used to model the decision type outcome. A logistic regression model is a class of statistical methods that relates a binary (e.g., yes/no) variable of interest (a target variable) to one or more variables that are expected to have an influence on the target variable, and are often called predictor variables. Given a set of predictor variables, a logistic regression model can allow a user to obtain the estimated probability for each of two possible responses for the target variable.

The probability for a particular decision determination can be modeled using the following equation:

$$\hat{p} = \frac{e^{(b_0+b_1X_1+b_2X_2+\ldots+b_pX_p)}}{1+e^{(b_0+b_1X_1+b_2X_2+\ldots+b_pX_p)}},$$

where $\hat{p}$ can be the expected probability of a particular decision type outcome (either at-shelf or pre-shelf), $X_1$ to $X_p$ can be distinct independent variables representing decision factors 1 to p, and $b_0$ to $b_p$ can be regression coefficients.

The multiple logistic regression model can sometimes be written differently. In the following form, the outcome is the expected log of the odds that the outcome is present:

$$\ln\left(\frac{\hat{p}}{(1-\hat{p})}\right),$$

$$\ln\left(\frac{\hat{p}}{(1-\hat{p})}\right) = b_0 + b_1X_1 + b_2X_2 + \ldots + b_pX_p.$$

After the model has been generated, using the ground-truth information, it can then be scored for accuracy and goodness of fit using a Model Validation and Optimization 2486 module. Any necessary transformations to the factors can be applied, and the model then refined. Once the model has reached an accuracy and goodness score above a predefined threshold, it can be used to determine shopper decision behavior automatically on a set of data.

It would be understood by one of ordinary skill that the process of tracking a shopper, associating PoS data, and making a determination regarding the shopper's decisions can be done iteratively for each shopper in the store, over time. The resulting Brand Buyer DB can then contain data that is aggregated across many shoppers for further analysis.

Brand Buyer Database

Figure 30:
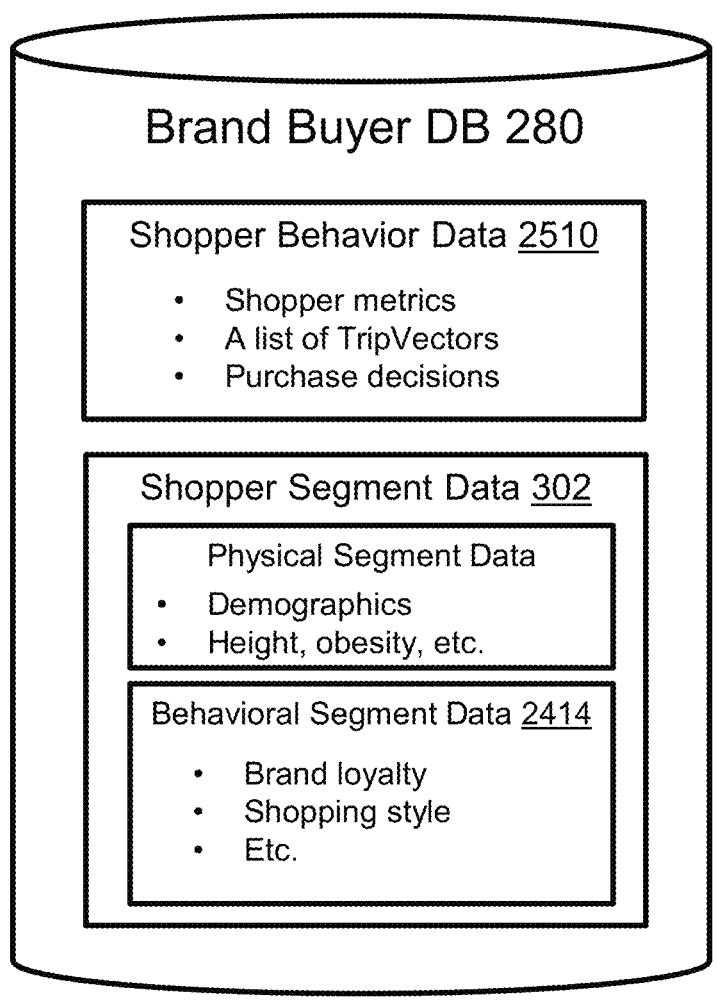
FIG. 30 shows an exemplary illustration of the Brand Buyer DB.

FIG. 30 shows the Brand Buyer DB 280. The Brand Buyer DB 280 can store aggregated shopper trajectory, behavior, and transaction (PoS) data for each tracked shopper. This can include Shopper Behavior Data 2510 such as certain collected metrics, as well as the list of TripVectors. Shopper Behavior Data 2510 can include the determination of whether the shopper decided on a particular product pre-shelf or at-shelf. It can also include Shopper Segment Data 302, including physical data such as demographics, height, or obesity, as well as Behavioral Segment Data 2414, such as shopping style. The contents of the Brand Buyer DB 280 can be aggregated over all shoppers, and the data made available to the Analytics Generation 290 module for further analysis.

It can be noted that while the example embodiments presented include collecting shopper data at a single location, other embodiments could include data collection from multiple locations. Data from multiple locations could be transferred to a single Brand Buyer DB 280 so results could be aggregated across each of the locations.

Analytics Generation

After aggregating shopper trip data, including decision determination for each purchase, in the Brand Buyer DB 280, the data can be analyzed using the Analytics Generation 290 module to obtain a number of performance indicators that can help to quantify the strength of a product or brand. One example performance indicator can be brand stability, or an understanding of brand purchase predictability, and conversely, its vulnerability as a result of reliance on at-shelf decisions to drive sales. Another example performance indicator can be at-shelf win rate, which provides a measure of how well a brand competes in at-shelf situations with shoppers that have not previously decided before arriving at the product on the shelf. Analysis of the performance indicators can help manufacturers and retailers to compare their own brand's performance against competitors in a particular category (i.e., brand strength or product strength).

Figure 31:
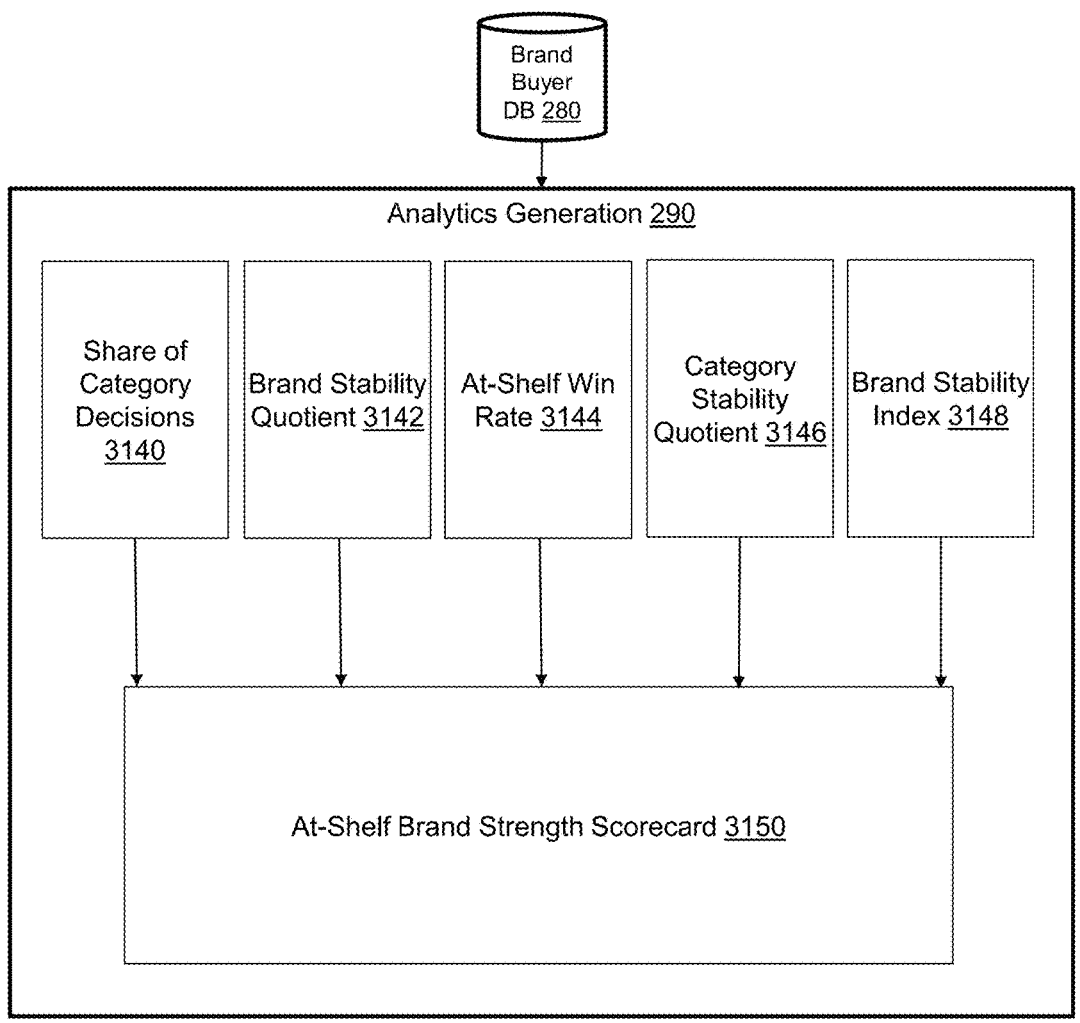
FIG. 31 shows an example block flow diagram of the Analytics Generation module.

FIG. 31 illustrates more details of the Analytics Generation 290 module. The performance indicators can be obtained by calculating a number of metrics relevant to the performance (i.e., strength) of a brand or product compared to the overall category. These metrics include the Share of Category Decisions 3140, the Brand Stability Quotient 3142, the At-Shelf Win Rate 3144, the Category Stability Quotient 3146, and the Brand Stability Index 3148. While these metrics are presented for this exemplary embodiment, one skilled in the art would understand that other metrics may be used for analysis by the Analytics Generation 290 module. Once the metrics are calculated, the analysis can be presented in the form of an At-Shelf Brand Strength Scorecard 3150.

The Share of Category Decisions 3140 can indicate the strength of the brand overall compared to the rest of the category. The metric can represent all brand purchases, whether the decision occurred pre-shelf or at-shelf.

The Brand Stability Quotient 3142 can present a measure of brand purchase predictability vs. reliance on at-shelf decisions. The Brand Stability Quotient can be calculated using the following equation:

$$\text{Brand Stability Quotient} = \frac{\text{Brand } A \text{ Pre-Shelf Decisions }\%}{\text{Brand } A \text{ Total Decisions }\%}$$

The At-Shelf Win Rate 3144 can present a measure of how well a particular brand is doing at winning at-shelf decisions with shoppers that have not made the purchase decision "pre-shelf." The At-Shelf Win Rate can be calculated using the following equation:

$$\text{At-Shelf Win Rate} = \frac{\text{Brand } A \text{ At-Shelf Decisions }\%}{\text{Total Category At-Shelf Decisions }\%}.$$

The Category Stability Quotient 3146 can present a measure of category purchase predictability vs. reliance on at-shelf decisions for products in a particular category. The Category Stability Quotient can be calculated using the following equation:

$$\text{Category Stability Quotient} = \frac{\text{Category Pre-Shelf Decisions }\%}{\text{Category Total Decisions }\%}$$

The Brand Stability Index 3148 (BSI) can present a comparison of the stability quotient for a particular brand compared to the stability quotient for an entire category. The Brand Stability Index can be calculated using the following equation:

$$\text{Brand Stability Index} = \frac{\text{Brand } A \text{ Stability Quotient}}{\text{Category Stability Quotient}}.$$

Results analysis presented by the Brand Strength Scorecard 3150 can be used to provide an interpretation of the calculated metrics to the product manufacturer or retailer. Subsequent to an interpretation of the results, recommendations for improving product or brand strength can then be provided.

Figure 32:
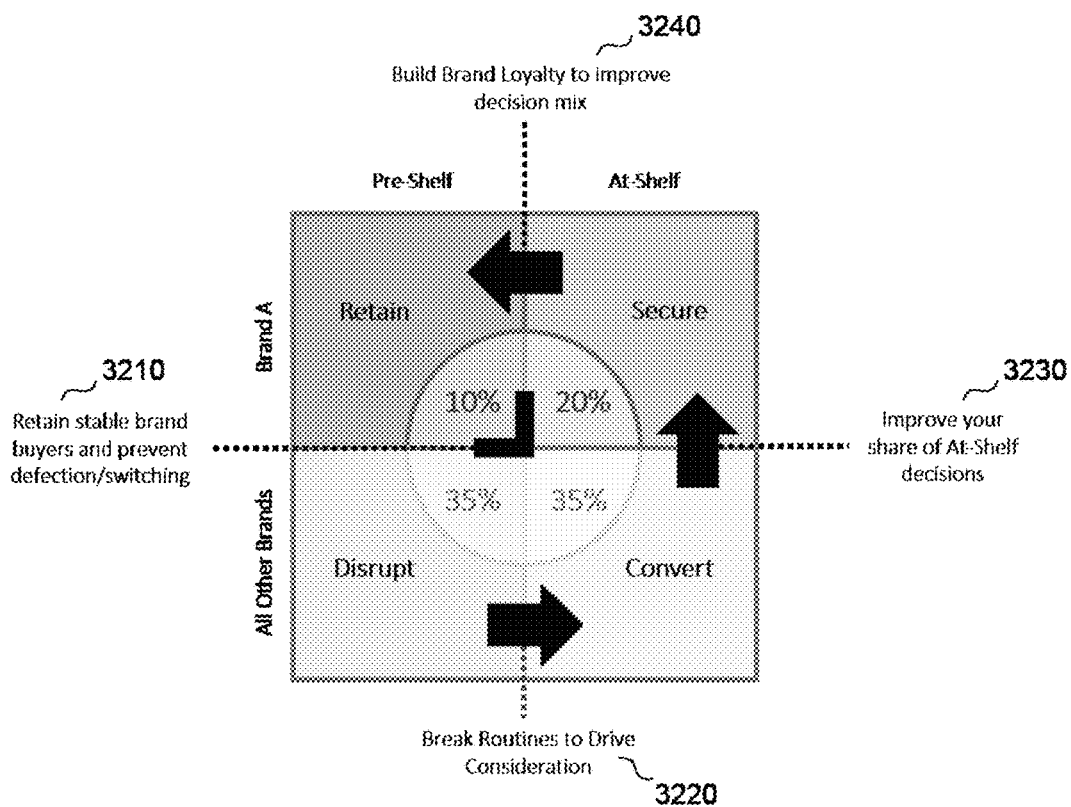
FIG. 32 shows an example brand strength analysis.

FIG. 32 illustrates an example embodiment of a way to view results of the decision analysis in terms of a comparison between a particular brand (called "Brand A" in the illustration) and an entire category of products and when decisions to purchase items of the brand or category occurs. The upper left quadrant represents purchases of a particular brand where the shopper made the decision to purchase the product pre-shelf. The upper right quadrant represents purchases of a particular brand where the shopper made the decision to purchase the product at-shelf. The lower left quadrant represents purchases of all other brands in a category where the decision was made pre-shelf. The lower right quadrant represents purchases of all other brands in a category where the decision was made at-shelf.

An interpretation of the results and an associated recommendation for improving brand strength can depend on the distribution of purchases on the chart. For example, a manufacturer would want to retain customers that purchase their brand upon deciding pre-shelf, as illustrated in 3210. If the manufacturer discovers that the distribution of purchases is weighted toward the lower left quadrant (purchases of all other brands where decisions are made pre-shelf), they may want to provide incentives to disrupt the market and encourage customers to consider other brands, as illustrated in 3220. As more customers are open to consideration of other brands, the manufacturer would then look to convert more customers to choose their brand at the shelf, as illustrated in 3230. This can be done, for example, through special packaging or pricing, sales, at-shelf messaging, or special displays. Finally, as more customers choose the brand at the shelf, a manufacturer may try to build brand loyalty to shift more brand decisions to the pre-shelf quadrant, as illustrated in 3240. This can be done, for example, through traditional advertising, feature merchandising, displays, in-store communications, online marketing and social media, couponing, and rewards or loyalty programs.

Figure 33:
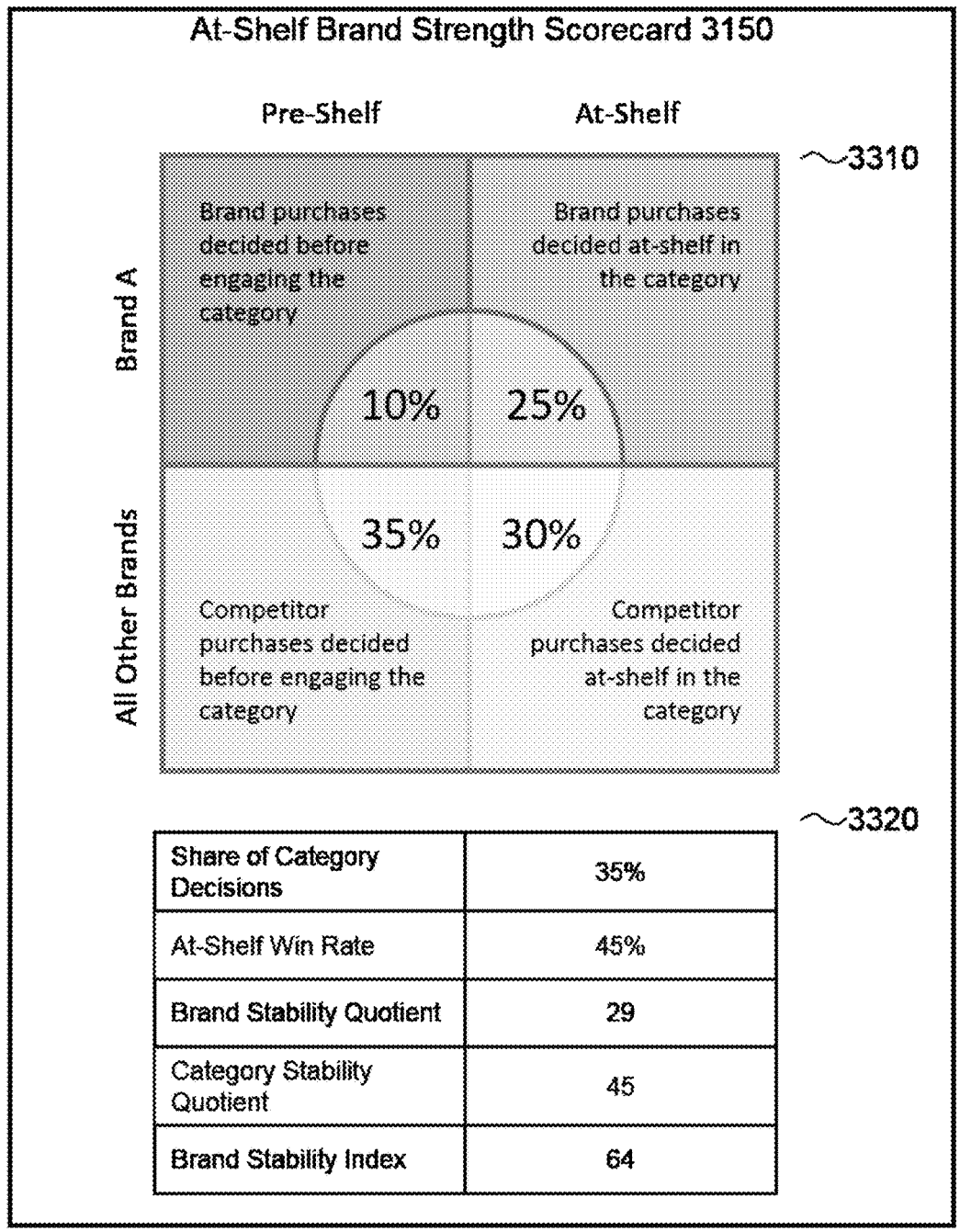
FIG. 33 shows an example application of the At-Shelf Brand Strength Scorecard.

An example embodiment of an application of the Brand Strength Scorecard 3150 can be seen in FIG. 33. The top chart 3310 shows four decision possibilities for the purchase of a product in a particular category. In this case, 10% of all category shoppers purchased "Brand A" and made the decision before engaging in the category, as shown in the upper left quadrant. The upper right quadrant shows that 25% of all category shoppers purchased "Brand A" and made the decision at-shelf. For all other brand purchases shoppers made in the category, 35% of the total category purchases were decided by the shopper before engaging the category, as shown in the lower left quadrant. Finally, the lower right quadrant shows that 30% of the total category purchases were not of "Brand A" and the shopper made the decision at-shelf.

The bottom chart 3320 shows the results of metrics calculated for the example embodiment. In this example, the Share of Category Decisions was 35%, the At-Shelf Win Rate was 45%, the Brand Stability Quotient was 29, the Category Stability Quotient was 45, and the Brand Stability Index was 64.

There are many possible ways to interpret these results. One example interpretation can be that with a Brand Stability Quotient of 29 and Brand Stability Index of 64, Brand A's volume is too reliant on at-shelf decisions and less predictable than the category as a whole, making it more vulnerable to at-shelf competitive pressures. A recommendation could be to implement a rewards program based on repeat purchasing. This could be effective in converting Brand A buyers who make at-shelf decisions to pre-shelf deciders.

Figure 34:
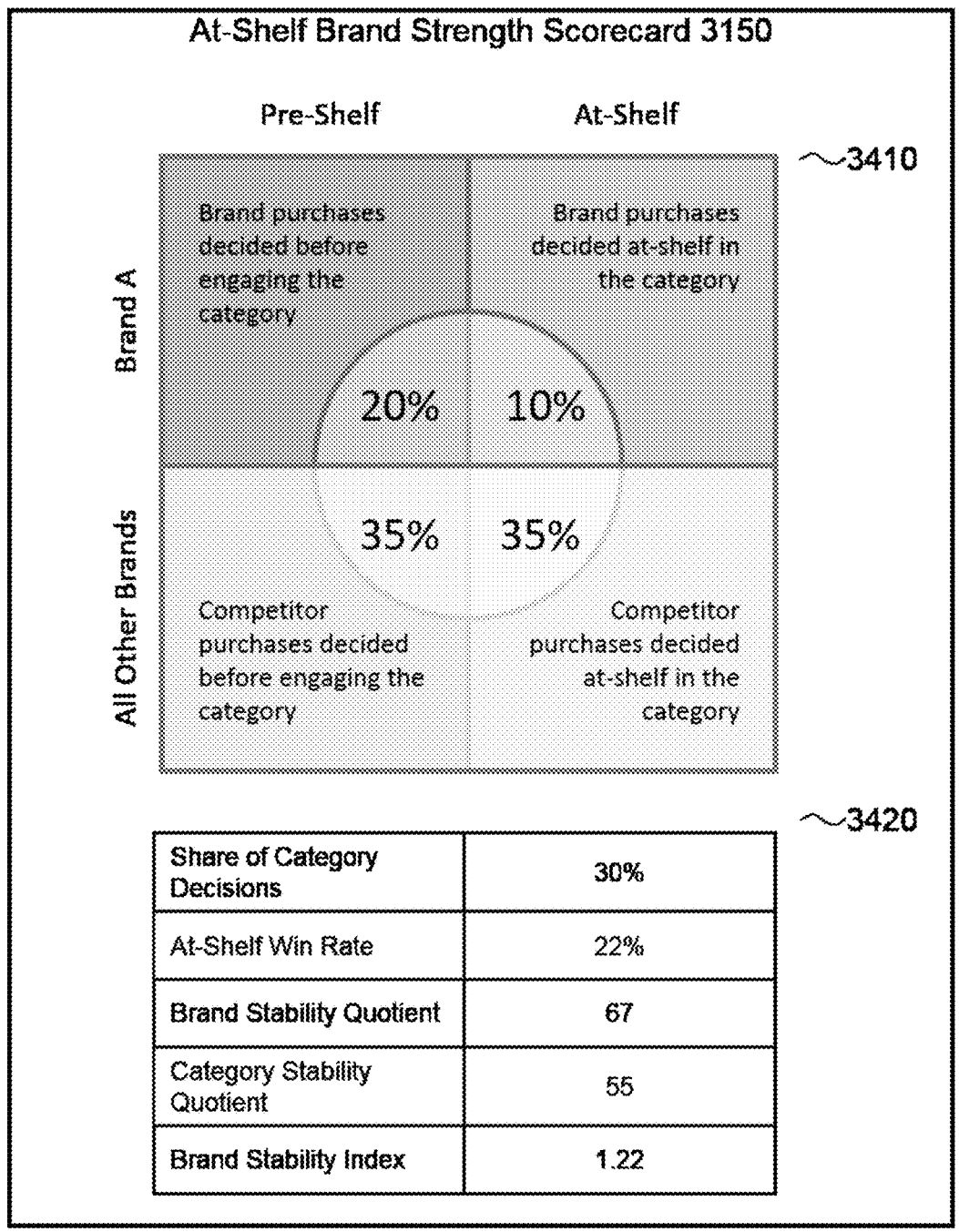
FIG. 34 shows another example application of the At-Shelf Brand Strength Scorecard.

Another example embodiment of an application of the Brand Strength Scorecard 3150 can be seen in FIG. 34. The top chart 3410 shows four decision possibilities for the purchase of a product in a particular category. In this case, 20% of all category shoppers purchased "Brand A" and made the decision before engaging in the category, as shown in the upper left quadrant. The upper right quadrant shows that 10% of all category shoppers purchased "Brand A" and made the decision at-shelf. For all other brand purchases shoppers made in the category, 35% of the total category purchases were decided by the shopper before engaging the category, as shown in the lower left quadrant. Finally, the lower right quadrant shows that 35% of the total category purchases were not of "Brand A" and the shopper made the decision at-shelf.

The bottom chart 3420 shows the results of metrics calculated for the example embodiment. In this example, the Share of Category Decisions was 30%, the At-Shelf Win Rate was 22%, the Brand Stability Quotient was 67, the Category Stability Quotient was 55, and the Brand Stability Index was 1.22.

An example interpretation of these results can be that with a Brand Stability Quotient of 67 and Brand Stability Index of 1.22, Brand A's volume is too driven heavily by pre-shelf decisions, making it much more predictable than the category as a whole. However, Brand A underperforms in competitive at-shelf situations. A recommendation could be to drive trials, as they can be a key to initiating at-shelf consideration. Subsequent messaging and packaging to differentiate on key features and/or at-shelf promotional activities can improve At-Shelf Win Rate.

Figure 35:
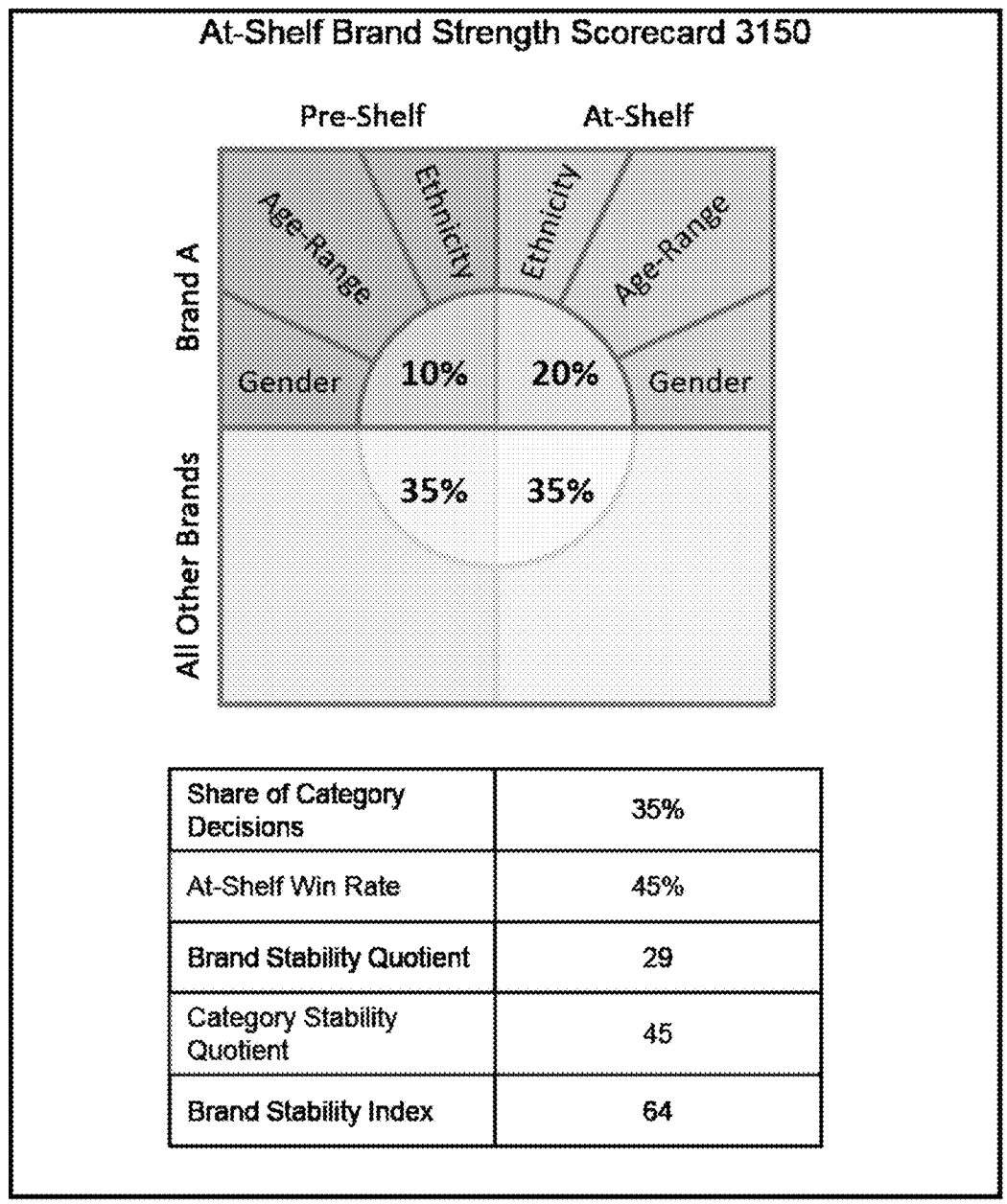
FIG. 35 shows another example application of the At-Shelf Brand Strength Scorecard.

In another embodiment, since demographics information can also be captured for each shopper, the Brand Strength Scorecard 3150 can also reflect that information, as illustrated in FIG. 35. For example, the scorecard could produce brand strength information for all shoppers of a particular age-range and gender. This capability can provide greater insight into the brand strength in order to target particular demographic segments for improvement to the strength of the brand.

Figure 36:
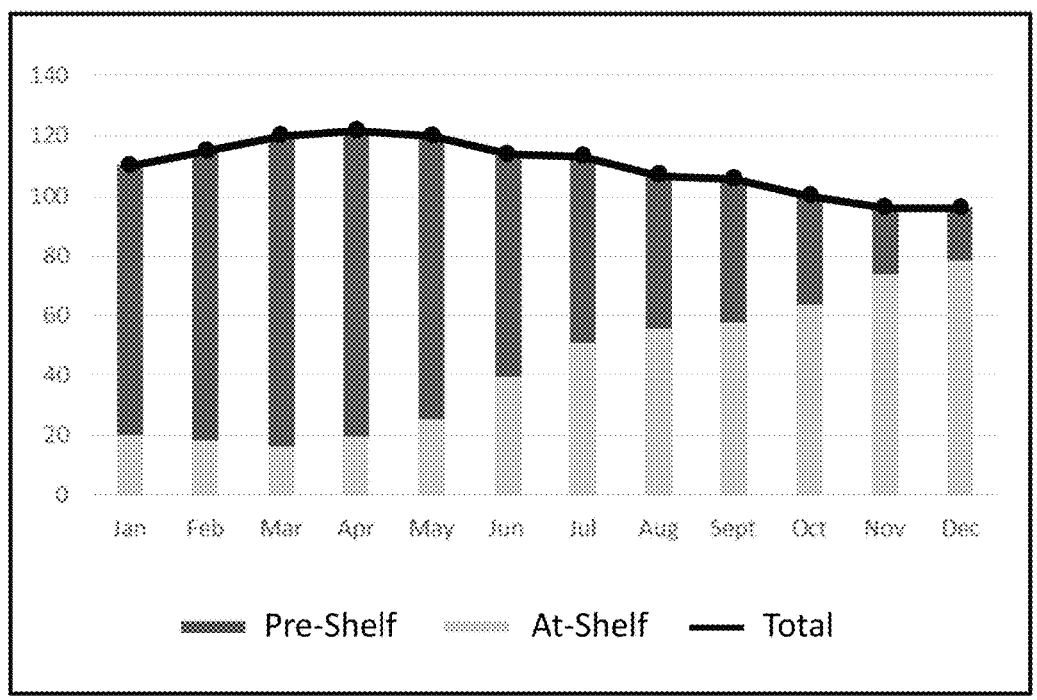
FIG. 36 shows an expanded example application of the brand strength score, showing total sales of a product over twelve months.

In another embodiment, the Brand Strength Scorecard 3150 could also be expanded to show how the strength of a brand changes over time with respect to the decision process of the shopper. In FIG. 36, an example application is illustrated, showing total sales of a product over twelve months. The illustration also shows the portion of the total product sales where the purchase decision was made pre-shelf and the portion of the total product sales where the purchase decision was made at-shelf. In this example, while the overall sales were shown to have dropped over the course of the year, the portion of at-shelf decisions was increasing, indicating, for example, a stronger in-store brand presence or better promotional activity. It also shows a decrease in pre-shelf decisions, indicating, for example, a drop in the notoriety of the brand or a switch of customers to a competing brand.

While several examples are provided for illustrative purposes, there are many possible applications that can be used for brand strength analysis, and so are not limited to the exemplary embodiments, configurations, or applications.

Hardware Configuration

One of ordinary skill in the art would recognize that the set of cameras utilized for the present invention, for example as illustrated in FIGS. 2 and 5, can be ordinary surveillance cameras, high-definition cameras, low-cost surveillance cameras, infrared cameras, or other image detection devices. A preferred embodiment of the present invention has the cameras configured as to be installed in the ceiling of a retail location, but one skilled in the art would understand that the cameras could be installed in other locations, such as the walls of the location, behind a mirror, on or associated with a commercial display, aisle and shelf hardware, or railing.

One of ordinary skill in the art would also recognize that the access points (APs), for example as illustrated in FIG. 2, can be located in plain view of customers in a retail location, but also out of sight in a ceiling or other fixture. The AP can be a consumer AP device, commercial AP device, beacon device, or any other device capable of operating as an access point for Wi-Fi, Bluetooth, or other wireless modality.

Both the cameras and AP hardware can be connected by a wired network, including, but not limited to, an Ethernet based network. The cameras and AP hardware can be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

Figure 37:
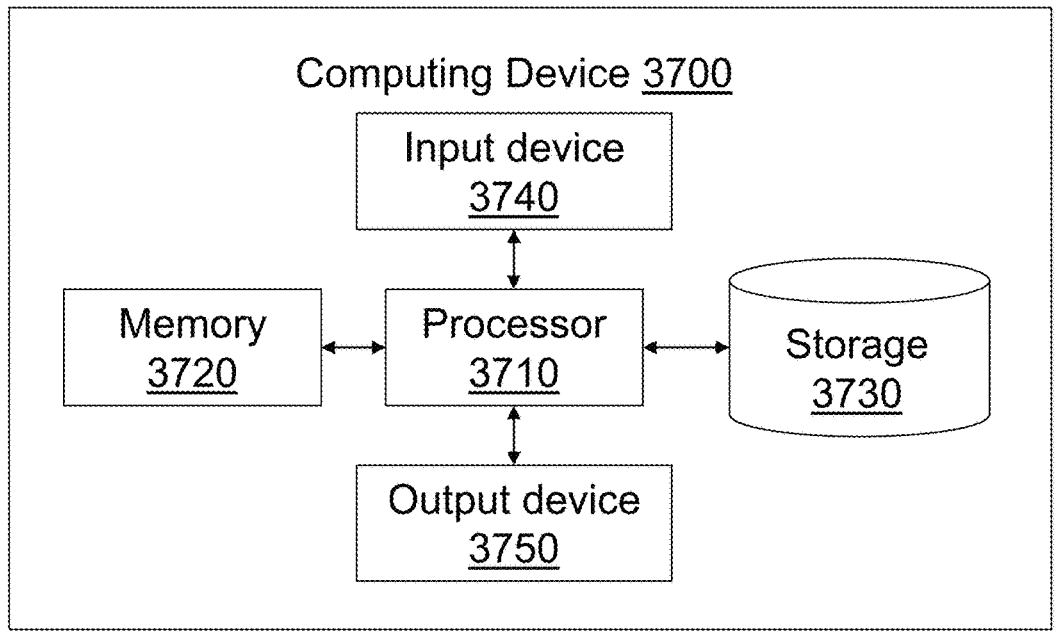
FIG. 37 shows an example computing device illustration.

FIG. 37 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 3700 includes a processor 3710, memory 3720 (such as Random Access Memory or RAM), storage 3730 (such as a hard disk drive), input device 3740 (such as a keyboard, trackball, trackpad, or mouse), and output device 3750 (such as a CRT, LCD, or other type of display device, and an auditory device such as speakers).

Sensor Calibration

Figure 38:
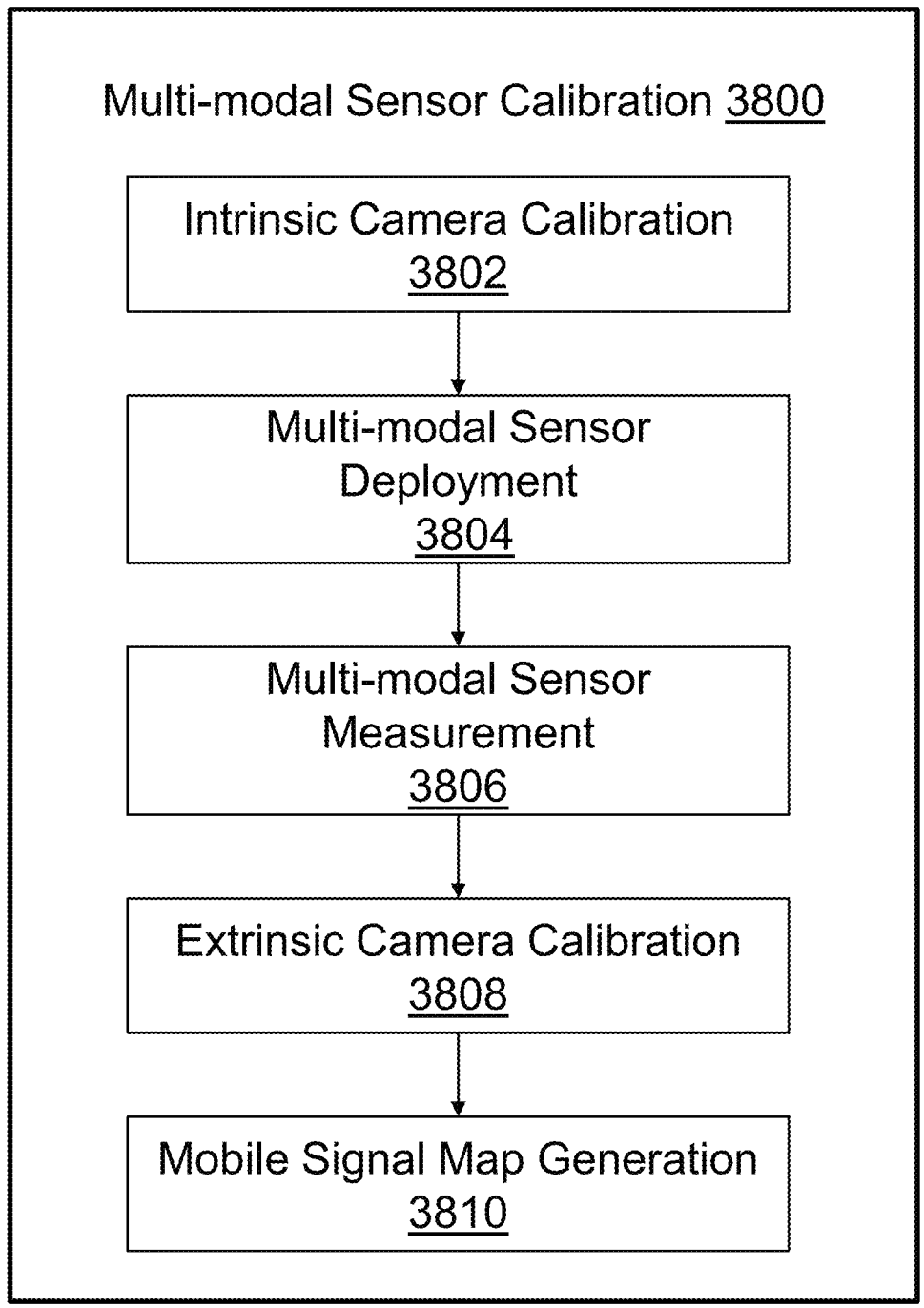
FIG. 38 shows an exemplary method to simultaneously calibrate multi-modal sensors.

FIG. 38 shows an embodiment of the procedures for the Multi-modal Sensor Calibration 3800 in which a computing machine with the assistance of one or more human operators simultaneously calibrates the cameras and the APs. In step 3802, prior to the actual deployment, the intrinsic parameters of the cameras can be calibrated with respect to focal length, lens distortion parameters, etc. In step 3804, given an area of interest, a number of cameras and APs can be deployed to cover the area with a certain sensing density that meets application-specific requirements in terms of the uncertainty bound of the measurements. The sensing density at a particular location can be defined as the number of sensors that can cover the location at the same time. For example, an application may require at least three visual measurements for the same person at a given time instance to guarantee a certain uncertainty level in vision-based location estimation of a person. The same or another application may require at least five radio measurements for the same person at a given time instance for the same purpose. Depending on such application-specific requirements, the sensor density and sensor placement is determined.

In module 3806, the deployed cameras and APs can be networked with at least one computing machine that processes measurements from the sensors. The computing machines can be time-synchronized by, for example, the network time protocol (NTP) to accurately issue a timestamp for each measurement. Once all the sensors are deployed, a set of known positions can be seen in FIG. 39 marked with an X 3910A on the floor of the area for placing a calibration pattern. The positions for the calibration pattern can be marked in such a way that each camera can clearly capture the calibration pattern when the calibration pattern is placed at the known positions. Then, a human operator (1) can carry a mobile phone with its wireless device turned on, (2) can carry a distinct visual feature (for example, wears a visually salient t-shirt), and (3) can place the calibration pattern on the known positions one after another. During the entire calibration process 3800, cameras can capture images of the human operator, and APs can detect and record the mobile signals from the human operator's mobile device.

An existing camera calibration algorithm may be employed to estimate the extrinsic calibration parameters of the cameras using the known calibration pattern at known positions. Whenever the human operator puts the calibration pattern on a known position for a period of time, s/he can also stand right beside the calibration pattern to let the cameras and APs take measurements multiple times with the timestamp for a period of time. During this period, the statistics of the mobile signal for this particular position can be obtained. After recording measurements and corresponding timestamps, the human operator can move to the next known position and can perform the same procedure for the rest of the known positions.

Since the default interval of mobile signal transmission from a mobile device may be longer than desired, a dedicated mobile device software (also called as a mobile app) may be used (1) to increase the mobile signal transmission rate and (2) to ease the process of sending commands to record the timestamp.

Given the intrinsic camera parameters and the captured images of a known calibration pattern at known positions, the extrinsic calibration can be carried out for each camera in the extrinsic camera calibration module 3808. Since the calibrated cameras can convert image coordinates into world coordinates, the human operator's location can be found in the world coordinates based on the salient visual feature of the human operator. The world coordinates of the human operator can then be associated with the mobile signal measurements captured at APs at the same time instances.

Once the relative locations of the human operator from a certain AP and its corresponding mobile signal's RSSs are known, we can now perform mobile signal RSS-to-distance map generation for each AP for trilateration-based tracking in the Mobile Signal Map Generation module 3810. In another embodiment, the same information can also be used to generate a mobile signal fingerprint for radio fingerprint-based tracking by (1) collecting the RSS measurements of the mobile signal from the human operation captured at different APs, which corresponds to particular positions and (2) generating a type of representation (e.g., vector) for each position. With a sufficiently large number of such samples, a sufficiently dense fingerprint map for an area can be generated and may be smoothed out in order to reduce noise in the fingerprint map.

Figure 39:
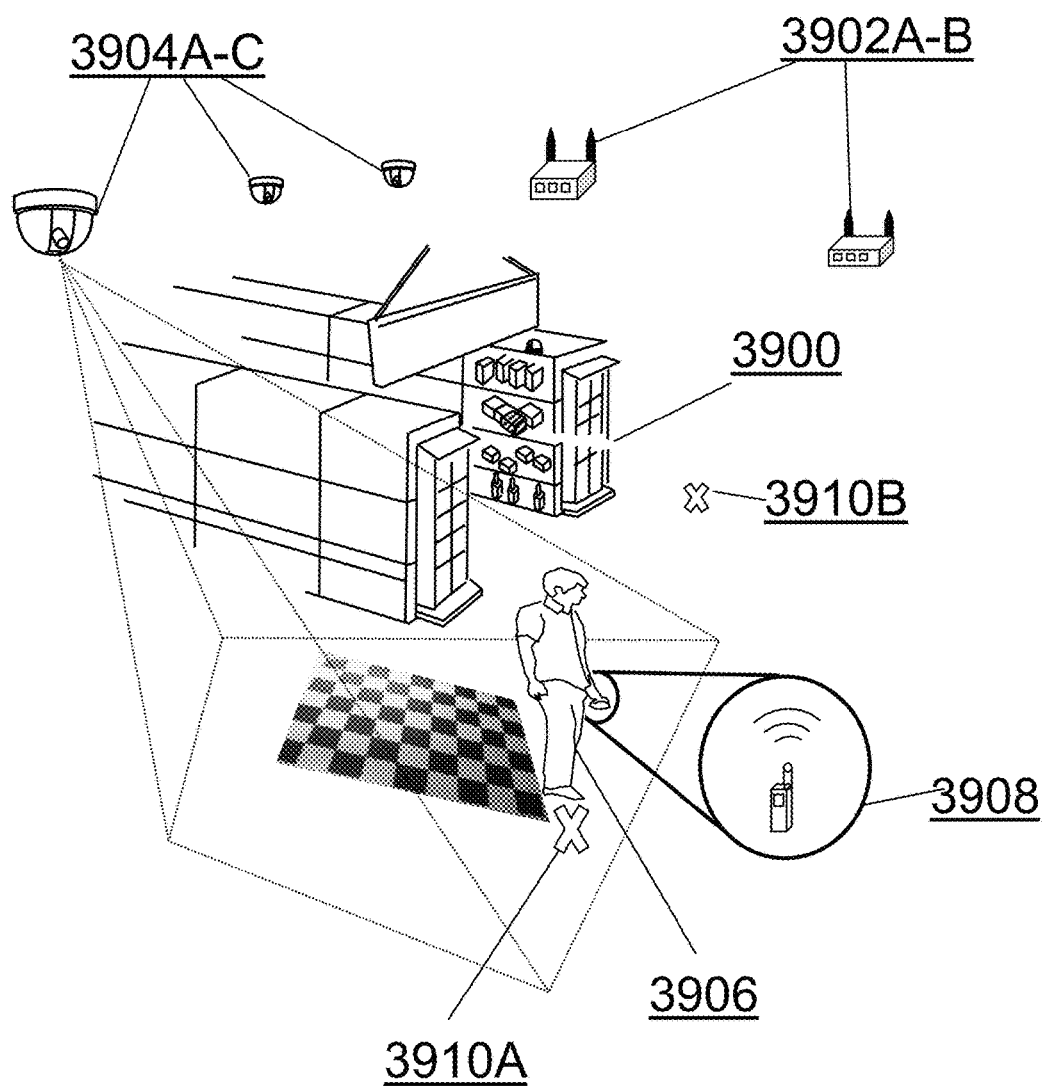
FIG. 39 shows an application of the multi-modal calibration in an exemplary embodiment.

FIG. 39 shows an illustrative example of how cameras 3902A-B and APs 3904 A-C can be calibrated and how a mobile signal RSS-to-distance map and/or of radio fingerprint can be generated in a retail store environment 3900. After a set of cameras 3902A-B and wireless sensors 3904 A-C are deployed, a human operator 3906 can carry a mobile device 3908 that is turned on and periodically transmits signals. The intervals of consecutive radio transmissions can be set to at least one or preferably several packets per second. The human operator 3906 can place a camera calibration pattern at a known position marked by X 3910A. A known position can occur where at least one camera can see the entire calibration pattern. The human operator 3906 can stand at the known position, while the cameras 3902 A-B can capture the calibration pattern and the APs 3904A-C can record all mobile signals from the human operator 3906. All vision and mobile measurements can be stored in a database with timestamps. The mobile signal measurements may be stored in a form of a statistics such as histogram or mean and standard variation. After completing these tasks at the known position, the human operator can move to the next known position 3910B and perform the same tasks until all known positions are visited.

An existing camera calibration algorithm may be employed to estimate the extrinsic calibration parameters of the cameras as explained in FIG. 38. In the meantime, a RSS-to-distance mapping function can be learned for each individual AP or for all the APs using the RSS-to-distance correspondences stored in the database. In another embodiment, a radio fingerprint for each location may also be generated using the same database. The RSS-to-distance map and radio fingerprinting methods are well-known to those with ordinary skill in the art.

We claim:
1. A method for analyzing product strength or brand strength by determining shopper decision behavior during a shopping trip, utilizing at least a camera, at least a mobile signal sensor, and at least a processor for performing the steps of:
 a. detecting the presence of a shopper at a location using an At-Door Shopper Detector module,
 b. tracking the movements of the shopper throughout the location using at least one camera, at least one mobile signal sensor, and a Multi-modal Shopper Tracker module, wherein the Multi-modal Shopper Tracker module further comprises
  i. using a Vision tracker module to obtain a set of vision data from at a camera,
  ii. detecting a shopper at a specific time and location,
  iii. using a Mobile Tracker module to obtain a set of mobile data for the shopper using a mobile device,
  iv. localizing the mobile device using the MAC address using a trilateration based method,
 c. integrating a set of data from the Multi-modal Shopper Tracker module using a Multi-modal Shopper Data Associator, which comprises the following steps:
  i. detecting the completion of at least one mobile trajectory,
  ii. retrieving a set of shopper profile data from the in-store shopper database, wherein the shopper profile data contains at least one vision trajectory,
  iii. performing matching between the at least one vision trajectory and the at least one mobile trajectory, iv. fusing vision trajectories that are associated with the same target at a given time frame using measurement fusion,
v. combining the fused vision trajectories with the mobile trajectory to complete missing segments in the vision trajectories,
d. calculating at least one decision factor using the Shopper Decision Tracker module,
e. determining whether the shopper decision was made at-shelf or pre-shelf, based on the at least one decision factor, using a Decision Determination module, and
f. analyzing the shopper decision results, aggregated across a plurality of shoppers, to derive metrics representing the strength of a product or brand of products.

2. The method of claim 1, wherein the Shopper Decision Tracker module uses one or more factors from a list comprising time based factors, category based factors, environmental factors, and behavior based factors.

3. The method of claim 2, wherein the list of time based factors is comprised of time allocation, shopping time, navigation time, and navigational complexity, the list of category based factors is comprised of category size, category orientation, category complexity, fixture type, and share of category space, the list of environmental factors is comprised of frequently changing elements, aisle fixtures, and crowding, and the list of behavior based factors is comprised of stopping frequency, shopper velocity, shopper trajectory, and shopper repeat visits.

4. The method of claim 1, wherein the Shopper Decision Tracker module utilizes at least one decision factor to populate a decision model used by the Decision Determination module.

5. The method of claim 4, wherein the decision model is generated by the steps of:
a. performing an association analysis for identifying factors that have a bivariate association with one another using an Association Analysis module,
b. estimating the probability that, given a set of factors, that a particular outcome is present, using a Multiple Logistic Regression module, and
c. scoring the model for goodness of fit, applying necessary transformations based on the scoring, and refining the model using a Model Validation and Optimization module.

6. The method of claim 1, wherein the derived metrics include:
a. a brand stability quotient comprising a ratio of a percentage of a first brand pre-shelf decisions divided by a percentage of the first brand total decisions, and
b. a category stability quotient comprising a ratio of a percentage of a first category pre-shelf decisions divided by a percentage of the category total decisions.

7. The method of claim 6, wherein the derived metrics further include:
a. a brand stability index comprising a ratio of the brand stability quotient divided by the category stability quotient, and
b. an at-shelf win rate comprising a ratio of the percentage of the first brand pre-shelf decisions divided by a percentage of at-shelf decisions for the total category.

8. The method of claim 1, wherein the analyzing further comprises using the derived metrics to generate an At-Shelf Brand Strength Scorecard.

9. The method of claim 8, further comprising making a recommendation for improving the strength of a product or brand based on an interpretation of results provided by the At-Shelf Brand Strength Scorecard.

10. The method of claim 1, wherein the steps are repeated for a plurality of shoppers at a single retail location or across multiple retail locations.

11. A system for analyzing product strength or brand strength by determining shopper decision behavior during a shopping trip, utilizing at least a camera, at least a mobile signal sensor, and at least a processor for performing the steps of:
a. detecting the presence of a shopper at a location using an At-Door Shopper Detector module,
b. tracking the movements of the shopper throughout the location using at least one camera, at least one mobile signal sensor, and a Multi-modal Shopper Tracker module, wherein the Multi-modal Shopper Tracker module further comprises
i. using a Vision tracker module to obtain a set of vision data from at a camera,
ii. detecting a shopper at a specific time and location,
iii. using a Mobile Tracker module to obtain a set of mobile data for the shopper using a mobile device,
iv. localizing the mobile device using the MAC address using a trilateration based method,
c. integrating a set of data from the Multi-modal Shopper Tracker module using a Multi-modal Shopper Data Associator which comprises the following steps:
i. detecting the completion of at least one mobile trajectory,
ii. retrieving a set of shopper profile data from the in-store shopper database, wherein the shopper profile data contains at least one vision trajectory,
iii. performing matching between the at least one vision trajectory and the at least one mobile trajectory,
iv. fusing vision trajectories that are associated with the same target at a given time frame using measurement fusion,
v. combining the fused vision trajectories with the mobile trajectory to complete missing segments in the vision trajectories,
d. calculating at least one decision factor using the Shopper Decision Tracker module,
e. determining whether the shopper decision was made at-shelf or pre-shelf, based on the at least one decision factor, using a Decision Determination module, and
f. analyzing the shopper decision results, aggregated across a plurality of shoppers, to derive metrics representing the strength of a product or brand of products.

12. The system of claim 11, wherein the Shopper Decision Tracker module uses one or more factors from a list comprising time based factors, category based factors, environmental factors, and behavior based factors.

13. The system of claim 12, wherein the list of time based factors is comprised of time allocation, shopping time, navigation time, and navigational complexity, the list of category based factors is comprised of category size, category orientation, category complexity, fixture type, and share of category space, the list of environmental factors is comprised of frequently changing elements, aisle fixtures, and crowding, and the list of behavior based factors is comprised of stopping frequency, shopper velocity, shopper trajectory, and shopper repeat visits.

14. The system of claim 11, wherein the Shopper Decision Tracker module utilizes at least one decision factor to populate a decision model used by the Decision Determination module.

15. The system of claim 14, wherein the decision model is generated by the steps of:

a. performing an association analysis for identifying factors that have a bivariate association with one another using an Association Analysis module, b. estimating the probability that, given a set of factors, that a particular outcome is present, using a Multiple Logistic Regression module, and c. scoring the model for goodness of fit, applying necessary transformations based on the scoring, and refining the model using a Model Validation and Optimization module.

16. The system of claim 11, wherein the derived metrics include:

a. a brand stability quotient comprising a ratio of a percentage of a first brand pre-shelf decisions divided by a percentage of the first brand total decisions, and b. a category stability quotient comprising a ratio of a percentage of a first category pre-shelf decisions divided by a percentage of the category total decisions.

17. The system of claim 16, wherein the derived metrics further include:

a. a brand stability index comprising a ratio of the brand stability quotient divided by the category stability quotient, and b. an at-shelf win rate comprising a ratio of the percentage of the first brand pre-shelf decisions divided by a percentage of at-shelf decisions for the total category.

18. The system of claim 11, wherein the analyzing further comprises using the derived metrics to generate an At-Shelf Brand Strength Scorecard.

19. The system of claim 18, further comprising making a recommendation for improving the strength of a product or brand based on an interpretation of results provided by the At-Shelf Brand Strength Scorecard.

20. The system of claim 11, wherein the steps are repeated for a plurality of shoppers at a single retail location or across multiple retail locations.

* * * * *